United States Patent
Ji et al.

(10) Patent No.: US 12,459,968 B2
(45) Date of Patent: Nov. 4, 2025

(54) OLIGONUCLEOTIDE SYNTHESIS ON SOLID SUPPORT

(71) Applicant: INTEGRATED DNA TECHNOLOGIES, INC., Skokie, IL (US)

(72) Inventors: An Ji, Coralville, IA (US); Michael Marvin, Coralville, IA (US); Kevin Marks, North Liberty, IA (US); David Anderson, North Liberty, IA (US)

(73) Assignee: INTEGRATED DNA TECHNOLOGIES, INC., Skokie, IL (US)

( * ) Notice: Subject to any disclaimer, the term of this patent is extended or adjusted under 35 U.S.C. 154(b) by 629 days.

(21) Appl. No.: 17/796,350

(22) PCT Filed: Feb. 24, 2021

(86) PCT No.: PCT/US2021/019335
§ 371 (c)(1),
(2) Date: Jul. 29, 2022

(87) PCT Pub. No.: WO2021/173615
PCT Pub. Date: Sep. 2, 2021

(65) Prior Publication Data
US 2023/0119227 A1   Apr. 20, 2023

Related U.S. Application Data

(60) Provisional application No. 62/980,880, filed on Feb. 24, 2020.

(51) Int. Cl.
*C07H 21/00* (2006.01)
*C07F 9/09* (2006.01)
*C07H 1/00* (2006.01)

(52) U.S. Cl.
CPC ............ *C07H 21/00* (2013.01); *C07F 9/098* (2013.01); *C07H 1/00* (2013.01)

(58) Field of Classification Search
CPC ............................. C07H 19/073; C07H 21/00
See application file for complete search history.

(56) References Cited

U.S. PATENT DOCUMENTS

| | | |
|---|---|---|
| 5,235,028 A | 8/1993 | Barany et al. |
| 5,436,327 A | 7/1995 | Southern et al. |
| 5,703,223 A | 12/1997 | Wickstrom et al. |
| 5,770,722 A | 6/1998 | Lockhart et al. |
| 5,919,523 A | 7/1999 | Sundberg et al. |
| 6,258,454 B1 | 7/2001 | Lefkowitz et al. |
| 6,489,466 B2 | 12/2002 | Huang et al. |
| 6,586,211 B1 | 7/2003 | Stähler |
| 6,770,754 B2 | 8/2004 | Azhayev et al. |
| 6,852,494 B2 | 2/2005 | Liao et al. |
| 6,995,259 B1 | 2/2006 | Vargeese et al. |
| 7,202,264 B2 | 4/2007 | Ravikumar et al. |
| 7,211,654 B2 | 5/2007 | Gao et al. |
| 7,329,515 B2 | 2/2008 | Leuck et al. |
| 7,385,050 B2 | 6/2008 | Dellinger et al. |
| 7,491,817 B2 | 2/2009 | Azhayev et al. |
| 7,790,369 B2 | 9/2010 | Stähler et al. |
| 8,026,349 B2 | 9/2011 | Hartsel et al. |
| 8,053,187 B2 | 11/2011 | Gao et al. |
| 8,173,368 B2 | 5/2012 | Staehler et al. |
| 8,287,700 B2 | 10/2012 | Padmanabhan et al. |
| 8,367,335 B2 | 2/2013 | Staehler et al. |
| 8,410,027 B2 | 4/2013 | Gao et al. |
| 9,045,573 B2 | 6/2015 | Maeta et al. |
| 9,981,239 B2 | 5/2018 | Banyai et al. |
| 2001/0044529 A1 | 11/2001 | Beaucage et al. |
| 2003/0120035 A1 | 6/2003 | Gao et al. |
| 2007/0224601 A1 | 9/2007 | Mccuen et al. |
| 2009/0325819 A1 | 12/2009 | Gao et al. |
| 2017/0081716 A1 | 3/2017 | Peck |
| 2018/0104664 A1 | 4/2018 | Fernandez et al. |

FOREIGN PATENT DOCUMENTS

| | | |
|---|---|---|
| CA | 1336690 C | 8/1995 |
| CN | 101870717 A | 10/2010 |
| CN | 102037144 A | 4/2011 |
| WO | 1992006103 A1 | 4/1992 |
| WO | 1994001446 A2 | 1/1994 |
| WO | 1997023497 A1 | 7/1997 |
| WO | 2009124150 A2 | 10/2009 |
| WO | 2018177881 A1 | 10/2018 |

OTHER PUBLICATIONS

Agrawal, S. et al. "Modified oligonucleotides as therapeutic and diagnostic agents." Current Opinion in Biotechnology 6.1 (1995): 12-19.

Atdbio. Solid-Phase Oligonucleotide Synthesis. Accessed on Jul. 22, 2019. Available online at https://www.atdbio.com/content/17/Solid-phase-oligonucleotide-synthesis (23 pages).

Atdbio. Synthesis and Properties of Fluorescent Oligonucleotides. Accessed on Jan. 8, 2020. Available online at https://www.atdbio.com/content/18/Synthesis-and-properties-of-fluorescent-oligonucleotides (10 pages).

Beaucage, S. L. et al. "Advances in the Synthesis of oligonucleotides by the Phosphoramidite Approach," Tetrahedron, 1992, 48, 2223-2311.

Beaucage, S. L. (2004). "Synthesis of Unmodified Oligonucleotides." Current Protocols in Nucleic Acid Chemistry 19 (1): 3.0.1-3.0.2.

(Continued)

*Primary Examiner* — Jonathan S Lau
(74) *Attorney, Agent, or Firm* — Michael Best & Friedrich LLP

(57) ABSTRACT

Functionalized solid supports are useful in the synthesis of oligonucleotides. The functionalized solid supports contain an extended linker to a terminal functional group or a first nucleotide or nucleoside moiety. The extended linker permits oligonucleotide synthesis to take place at a greater distance from the solid support with greater efficiency.

17 Claims, 1 Drawing Sheet

(56) References Cited

OTHER PUBLICATIONS

Beaucage, S. L. et al. "The synthesis of modified oligonucleotides by the phosphoramidite approach and their applications." Tetrahedron 49.28 (1993): 6123-6194.
Bhardwaj, R., et al. "A Simple and Efficient Microfluidic System for Reverse Chemical Synthesis (5'-3') of a Short-Chain Oligonucleotide Without Inert Atmosphere." Applied Sciences 9.7 (2019): 1357.
Caruthers, M. H. "A brief review of DNA and RNA chemical synthesis." Biochemical Society Transactions 39.2 (2011): 575-580.
Current Protocols in Nucleic Acid Chemistry. Chapter 3—Synthesis of Unmodified Oligonucleotides. (2000): 3.1.1-3.5.9.
GeneLink. Amino Linker C3 page. Accessed Sep. 22, 2019. Available online at http://www.genelink.com/newsite/products/mod_detail.asp?modid=56 (2 pages).
Glen Research. Modifiers, Photocleavable, Oligo-Peptide Conjugation, and Methyl Triester Linkages. "Novel Universal Support Features Rapid Amide-Assisted Dephosphorylation." (2001) (12 pages).
IDT. "Chemical Synthesis and Purification of Oligonucleotides" Integrated DNA Technologies (2011): 1-12.
IDT. "Fluorescence and fluorescence applications." Integrated DNA Technologies (2011): 1-13.
International Preliminary Report on Patentability for Application No. PCT/US2021/019335 dated Aug. 30, 2022 (6 pages).
International Search Report and Written Opinion for Application No. PCT/US2021/019335 dated Jun. 26, 2021 (14 pages).
Invitrogen. "The molecular probes handbook: A guide to fluorescent probes and labeling technologies." Ch 8 (2010): 303-360.
IUPAC 1974 Recommendations for Section E, Fundamental Stereochemistry, in Pure Appl. Chem., 1976, 45: 13-30.
Jäschke, A., et al. "Synthesis and properties of oligodeoxyribonucleotide-polyethylene glycol conjugates." Nucleic acids research 22.22 (1994): 4810-4817.
Jensen, M.A. et al. "Gas-phase cleavage and dephosphorylation of universal linker-bound oligodeoxynucleotides." Nucleosides, Nucleotides and Nucleic Acids 29.11-12 (2010): 867-878.
Katzhendler, J., et al. "The effect of spacer, linkage and solid support on the synthesis of oligonucleotides." Tetrahedron 45.9 (1989): 2777-2792.
Kawai, R., et al. (Jan. 2002). Utility of Porous Glass® with a new long-chain alkylamine spacer arm as a solid support for synthesis of oligodeoxyribonucleotides via the phosphoramidite method. In Nucleic acids symposium series (vol. 2, No. 1, pp. 165-166). Oxford University Press.
Kupihár, Z., et al. "An electrospray mass spectrometric method for accurate mass determination of highly acid-sensitive phosphoramidites." Rapid Communications in Mass Spectrometry: An International Journal Devoted to the Rapid Dissemination of Up-to-the-Minute Research in Mass Spectrometry 22.4 (2008): 533-540.
Laikhter, A. et al. "The Chemical Synthesis of Oligonucleotides." (2017). Version accessed Jul. 22, 2019. Available online at https://www.biosyn.com/tew/the-chemical-synthesis-of-oligonucleotides.aspx (18 pages).
Lin, X. Oligodeoxynucleotide synthesis using protecting groups and a linker cleavable under non-nucleophilic conditions. Diss. Michigan Technological University, 2013 (188 pages).
Link Technologies Ltd. Guidebook for the Synthesis of Oligonucleotides Product Guide 2015/2016. Mar. 16, 2015 (194 pages).
Ni, S., et al. "Chemical modifications of nucleic acid aptamers for therapeutic purposes." International journal of molecular sciences 18.8 (2017): 1683.
Pon, R. T. "Solid-phase supports for oligonucleotide synthesis." Current Protocols in Nucleic Acid Chemistry 1 (2000): 3-1.
Ravikumar, V. T., et al. "UnyLinker: An efficient and scaleable synthesis of oligonucleotides utilizing a universal linker molecule: A novel approach to enhance the purity of drugs." Organic Process Research & Development 12.3 (2008): 399-410.
The Glen Report vol. 11 No. 1. Jul. 1998. Available online at https://www.glenresearch.com/media/contentmanager/content/glenreport/GR11-1.pdf (12 pages).
The Glen Report vol. 15 No. 1. Mar. 2002. Available online at https://www.glenresearch.com/media/contentmanager/content/glenreport/GR15-1.pdf (15 pages).
The Glen Report vol. 20 No. 2. Oct. 2008. Available online at https://www.glenresearch.com/media/contentmanager/content/glenreport/GR20-2.pdf (16 pages).
Verma, S. et al. "Modified oligonucleotides: synthesis and strategy for users." Annual review of biochemistry 67.1 (1998): 99-134.
Wei, X. "Coupling activators for the oligonucleotide synthesis via phosphoramidite approach." Tetrahedron 69.18 (2013): 3615-3637.
Wikipedia. Oligonucleotide synthesis. Version accessed Jul. 24, 2019. Available online at https://en.wikipedia.org/wiki/Oligonucleotide_synthesis (22 pages).
Wincott, F. E. "Strategies for oligoribonucleotide synthesis according to the phosphoramidite method." Current protocols in nucleic acid chemistry 1 (2000): 3-5 (12 pages).
Yagodkin, A. et al. "Universal linker phosphoramidite." Arkivoc 3 (2009): 187-197.
Wolf, J., et al. "Synthesis of guanosine 5'-conjugates and their use as initiator molecules for transcription priming." Organic & biomolecular chemistry 6.5 (2008): 899-907.
Japanese Patent Office. Notification of Reasons for Rejection for Application No. 2022-549788, dated Nov. 29, 2024 (7 pages with translation).
China National Intellectual Property Administration. Notification of First Office Action for Application No. 202180015092.9, dated Mar. 1, 2025 (20 pages with translation).
Japanese Patent Office. Final Notification of Reasons for Rejection for Application No. 2022-549788, dated May 16, 2025 (6 pages with translation).
European Patent Office. Office Action for Application No. 21717594.2, dated Jul. 2, 2025 (5 pages).

OLIGONUCLEOTIDE SYNTHESIS ON SOLID SUPPORT

RELATED APPLICATIONS

This application is a U.S. national stage entry of International Patent Application No. PCT/US2021/019335, filed on Feb. 24, 2021, which claims priority to U.S. Provisional Patent Application No. 62/980,880, filed on Feb. 24, 2020, the entire contents of each of which are fully incorporated herein by reference.

TECHNICAL FIELD

The present invention relates to functionalized solid supports for oligonucleotide synthesis.

BACKGROUND

Solid phase oligonucleotide synthesis commonly takes place on frits consisting of Controlled Pore Glass (CPG) particles. CPG consists of a pore network structure that facilitates rapid mass transfer during a synthesis, with the pores ranging from 500 to 2000 Å in diameter. For oligonucleotide synthesis, CPG particles are uniformly coated with a substrate, such as (3-aminopropyl) triethoxysilane, which contains reactive amino groups that serve as points of attachment for non-nucleosidic linkers, or nucleoside succinates, which then serve as attachment points for the oligonucleotides during the synthesis process. The oligonucleotides are covalently bound, via their 3'-terminal hydroxyl group, to the linkers and remain attached over the entire course of the chain assembly, after which they are cleaved off and deprotected. In high-throughput/parallel/small scale oligonucleotide synthesis, the solid support is contained in the wells of multi-well plates.

To maximize the scale of synthesis, the molecular structure of the substrate should have a high density of evenly distributed attachment points for optimum oligo synthesis. Such high densities, however, can lead to crowding and steric hindrance of the oligos during the synthesis process, particularly for longer oligos, which can result in errors in the final product.

One way to avoid steric hindrance is to use larger pore sizes. However, since the surface area of CPG is inversely related to the pore size and the density of silanol attachment groups are a function of surface area, large pore CPG has less ligand loading capacity. Additionally, not all silanol attachment points are evenly distributed, with some being too crowded together to be useful for full-length oligo synthesis.

Another way to avoid steric hindrance is to use spacers, to which the oligos are tethered, which serve to place the oligos, and the synthesis process, farther away from the substrate. This would allow for more flexibility and more space for synthesis.

One spacer that is often used is Long Chain Alkyl Amine (LCAA; FIGS. 1A and 1B). LCAAs are attached to the aminopropyl CPG (FIG. 1A). In some cases, the LCAA is attached via a linker, such as an acetylglycerol (FIG. 1B). The amino group of the attached LCAA is then used as an anchoring point for linkers, such as succinyl spacers, that are suitable for oligonucleotide synthesis.

SUMMARY

The present invention relates to solid phase oligonucleotide synthesis whereby the synthesis occurs at a greater distance from the surface of the solid support (e.g., CPG particles) with an extended length linker comprising one or more polyalkylene glycol phosphate/phosphonate ester units. The extended length linker serves as the starting point for oligonucleotide synthesis. The polyalkylene glycol phosphate/phosphonate ester units may be attached via phosphoramidite chemistry. The extended linkers described herein are compatible with universal linkers and traditional linker arms used for oligonucleotide synthesis.

In one aspect, disclosed are functionalized solid supports of formula (I), or salts thereof,

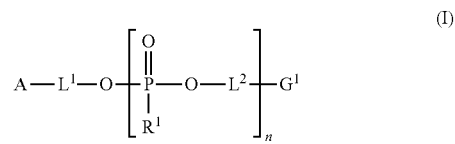

(I)

wherein:

A is a solid support material;

$L^1$ a divalent chemical linker composed of atoms selected from the group consisting of carbon, hydrogen, oxygen, nitrogen, sulfur, phosphorus, silicon, and halogen, wherein
  (a) the atoms of the divalent linker are arranged to form an optionally substituted chain, or an optionally substituted chain interrupted by an optionally substituted ring; and
  (b) the chain or chain and ring together comprise a 12- to 40-membered contiguous linear arrangement of atoms selected from the group consisting of carbon, oxygen, nitrogen, sulfur, phosphorus, and silicon;

$L^2$, at each occurrence, is independently —$(CH_2CH_2O)_m$—, —$(CHCH_3CH_2O)_m$—, or —$(CH_2CHCH_3O)_m$—;

$G^1$ is hydrogen, $PG^1$, or —$P(O)(R^1)$-$L^3$-$R^2$;

$R^1$, at each occurrence, is independently $R^{1a}$ or —$OR^{1a}$;

$R^{1a}$, at each occurrence, is independently $C_{1-10}$alkyl, $C_{2-10}$alkenyl, $C_{2-10}$alkynyl, $C_{3-10}$cycloalkyl, or $C_{5-10}$cycloalkenyl, wherein $R^{1a}$ is optionally substituted with 1-6 substituents independently selected from the group consisting of halogen, cyano, oxo, OH, —$OC_{1-4}$alkyl, —$OC_{1-4}$haloalkyl, or $C_{3-6}$cycloalkyl, the $C_{3-6}$cycloalkyl being optionally substituted with halogen or $C_{1-4}$alkyl;

$L^3$ is —$(OCH_2CH_2)_p$—, —$(OCHCH_3CH_2)_p$—, —$(OCH_2CHCH_3)_p$—, —$OC_{2-10}$alkylene-, —$OC_{0-4}$alkylene-$C_{3-10}$cycloalkylene-$C_{0-4}$alkylene-, or —$OC_{0-4}$alkylene-phenylene-$C_{0-4}$alkylene-, wherein the alkylene in $L^3$ is optionally substituted with 1-6 halogen, and the cycloalkylene and phenylene are optionally substituted with 1-4 substituents independently selected from the group consisting of halogen, $C_{1-4}$alkyl, $C_{1-4}$haloalkyl, cyano, —$OC_{1-4}$alkyl, and —$OC_{1-4}$haloalkyl;

$R^2$ is —$NR^{2a}R^{2b}$;

$R^{2a}$ is hydrogen, $C_{1-6}$alkyl, $C_{1-6}$haloalkyl, $C_{3-6}$cycloalkyl, or —$C_{1-3}$alkylene-$C_{3-6}$cycloalkyl;

$R^{2b}$ is hydrogen, $PG^2$, $C(O)$-$L^4$-OH, $C(O)$-$L^4$-$OPG^3$, $C(O)$-$L^4$-$G^{1a}$, $C(O)$-$L^5$-H, $C(O)$-$L^5$-$PG^1$, $C(O)$-$L^5$-$P(O)(R^1)$-$G^{1a}$, $C(O)$-$L^5$-$P(O)(OH)$-$G^{1a}$, or $C(O)$-$L^6$-$G^{1a}$, or $R^{2a}$ and $R^{2b}$, together with the nitrogen to which they attach form a protected nitrogen atom;

$L^4$ is $C(O)$ or $L^7$-$C(O)$;

$L^5$ is $L^7$-O;

$L^6$ is $L^7$-$Si(C_{1-4}alkyl)_2$;

L⁷ is a divalent chemical linker composed of atoms selected from the group consisting of carbon, hydrogen, oxygen, nitrogen, sulfur, phosphorus, silicon, and halogen, wherein
  (a) the atoms of the divalent linker are arranged to form an optionally substituted chain, an optionally substituted ring, or a combination of optionally substituted chain(s) and ring(s); and
  (b) the chain(s), ring(s), or combination thereof comprise a 1- to 20-membered contiguous linear arrangement of atoms selected from the group consisting of carbon, oxygen, nitrogen, sulfur, phosphorus, and silicon;

$G^{1a}$ is a nucleotide moiety or a nucleoside moiety;
$PG^1$ is a hydroxy protecting group;
$PG^2$ is an amino protecting group;
$PG^3$ is carboxylic acid protecting group;
m and p are independently an integer from 3 to 10; and
n is an integer from 1 to 20.

In another aspect, the invention provides a process for preparing the functionalized solid support of formula (I), wherein $G^1$ is hydrogen or $PG^1$, comprising: a) reacting a functionalized solid support of formula (II) with a compound of formula (III), wherein $R^{20}$ and $R^{21}$ are independently $C_{1-6}$alkyl

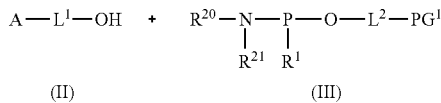

to provide a functionalized solid support of formula IV),

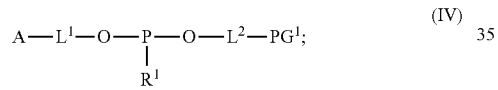

b) oxidizing the functionalized solid support of formula (IV) to provide the functionalized solid support of formula (I), wherein $G^1$ is $PG^1$ and n is 1; and
c) optionally removing the protecting group $PG^1$ to provide the functionalized solid support of formula (I), wherein $G^1$ is hydrogen and n is 1.

In another aspect, the invention provides a process for preparing the functionalized solid support of formula (I), wherein $G^1$ is $-P(O)(R^1)-L^3-R^2$, comprising reacting a functionalized solid support of formula (I), wherein $G^1$ is hydrogen, with a compound of formula (V), wherein $R^{20}$ and $R^{21}$ are independently $C_{1-6}$alkyl

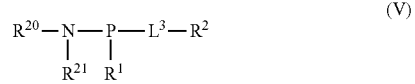

to provide a functionalized solid support of formula (VI)

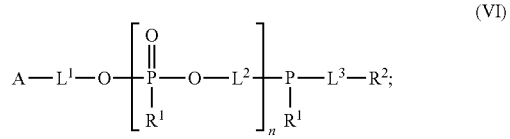

and
oxidizing the functionalized solid support of formula (VI) to provide the functionalized solid support of formula (I) wherein $G^1$ is $-P(O)(R^1)-L^3-R^2$; and $R^{2b}$ is $C(O)-L^4-G^{1a}$.

In another aspect, the invention provides a process for preparing the functionalized solid support of formula (I), wherein $G^1$ is $-P(O)(R^1)-L^3-R^2$, comprising reacting the functionalized solid support of formula (I) wherein $R^{2b}$ is $C(O)-L^7-C(O)OH$ with a nucleoside or nucleotide at a 3' or 5' OH to provide the functionalized solid support of formula (I) having formula (IX-a)

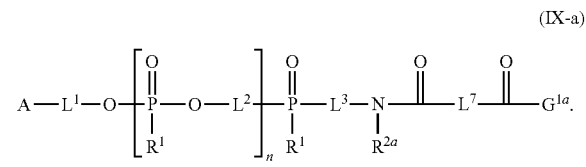

In another aspect, the invention provides a process for preparing the functionalized solid support of formula (I), wherein $G^1$ is $-P(O)(R^1)-L^3-R^2$, comprising reacting the functionalized solid support of formula (I) wherein $R^{2b}$ is $C(O)-L^7-OH$ with a compound of formula (VII), wherein $R^{20}$ and $R^{21}$ are independently $C_{1-6}$alkyl and $G^{1a}$ is a nucleotide moiety or a nucleoside moiety

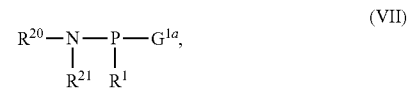

to provide a functionalized solid support of formula (VIII-a),

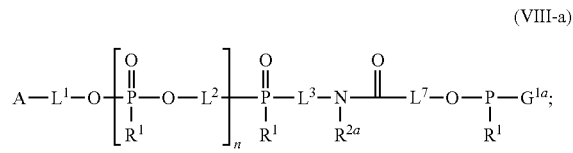

and
oxidizing the functionalized solid support of formula (VIII-a) to provide the functionalized solid support of formula (I) having formula (X-a)

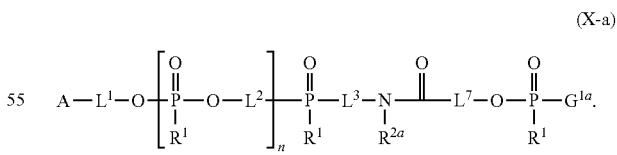

In another aspect, the invention provides a method of synthesizing an oligonucleotide.

DETAILED DESCRIPTION

1. Definitions

Figure 1A:
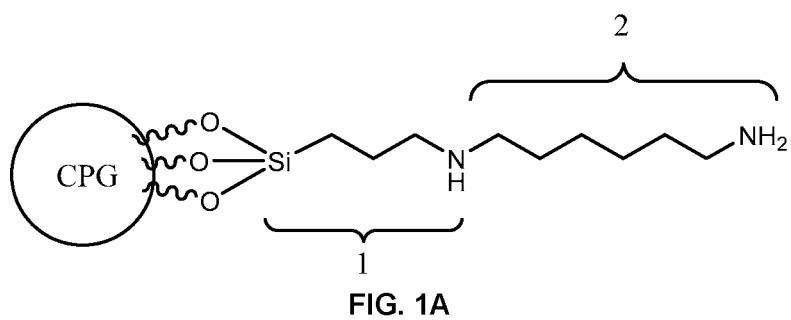
FIG. 1A shows a controlled pore glass (CPG) functionalized with a chain having a first part 1 derived from 3-aminopropylsilane and a second part 2 referred to as Long Chain Alkyl Amine (LCAA).
Figure 1B:
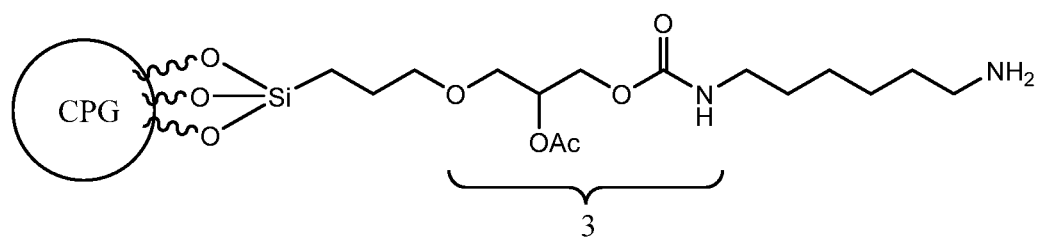
FIG. 1B shows a CPG functionalized with a chain having a part 3 derived from acetylglycerol.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an," and "the" include plural references unless the context clearly dictates otherwise. The present disclosure also contemplates other embodiments "comprising," "consisting of," and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Definitions of specific functional groups and chemical terms are described in more detail below. For purposes of this disclosure, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

The term "alkyl," as used herein, means a straight or branched, saturated hydrocarbon chain. The term "lower alkyl" or "$C_{1-6}$alkyl" means a straight or branched chain hydrocarbon containing from 1 to 6 carbon atoms. The term "$C_{1-4}$alkyl" means a straight or branched chain saturated hydrocarbon containing from 1 to 4 carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, and n-decyl.

The term "alkenyl," as used herein, means a straight or branched, hydrocarbon chain containing at least one carbon-carbon double bond.

The term "alkylene," as used herein, refers to a divalent group derived from a straight or branched saturated chain hydrocarbon, for example, of 1 to 6 carbon atoms. Representative examples of alkylene include, but are not limited to, —CH$_2$CH$_2$—, —CH$_2$CH$_2$CH$_2$—, —CH$_2$CH$_2$CH$_2$CH$_2$—, and —CH$_2$CH$_2$CH$_2$CH$_2$CH$_2$—.

The term "alkenylene," as used herein, refers to a divalent group derived from a straight or branched chain hydrocarbon having at least one carbon-carbon double bond The term "alkoxy," as used herein, refers to a group —O-alkyl. Representative examples of alkoxy include, but are not limited to, methoxy, ethoxy, propoxy, 2-propoxy, butoxy and tert-butoxy.

The term "alkoxyalkyl," as used herein, refers to an alkoxy group, as defined herein, appended to the parent molecular moiety through an alkylene group, as defined herein.

The term "aryl," as used herein, refers to a phenyl or a phenyl appended to the parent molecular moiety and fused to a cycloalkane group (e.g., the aryl may be indan-4-yl), fused to a 6-membered arene group (i.e., the aryl is naphthyl), or fused to a non-aromatic heterocycle (e.g., the aryl may be benzo[d][1,3]dioxol-5-yl). The term "phenyl" is used when referring to a substituent and the term 6-membered arene is used when referring to a fused ring. The 6-membered arene is monocyclic (e.g., benzene or benzo). The aryl may be monocyclic (phenyl) or bicyclic (e.g., a 9- to 12-membered fused bicyclic system).

The term "cycloalkyl" or "cycloalkane," as used herein, refers to a saturated ring system containing all carbon atoms as ring members and zero double bonds. The term "cycloalkyl" is used herein to refer to a cycloalkane when present as a substituent. A cycloalkyl may be a monocyclic cycloalkyl (e.g., cyclopropyl), a fused bicyclic cycloalkyl (e.g., decahydronaphthalenyl), spirocyclic, or a bridged cycloalkyl in which two non-adjacent atoms of a ring are linked by an alkylene bridge of 1, 2, 3, or 4 carbon atoms (e.g., bicyclo [2.2.1]heptanyl). Representative examples of cycloalkyl include, but are not limited to, cyclopropyl, cyclobutyl, cyclopentyl, cyclohexyl, cycloheptyl, cyclooctyl, cyclononyl, cyclodecyl, adamantyl, and bicyclo[1.1.1]pentanyl.

The term "cycloalkenyl" or "cycloalkene," as used herein, means a non-aromatic monocyclic or multicyclic ring system containing all carbon atoms as ring members and at least one carbon-carbon double bond and preferably having from 5-10 carbon atoms per ring. The term "cycloalkenyl" is used herein to refer to a cycloalkene when present as a substituent. A cycloalkenyl may be a monocyclic cycloalkenyl (e.g., cyclopentenyl), a fused bicyclic cycloalkenyl (e.g., octahydronaphthalenyl), or a bridged cycloalkenyl in which two non-adjacent atoms of a ring are linked by an alkylene bridge of 1, 2, 3, or 4 carbon atoms (e.g., bicyclo[2.2.1] heptenyl). Exemplary monocyclic cycloalkenyl rings include cyclopentenyl, cyclohexenyl or cycloheptenyl.

The term "fluoroalkyl," as used herein, means an alkyl group, as defined herein, in which one, two, three, four, five, six, seven or eight hydrogen atoms are replaced by fluorine. Representative examples of fluoroalkyl include, but are not limited to, 2-fluoroethyl, 2,2,2-trifluoroethyl, trifluoromethyl, difluoromethyl, pentafluoroethyl, and trifluoropropyl such as 3,3,3-trifluoropropyl.

The term "halogen" or "halo," as used herein, means Cl, Br, I, or F.

The term "haloalkyl," as used herein, means an alkyl group, as defined herein, in which one, two, three, four, five, six, seven or eight hydrogen atoms are replaced by a halogen.

The term "heteroaryl," as used herein, refers to an aromatic monocyclic heteroatom-containing ring (monocyclic heteroaryl) or a bicyclic ring system containing at least one monocyclic heteroaromatic ring (bicyclic heteroaryl). The term "heteroaryl" is used herein to refer to a heteroarene when present as a substituent. The monocyclic heteroaryl are five or six membered rings containing at least one heteroatom independently selected from the group consisting of N, O and S (e.g. 1, 2, 3, or 4 heteroatoms independently selected from O, S, and N). The five membered aromatic monocyclic rings have two double bonds and the six membered aromatic monocyclic rings have three double bonds. The bicyclic heteroaryl is an 8- to 12-membered ring system and includes a fused bicyclic heteroaromatic ring system (i.e., 10π electron system) such as a monocyclic heteroaryl ring fused to a 6-membered arene (e.g., quinolin-4-yl, indol-1-yl), a monocyclic heteroaryl ring fused to a monocyclic heteroarene (e.g., naphthyridinyl), and a phenyl fused to a monocyclic heteroarene (e.g., quinolin-5-yl, indol-4-yl). A bicyclic heteroaryl/heteroarene group includes a 9-membered fused bicyclic heteroaromatic ring system having four double bonds and at least one heteroatom contributing a lone electron pair to a fully aromatic 10π electron system, such as ring systems with a nitrogen atom at the ring junction (e.g., imidazopyridine) or a benzoxadiazolyl. A bicyclic heteroaryl also includes a fused bicyclic ring system composed of one heteroaromatic ring and one non-aromatic ring such as a monocyclic heteroaryl ring fused to a monocyclic carbocyclic ring (e.g., 6,7-dihydro-5H-cyclopenta[b]pyridinyl), or a monocyclic heteroaryl ring fused to a monocyclic heterocycle (e.g., 2,3-dihydrofuro[3,2-b]pyridinyl). The bicyclic heteroaryl is attached to the parent molecular moiety at an aromatic ring atom. Other representative examples of heteroaryl include, but are not limited to, indolyl (e.g., indol-1-yl, indol-2-yl, indol-4-yl), pyridinyl (including pyridin-2-yl, pyridin-3-yl, pyridin-4-yl), pyrimidinyl, pyrazinyl, pyridazinyl, pyrazolyl (e.g., pyrazol-4-yl), pyrrolyl, benzopyrazolyl, 1,2,3-triazolyl (e.g., triazol-4-yl), 1,3,4-thiadiazolyl, 1,2,4-thiadiazolyl, 1,3,4-oxadiazolyl, 1,2,4-oxadiazolyl, imidazolyl, thiazolyl (e.g., thiazol-4-yl), isothiazolyl, thienyl, benzimidazolyl (e.g., benzimidazol-5-yl), benzothiazolyl, benzoxazolyl, benzoxadiazolyl, benzothienyl, benzofuranyl, isobenzofuranyl, furanyl, oxazolyl, isoxazolyl, purinyl, isoindolyl, quinoxalinyl, indazolyl (e.g., indazol-4-yl, indazol-5-yl), quinazolinyl, 1,2,4-triazinyl, 1,3,5-triazinyl, isoquinolinyl, quinolinyl, imidazo[1,2-a]pyridinyl (e.g., imidazo[1,2-a]pyridin-6-yl), naphthyridinyl, pyridoimidazolyl, thiazolo[5,4-b]pyridin-2-yl, and thiazolo[5,4-d]pyrimidin-2-yl.

The term "heterocycle" or "heterocyclic," as used herein, means a monocyclic heterocycle, a bicyclic heterocycle, or a tricyclic heterocycle. The term "heterocyclyl" is used herein to refer to a heterocycle when present as a substituent. The monocyclic heterocycle is a three-, four-, five-, six-, seven-, or eight-membered ring containing at least one heteroatom independently selected from the group consisting of O, N, and S. The three- or four-membered ring contains zero or one double bond, and one heteroatom selected from the group consisting of O, N, and S. The five-membered ring contains zero or one double bond and one, two or three heteroatoms selected from the group consisting of O, N and S. The six-membered ring contains zero, one or two double bonds and one, two, or three heteroatoms selected from the group consisting of O, N, and S. The seven- and eight-membered rings contains zero, one, two, or three double bonds and one, two, or three heteroatoms selected from the group consisting of O, N, and S. Representative examples of monocyclic heterocyclyls include, but are not limited to, azetidinyl, azepanyl, aziridinyl, diazepanyl, 1,3-dioxanyl, 1,3-dioxolanyl, 1,3-dithiolanyl, 1,3-dithianyl, imidazolinyl, imidazolidinyl, isothiazolinyl, isothiazolidinyl, isoxazolinyl, isoxazolidinyl, morpholinyl, 2-oxo-3-piperidinyl, 2-oxoazepan-3-yl, oxadiazolinyl, oxadiazolidinyl, oxazolinyl, oxazolidinyl, oxetanyl, oxepanyl, oxocanyl, piperazinyl, piperidinyl, pyranyl, pyrazolinyl, pyrazolidinyl, pyrrolinyl, pyrrolidinyl, tetrahydrofuranyl, tetrahydropyranyl, tetrahydropyridinyl, tetrahydrothienyl, thiadiazolinyl, thiadiazolidinyl, 1,2-thiazinanyl, 1,3-thiazinanyl, thiazolinyl, thiazolidinyl, thiomorpholinyl, 1,1-dioxidothiomorpholinyl (thiomorpholine sulfone), thiopyranyl, and trithianyl. The bicyclic heterocycle is a monocyclic heterocycle fused to a 6-membered arene, or a monocyclic heterocycle fused to a monocyclic cycloalkane, or a monocyclic heterocycle fused to a monocyclic cycloalkene, or a monocyclic heterocycle fused to a monocyclic heterocycle, or a monocyclic heterocycle fused to a monocyclic heteroarene, or a spiro heterocycle group, or a bridged monocyclic heterocycle ring system in which two non-adjacent atoms of the ring are linked by an alkylene bridge of 1, 2, 3, or 4 carbon atoms, or an alkenylene bridge of two, three, or four carbon atoms. The bicyclic heterocyclyl is attached to the parent molecular moiety at a non-aromatic ring atom (e.g., indolin-1-yl). Representative examples of bicyclic heterocyclyls include, but are not limited to, chroman-4-yl, 2,3-dihydrobenzofuran-2-yl, 2,3-dihydrobenzothien-2-yl, 1,2,3,4-tetrahydroisoquinolin-2-yl, 2-azaspiro[3.3]heptan-2-yl, 2-oxa-6-azaspiro[3.3]heptan-6-yl, azabicyclo[2.2.1]heptyl (including 2-azabicyclo[2.2.1]hept-2-yl), azabicyclo[3.1.0]hexanyl (including 3-azabicyclo[3.1.0]hexan-3-yl), 2,3-dihydro-1H-indol-1-yl, isoindolin-2-yl, octahydrocyclopenta[c]pyrrolyl, octahydropyrrolopyridinyl, tetrahydroisoquinolinyl, 7-oxabicyclo[2.2.1]heptanyl, hexahydro-2H-cyclopenta[b]furanyl, 2-oxaspiro[3.3]heptanyl, and 3-oxaspiro[5.5]undecanyl. Tricyclic heterocycles are exemplified by a bicyclic heterocycle fused to a 6-membered arene, or a bicyclic heterocycle fused to a monocyclic cycloalkane, or a bicyclic heterocycle fused to a monocyclic cycloalkene, or a bicyclic heterocycle fused to a monocyclic heterocycle, or a bicyclic heterocycle in which two non-adjacent atoms of the bicyclic ring are linked by an alkylene bridge of 1, 2, 3, or 4 carbon atoms, or an alkenylene bridge of two, three, or four carbon atoms. Examples of tricyclic heterocycles include, but are not limited to, octahydro-2,5-epoxypentalene, hexahydro-2H-2,5-methanocyclopenta[b]furan, hexahydro-1H-1,4-methanocyclopenta[c]furan, aza-adamantane (1-azatricyclo[3.3.1.1.3,7]decane), and oxa-adamantane (2-oxatricyclo[3.3.1.1.3,7]decane). The monocyclic, bicyclic, and tricyclic heterocyclyls are connected to the parent molecular moiety at a non-aromatic ring atom.

The term "hydroxyl" or "hydroxy," as used herein, means an —OH group.

The term "hydroxyalkyl," as used herein, means at least one —OH group, is appended to the parent molecular moiety through an alkylene group, as defined herein.

Terms such as cycloalkylene, arylene, phenylene, heterocyclylene, etc. refer to divalent groups derived from the base ring, e.g., cycloalkane, heterocycle, etc. For purposes of illustration, examples of cycloalkylene and phenylene include, respectively,

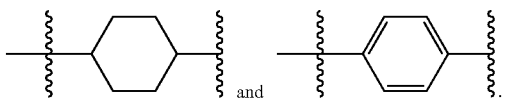

Cycloalkylene includes a 1,1-cycloalkylene

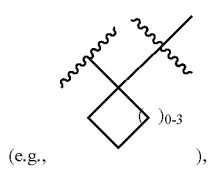

such as 1,1-cyclopropylene

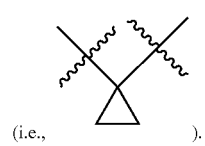 [SMILES: *C1(*)CC1]

Terms such as "alkyl," "cycloalkyl," "alkylene," etc. may be preceded by a designation indicating the number of atoms present in the group in a particular instance (e.g., "$C_{1-4}$alkyl," "$C_{3-6}$cycloalkyl," "$C_{1-4}$alkylene"). These designations are used as generally understood by those skilled in the art. For example, the representation "C" followed by a subscripted number indicates the number of carbon atoms present in the group that follows. Thus, "$C_3$alkyl" is an alkyl group with three carbon atoms (i.e., n-propyl, isopropyl). Where a range is given, as in "$C_{1-4}$," the members of the group that follows may have any number of carbon atoms falling within the recited range. A "$C_{1-4}$alkyl," for example, is an alkyl group having from 1 to 4 carbon atoms, however arranged (i.e., straight chain or branched).

For compounds described herein, groups and substituents thereof may be selected in accordance with permitted valence of the atoms and the substituents, such that the selections and substitutions result in a stable compound, e.g., which does not spontaneously undergo transformation such as by rearrangement, cyclization, elimination, etc.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. Functionalized Solid Supports

Aspects of the invention provide functionalized solid supports of formula (I), wherein A, $L^1$, $L^2$, $R^1$, $G^1$, and n are as defined herein.

In the solids supports of formula (I), A is a solid support material suitable for oligonucleotide synthesis. Suitable solid support materials include controlled-pore glass (CPG), silica gel, a macroporous cross-linked polystyrene, a polymethacrylate vinyl alcohol copolymer, a silicon chip, glass, a polystyrene bead, a polypropylene sheet, a nonporous silica bead, a polyacrylamide, or a polyacrylate. Solid supports are well known in the art, as described in "Solid-Phase Supports for Oligonucleotide Synthesis" in Current Protocols in Nucleic Acid Chemistry 2000, Chapter 3, section 3.1. CPG may have pore sizes appropriate to accommodate oligonucleotide synthesis (e.g., 300-2000 Å), for example 1000 or 2000 Å. The CPG support may have particle size of 40-500 mesh, a bulk density of 0.1-1.0 g/cc, SS Area of 10-200 $M^2$/g, and pore volume of 0.2-3.0 50 cc/g.

In formula (I), $L^1$ is a divalent chemical linker composed of atoms selected from the group consisting of carbon, hydrogen, oxygen, nitrogen, sulfur, phosphorus, silicon, and halogen, wherein (a) the atoms of the divalent linker are arranged to form an optionally substituted chain, or an optionally substituted chain interrupted by an optionally substituted ring; and (b) the chain or chain and ring together comprise a 12- to 40-membered contiguous linear arrangement of atoms selected from the group consisting of carbon, oxygen, nitrogen, sulfur, phosphorus, and silicon.

A 12- to 40-membered contiguous linear arrangement of atoms refers to an unbroken string of atoms, at least some of the atoms being chain or non-ring atoms and optionally some of the atoms being ring atoms. A 12- to 40-membered contiguous linear arrangement of atoms is illustrated by the following examples, where the atoms of the contiguous linear atom arrangements are shown in bold.

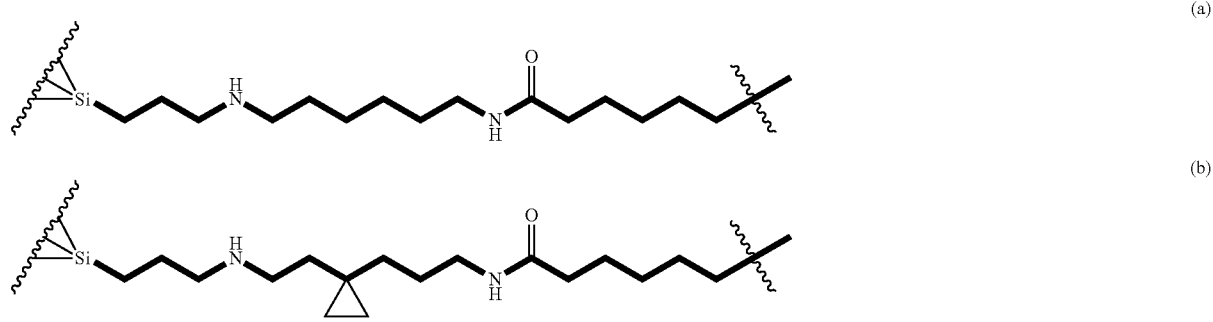

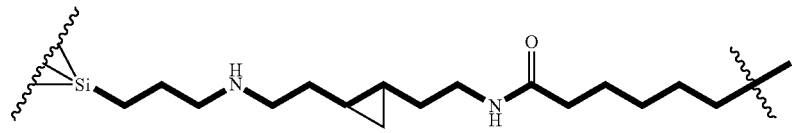

(c)

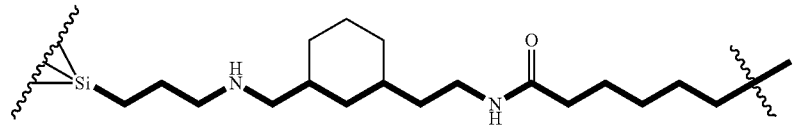

(d)

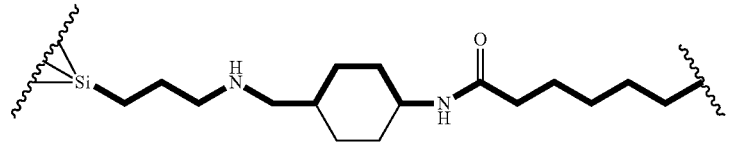

(e)

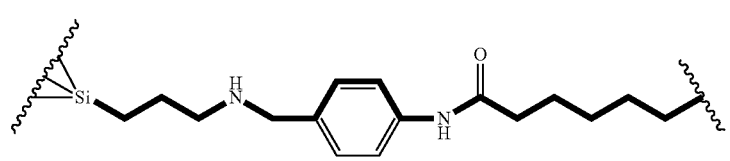

(f)

In contiguous linear arrangement (a), all atoms of the arrangement are chain atoms. Contiguous linear arrangements (b)-(f) contain a mixture of chain and ring atoms, with (b) having one ring atom, (c) having two ring atoms, (d) having three ring atoms, and (e) and (f) having four ring atoms.

The contiguous linear arrangement may have unsaturated bonds between adjacent atoms, such as

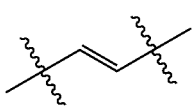 [SMILES: */C=C/*]

or as in (f).

Optional substituents on $L^1$ include halogen (e.g., fluoro), $C_{1-6}$alkyl (e.g., methyl), $C_{1-6}$haloalkyl (e.g., trifluoromethyl), oxo (i.e., =O), thione (i.e., =S), OH, —O$C_{1-6}$alkyl (e.g., methoxy), —O$C_{3-6}$cycloalkyl, —OCH$_2$C$_{3-6}$cycloalkyl, —OC(O)C$_{1-6}$alkyl (e.g., —OC(O)CH$_3$), —OC(O)C$_{3-6}$cycloalkyl, —OC(O)CH$_2$C$_{3-6}$cycloalkyl, $C_{1-6}$hydroxyalkyl, and $C_{1-6}$alkoxyC$_{1-6}$alkyl (e.g., —CH$_2$CH$_2$OCH$_3$). Optional substitution on $L^1$ allows for $L^1$ to have a branching structure.

$L^1$, together with its optional substitution, may comprise various functional groups such as amines (e.g., —NH—, —N(C$_{1-6}$alkyl)-), amides (e.g., —NHC(O)—, —N(C$_{1-6}$alkyl)C(O)—), thioamides (e.g., —NHC(S)—, —N(C$_{1-6}$alkyl)C(S)—), ether (—O—), ester (—OC(O)—), thioester (—OC(S)—), sulfide (—S—), sulfoxide (—S(O)—), sulfone (—S(O)$_2$—), sulfonamide (e.g., —NHS(O)$_2$—, —N(C$_{1-6}$alkyl)S(O)$_2$—), silyl, alkylorthosilicate (e.g., —OSi(OC$_{1-6}$alkyl)$_2$O—), carbamates (e.g., —NHC(O)O—, —N(C$_{1-6}$alkyl)C(O)O—), ureas (e.g., —NHC(O)NH—, —N(C$_{1-6}$alkyl)C(O)NH—, —N(C$_{1-6}$alkyl)C(O)N(C$_{1-6}$alkyl)-), hydrazide (e.g., —NHNHC(O)—), guanidine (e.g., —NHC(NH)=N—), and phosphate ester (e.g., —OP(O)(OC$_{1-6}$alkyl)O—). Thus, $L^1$ may comprise one or more covalently bonded members including heteroatom-containing functional groups, alkylene, alkenylene, alkynylene, cycloalkylene, heterocyclylene, arylene (e.g., phenylene), and heteroarylene groups. For example, $L^1$ may comprise one or more covalently bonded members independently selected from the group consisting of $C_{2-10}$alkylene, —NH—, —NHC(O)—, silyl, and —OCH$_2$CH(OC(O)C$_{1-4}$alkyl)CH$_2$O—. $L^1$ may be a $C_{11-39}$alkylene bonded to a silyl group, the silyl group being bonded to the solid support material, wherein 2-6 methylene units of the $C_{11-39}$alkylene are replaced with —NH—, —O—, or —NHC(O)—, and the $C_{11-39}$alkylene is optionally substituted with —OC(O)CH$_3$. $L^1$ may be $L^{1a}$-$L^{1b}$, wherein $L^{1a}$ is bonded to the solid support material. $L^{1a}$ may be -silyl-C$_{2-4}$alkylene-NH—C$_{2-10}$alkylene-NH—. $L^{1a}$ may be -silyl-C$_{2-4}$alkylene-NH—C$_{3-10}$cycloalkylene-NH—. $L^{1a}$ may be -silyl-C$_{2-4}$alkylene-C(O)NH—C$_{2-10}$alkylene-NH—. $L^{1a}$ may be -silyl-C$_{2-4}$alkylene-NH—C(O)C$_{2-10}$alkylene-C(O)NH—C$_{2-10}$alkylene-NH—. $L^{1a}$ may be -silyl-C$_{2-4}$alkylene-NHC(O)NH—C$_{2-10}$alkylene-NH—. $L^{1b}$ may be a —C(O)C$_{1-10}$alkylene-. $L^1$ may be -silyl-C$_{2-4}$alkylene-NH—C$_{2-10}$alkylene-NHC(O)—C$_{2-10}$alkylene- or -silyl-C$_{2-4}$alkylene-OCH$_2$CH(OC(O)CH$_3$)CH$_2$OC(O)NH—C$_{2-10}$alkylene-NHC(O)—C$_{2-10}$alkylene-. $L^1$ may be -silyl-(CH$_2$)$_3$—NH—(CH$_2$)$_6$—NHC(O)—(CH$_2$)$_5$— or -silyl-(CH$_2$)$_3$—OCH$_2$CH(OC(O)CH$_3$)CH$_2$OC(O)NH—(CH$_2$)$_6$—NHC(O)—(CH$_2$)$_5$—.

When $L^1$ comprises a terminal silyl group, the silyl group may bond to oxygen atoms on the solid support material, such as CPG shown in the following formula, wherein Si-$L^{1*}$ is $L^1$ (i.e., $L^{1*}$ represents $L^1$ minus one member (i.e., silyl) of its 12- to 40 membered contiguous linear arrangement of atoms).

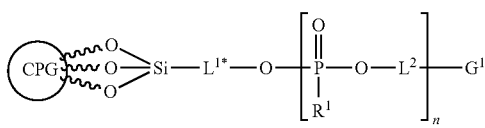

Other bonding arrangements of silyl to the solid support material are possible, e.g.,

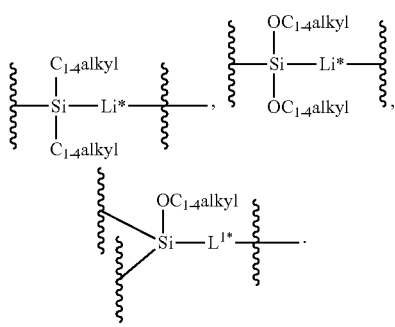

$L^2$, at each occurrence, is independently —(CH$_2$CH$_2$O)$_m$—, —(CHCH$_3$CH$_2$O)$_m$—, or —(CH$_2$CHCH$_{3O}$)$_m$—, wherein m is 3, 4, 5, 6, 7, 8, 9, or 10, i.e., the solid support of formula (I) is

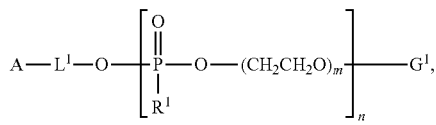

Preferably, $L^2$ is —(CH$_2$CH$_2$O)$_m$—. Preferably m is 6.

To further illustrate, functionalized solid supports of formula (I) include, for example,

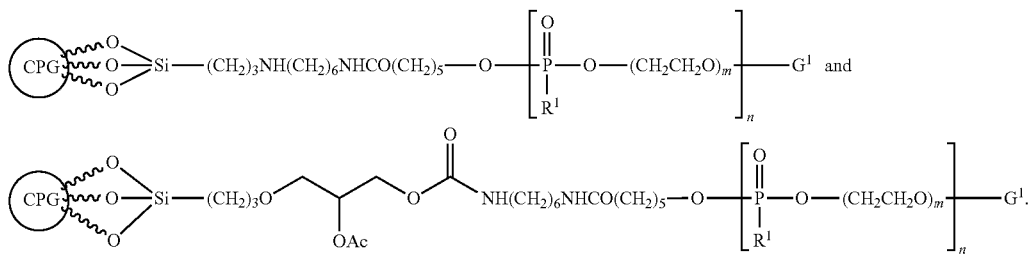

$R^1$, at each occurrence, is independently $R^{1a}$ or —OR$^{1a}$, wherein $R^{1a}$, at each occurrence, is independently C$_{1-10}$alkyl, C$_{2-10}$alkenyl, C$_{2-10}$alkynyl, C$_{3-10}$cycloalkyl, or C$_{5-10}$cycloalkenyl, wherein $R^{1a}$ is optionally substituted with 1-6 substituents independently selected from the group consisting of halogen (e.g., fluoro), cyano, oxo, OH, —OC$_{1-4}$alkyl, —OC$_{1-4}$haloalkyl, or C$_{3-6}$cycloalkyl, the C$_{3-6}$cycloalkyl being optionally substituted with halogen (e.g., fluoro) or C$_{1-4}$alkyl. $R^1$, at each occurrence, may independently be C$_{1-4}$alkyl, —OC$_{1-4}$alkyl, or —OCH$_2$CH$_2$CN. $R^1$, at each occurrence, may independently be —CH$_3$, —CH$_2$CH$_3$, —OCH$_3$, —OCH$_2$CH$_3$, —OCH(CH$_3$)$_2$, or —OCH$_2$CH$_2$CN.

$G^L$ may be hydrogen, i.e., formula (I) terminates on the right-hand side in a hydroxy group.

$G^L$ may be PG$^1$, wherein PG$^L$ is a hydroxy protecting group. Hydroxy protecting groups are well known in the art, as described in PGM Wuts and TW Greene, in Greene's book titled Protective Groups in Organic Synthesis (4$^{th}$ ed.), John Wiley & Sons, NY (2006), which is incorporated herein by reference in its entirety. Suitable hydroxy protecting groups include, for example, trityl groups (e.g., trityl, dimethoxytrityl, methoxytrityl), acetyl, benzoyl, benzyl, p-methoxybenzyl, β-methoxyethoxymethyl (MEM), methoxymethyl (MOM), methylthiomethyl, pivaloyl, tetrahydropyranyl (THP), tetrahydrofuranyl (THF), silyl (e.g., trimethylsilyl (TMS), tert-butyldimethylsilyl (TBDMS), triisopropylsilyloxymethyl (TOM), triisopropylsilyl (TIPS), methyl, and ethoxyethyl.

$G^1$ may be —P(O)(R$^1$)-L$^3$-R$^2$, wherein R$^1$, R$^2$, and L$^3$ are as described herein.

$L^3$ is —(OCH$_2$CH$_2$)$_p$—, —(OCHCH$_3$CH$_2$)$_p$—, —(OCH$_2$CHCH$_3$)$_p$—, —OC$_{2-10}$alkylene-, —OC$_{0-4}$alkylene-C$_{3-10}$cycloalkylene-C$_{0-4}$alkylene-, or —OC$_{0-4}$alkylene-phenylene-C$_{0-4}$alkylene-, wherein the alkylene in L$^3$ is optionally substituted with 1-6 halogen (e.g., fluoro), and the cycloalkylene and phenylene are optionally substituted with 1-4 substituents independently selected from the group consisting of halogen, C$_{1-4}$alkyl, C$_{1-4}$haloalkyl, cyano, —OC$_{1-4}$alkyl, and —OC$_{1-4}$haloalkyl; and p is 3, 4, 5, 6, 7, 8, 9, or 10. Preferably, p is 6.

$L^3$ may be —(OCH$_2$CH$_2$)$_p$—, such as —(OCH$_2$CH$_2$)$_6$—.

$L^3$ may be —OC$_{2-10}$alkylene-, such as —OC$_{4-8}$alkylene-, —OC$_6$alkylene-, or —O(CH$_2$)$_6$—.

$R^2$ is —NR$^{2a}$R$^{2b}$, wherein R$^{2a}$ is hydrogen, C$_{1-6}$alkyl, C$_{1-6}$haloalkyl, C$_{3-6}$cycloalkyl, or —C$_{1-3}$alkylene-C$_{3-6}$cycloalkyl; R$^{2b}$ is hydrogen, PG$^2$, C(O)-L$^4$-OH, C(O)-L$^4$-OPG$^3$, C(O)-L$^4$-G$^{1a}$, C(O)-L$^5$-H, C(O)-L$^5$-PG$^1$, C(O)-L$^5$-P(O)(R$^1$)-G$^{1a}$, C(O)-L$^5$-P(O)(OH)-G$^{1a}$, or C(O)-L$^6$-G$^{1a}$, or R$^{2a}$ and R$^{2b}$, together with the nitrogen to which they attach form a protected nitrogen atom (e.g., phthalimide).

$R^{2a}$ and $R^{2b}$ may each be hydrogen (i.e., R$^2$ is NH$_2$).

$R^{2a}$ may be hydrogen, C$_{1-6}$alkyl, C$_{1-6}$haloalkyl, C$_{3-6}$cycloalkyl, or —C$_{1-3}$alkylene-C$_{3-6}$cycloalkyl; wherein R$^{2b}$ is PG$^2$, and PG$^2$ is an amino protecting group. Amino protecting groups are well known in the art, as described in PGM Wuts and TW Greene, in Greene's book titled Protective Groups in Organic Synthesis (4$^{th}$ ed.), John Wiley & Sons, NY (2006). Suitable amino protecting groups include, for example, carbobenzyloxy (Cbz), p-methoxybenzylcarbonyl (MeOZ), tert-butoxycarbonyl (BOC), 9-fluorenylmethyloxycarbonyl (Fmoc), acetyl, benzoyl, benzyl, carbamate, p-methoxybenzyl (PMB), 3,4-dimethoxybenzyl (DMPM), p-methoxyphenyl (PMP), tosyl, and trichloroethylcarbonyl (Troc). $R^{2a}$ may be hydrogen, wherein $R^{2b}$ is PG$^2$, and PG$^2$ is preferably BOC.

$R^{2a}$ may be hydrogen, $C_{1-6}$alkyl, $C_{1-6}$haloalkyl, $C_{3-6}$cycloalkyl, or —$C_{1-3}$alkylene-$C_{3-6}$cycloalkyl; wherein $R^{2b}$ is C(O)-L$^4$-OH, C(O)-L$^4$-OPG$^3$, or C(O)-L$^4$-G$^{1a}$; and L$^4$ is C(O) or L$^7$-C(O). Accordingly, L$^4$ bonds to the OH, OPG$^3$, and G$^{1a}$ by a C(O) moiety. $R^{2b}$ may be C(O)—C(O)—OH, C(O)—C(O)—OPG$^3$, or C(O)—C(O)-G$^{1a}$. Alternatively, $R^{2b}$ may be C(O)-L$^7$-C(O)—OH, C(O)-L$^7$-C(O)—OPG$^3$, or C(O)-L$^7$-C(O)-G$^{1a}$, when L$^4$ is L$^7$-C(O). $R^{2a}$ may be hydrogen, wherein $R^{2b}$ is C(O)-L$^4$-OH, C(O)-L$^4$-OPG$^3$, or C(O)-L$^4$-G$^{1a}$, wherein L$^4$ is as shown or described herein.

L$^7$ is a divalent chemical linker composed of atoms selected from the group consisting of carbon, hydrogen, oxygen, nitrogen, sulfur, phosphorus, silicon, and halogen, wherein (a) the atoms of the divalent linker are arranged to form an optionally substituted chain, an optionally substituted ring, or a combination of optionally substituted chain(s) and ring(s); and (b) the chain(s), ring(s), or combination thereof comprise a 1-to 20-membered contiguous linear arrangement of atoms selected from the group consisting of carbon, oxygen, nitrogen, sulfur, phosphorus, and silicon. The 1- to 20-membered contiguous linear arrangement of atoms in L$^7$ refers to an unbroken string of atoms analogous to L$^1$.

Optional substituents on L$^7$ include halogen (e.g., fluoro), $C_{1-6}$alkyl (e.g., methyl), $C_{1-6}$haloalkyl (e.g., trifluoromethyl), oxo (i.e., =O), thione (i.e., =S), OH, —OC$_{1-6}$alkyl (e.g., methoxy), —OC$_{3-6}$cycloalkyl, —OCH$_2$C$_{3-6}$cycloalkyl, —OC(O)C$_{1-6}$alkyl (e.g., —OC(O)CH$_3$), —OC(O)C$_{3-6}$cycloalkyl, —OC(O)CH$_2$C$_{3-6}$cycloalkyl, $C_{1-6}$hydroxyalkyl, and $C_{1-6}$alkoxyC$_{1-6}$alkyl (e.g., —CH$_2$CH$_2$OCH$_3$). Optional substitution on L$^7$ allows for L$^7$ to have a branching structure.

L$^7$, together with its optional substitution, may comprise various functional groups such as amines (e.g., —NH—, —N(C$_{1-6}$alkyl)-), amides (e.g., —NHC(O)—, —N(C$_{1-6}$alkyl)C(O)—), thioamides (e.g., —NHC(S)—, —N(C$_{1-6}$alkyl)C(S)—), ether (—O—), ester (—OC(O)—), thioester (—OC(S)—), sulfide (—S—), sulfoxide (—S(O)—), sulfone (—S(O)$_2$—), sulfonamide (e.g., —NHS(O)$_2$—, —N(C$_{1-6}$alkyl)S(O)$_2$—), silyl, alkylorthosilicate (e.g., —OSi(OC$_{1-6}$alkyl)$_2$O—), carbamates (e.g., —NHC(O)O—, —N(C$_{1-6}$alkyl)C(O)O—), ureas (e.g., —NHC(O)NH—, —N(C$_{1-6}$alkyl)C(O)NH—, —N(C$_{1-6}$alkyl)C(O)N(C$_{1-6}$alkyl)-), hydrazide (e.g., —NHNHC(O)—), guanidine (e.g., —NHC(NH)=N—), and phosphate ester (e.g., —OP(O)(OC$_{1-6}$alkyl)O—). Thus, L$^7$ may comprise one or more covalently bonded members including heteroatom-containing functional groups, alkylene, alkenylene, alkynylene, cycloalkylene, heterocyclylene, arylene (e.g., phenylene), and heteroarylene groups.

L$^4$ may be —C$_{0-4}$alkylene-C(O)—, —C$_{1-3}$alkylene-O—C$_{1-3}$alkylene-C(O)—, —C$_{1-3}$alkylene-N(C$_{1-3}$alkyl)C(O)—C$_{1-3}$alkylene-C(O)—, -phenylene-C(O)—, —C$_{1-3}$alkylene-O-phenylene-O—C$_{1-3}$alkylene-C(O)—, -phenylene-C$_{1-3}$alkylene-O—C(O)—, —C$_{1-3}$alkylene-O-phenylene-C$_{1-3}$alkylene-O—C(O)—, —C$_{1-3}$alkylene-O-phenylene-C$_{1-3}$alkylene-O—C(O)—, —C$_{1-3}$alkylene-C(O)NH-fluorene-C$_{1-3}$alkylene-O—C(O)—, or

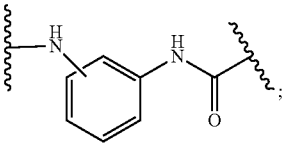

wherein the phenylene is optionally substituted with 1-4 substituents independently selected from the group consisting of NO$_2$, —OC$_{1-4}$alkyl, halogen, C$_{1-4}$alkyl, and C$_{1-4}$haloalkyl. Each of the preceding options for L$^4$ corresponds to L$^4$ being L$^7$-C(O), except for the —C$_0$—C(O)— of the —C$_{0-4}$alkylene-C(O)—. Thus, the L$^7$ in these examples are —C$_{1-4}$alkylene-, —C$_{1-3}$alkylene-O—C$_{1-3}$alkylene-, —C$_{1-3}$alkylene-N(C$_{1-3}$alkyl)C(O)—C$_{1-3}$alkylene-, -phenylene-, —C$_{1-3}$alkylene-O-phenylene-O—C$_{1-3}$alkylene-, -phenylene-C$_{1-3}$alkylene-O—, —C$_{1-3}$alkylene-O-phenylene-C$_{1-3}$alkylene-O—, —C$_{1-3}$alkylene-C(O)NH-fluorene-C$_{1-3}$alkylene-O—, or

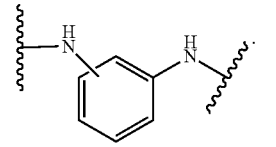

To further illustrate the bonding arrangement of L$^4$, C(O)-L$^4$-G$^{1a}$ may be C(O)—C$_{0-4}$alkylene-C(O)-G$^{1a}$, C(O)—C$_{1-3}$alkylene-O—C$_{1-3}$alkylene-C(O)-G$^{1a}$, C(O)—C$_{1-3}$alkylene-N(C$_{1-3}$alkyl)C(O)—C$_{1-3}$alkylene-C(O)-G$^{1a}$, C(O)-phenylene-C(O)-G$^{1a}$, C(O)—C$_{1-3}$alkylene-O-phenylene-O—C$_{1-3}$alkylene-C(O)-G$^{1a}$, C(O)-phenylene-C$_{1-3}$alkylene-O—C(O)-G$^{1a}$, C(O)—C$_{1-3}$alkylene-O-phenylene-C$_{1-3}$alkylene-O—C(O)-G$^{1a}$, C(O)—C$_{1-3}$alkylene-C(O)NH-fluorene-C$_{1-3}$alkylene-O—C(O)-G$^{1a}$, or

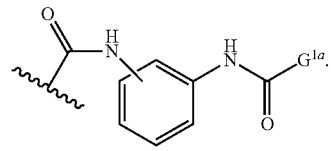

L$^4$ may be —C(O)— or L$^4$ may be —CH$_2$—C(O)—, —(CH$_2$)$_2$—C(O)—, —CH$_2$—O—CH$_2$—C(O)—, —CH$_2$—N(CH$_3$)C(O)—(CH$_2$)$_2$—C(O)—

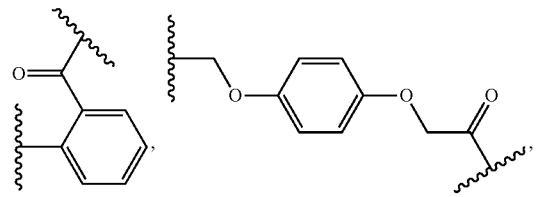

-continued

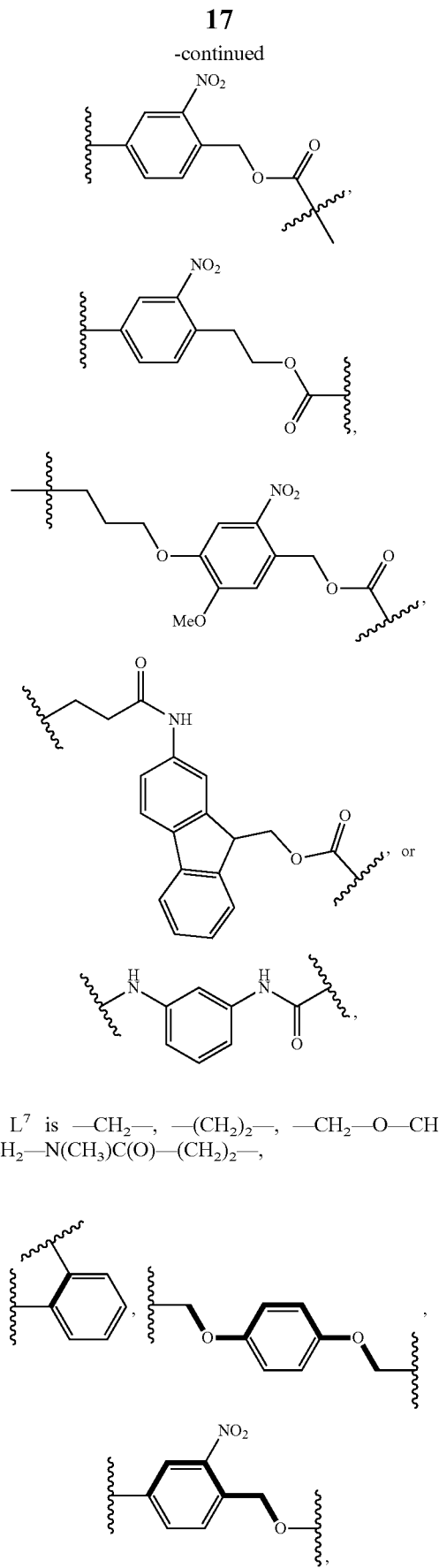

i.e., L⁷ is —CH₂—, —(CH₂)₂—, —CH₂—O—CH₂—, —CH₂—N(CH₃)C(O)—(CH₂)₂—,

-continued

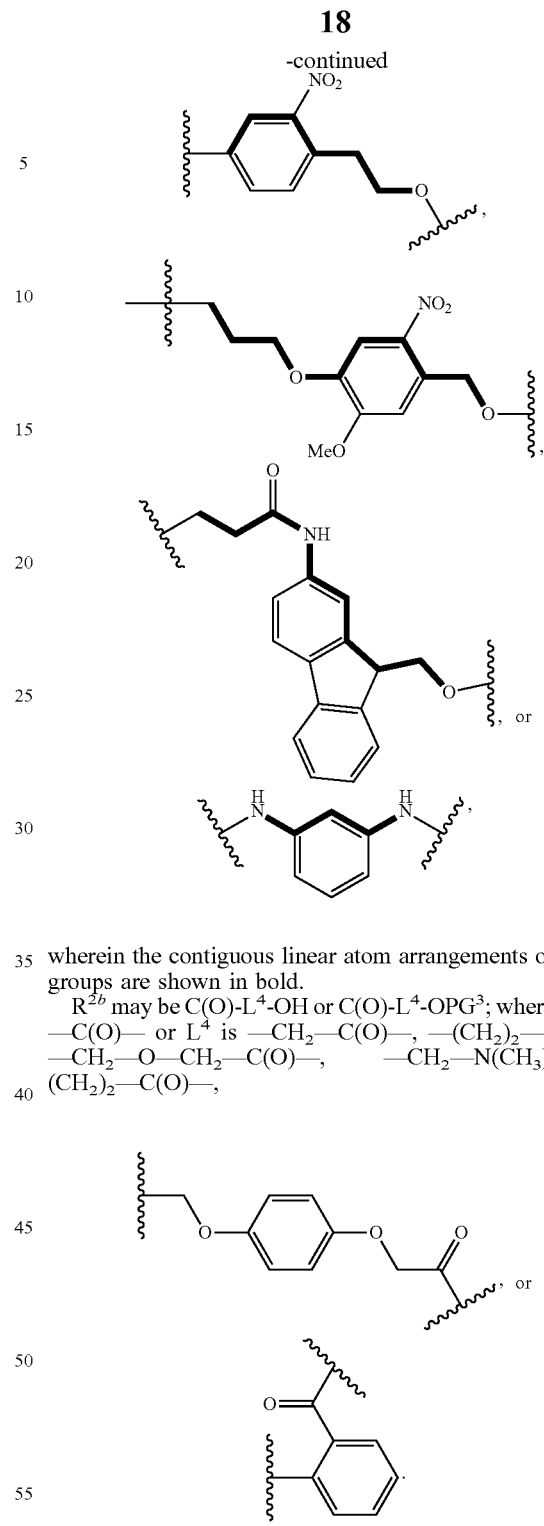

wherein the contiguous linear atom arrangements of the L⁷ groups are shown in bold.

$R^{2b}$ may be C(O)-L⁴-OH or C(O)-L⁴-OPG³; wherein L⁴ is —C(O)— or L⁴ is —CH₂—C(O)—, —(CH₂)₂—C(O)—, —CH₂—O—CH₂—C(O)—, —CH₂—N(CH₃)C(O)—(CH₂)₂—C(O)—, PG³ is carboxylic acid protecting group. Carboxylic acid protecting groups are well known in the art, as described in PGM Wuts and TW Greene, in Greene's book titled Protective Groups in Organic Synthesis (4ᵗʰ ed.), John Wiley & Sons, NY (2006). Suitable carboxylic acid protecting groups include, for example, methyl, benzyl, tert-butyl, 2,6-disubstituted phenols (e.g., 2,6-dimethylphenol, 2,6-diisopropylphenol, 2,6-di-tert-butylphenol), and silyl.

Functionalized solid supports of formula (I), wherein G¹ is —P(O)(R¹)-L³-R²; R² is —NR²ᵃR²ᵇ; and R²ᵇ is C(O)-

$L^4$-OH, C(O)-$L^4$-OPG$^3$, or C(O)-$L^4$-G$^{1a}$ have formula (I-A), (I-B), and (I-C), respectively, wherein A, $L^1$, $L^2$, $L^3$, $L^4$, $R^1$, $R^{2a}$, PG$^3$, n, and G$^{1a}$ are as defined herein.

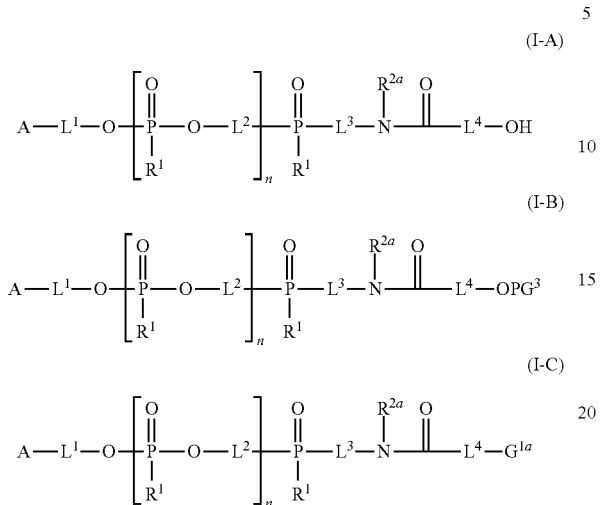

For example, in formulas (I-A), (I-B), and (I-C) are functionalized solid supports wherein $L^1$ is -silyl-(CH$_2$)$_3$—NH—(CH$_2$)$_6$—NHC(O)—(CH$_2$)$_5$— or -silyl-(CH$_2$)$_3$—OCH$_2$CH(OC(O)CH$_3$)CH$_2$OC(O)NH—(CH$_2$)$_6$—NHC(O)—(CH$_2$)$_5$—; $L^2$ is —(CH$_2$CH$_2$O)$_6$—; n is 4-7; $L^3$ is —O(CH$_2$)$_3$—; $R^1$, at each occurrence, is independently —CH$_3$, —CH$_2$CH$_3$, —OCH$_3$, —OCH$_2$CH$_3$, —OCH(CH$_3$)$_2$, or —OCH$_2$CH$_2$CN; $R^{2a}$ is hydrogen; $L^4$ is as defined herein, such as —C(O)—, —CH$_2$—C(O)—, —(CH$_2$)$_2$—C(O)—, —CH$_2$—O—CH$_2$—C(O)—, —CH$_2$—N(CH$_3$)C(O)—(CH$_2$)$_2$—C(O)—,

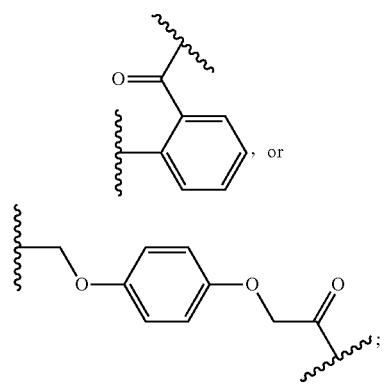

and PG$^3$ and G$^{1a}$ are as defined herein.

Further for example, in formulas (I-A), (I-B), and (I-C) are functionalized solid supports wherein $L^1$ is -silyl-(CH$_2$)$_3$—NH—(CH$_2$)$_6$—NHC(O)—(CH$_2$)$_5$— or -silyl-(CH$_2$)$_3$—OCH$_2$CH(OC(O)CH$_3$)CH$_2$OC(O)NH—(CH$_2$)$_6$—NHC(O)—(CH$_2$)$_5$—; $L^2$ is —(CH$_2$CH$_2$O)$_6$—; n is 4-7; $L^3$ is —(OCH$_2$CH$_2$)$_6$—; $R^1$, at each occurrence, is independently —CH$_3$, —CH$_2$CH$_3$, —OCH$_3$, —OCH$_2$CH$_3$, —OCH(CH$_3$)$_2$, or —OCH$_2$CH$_2$CN; $R^{2a}$ is hydrogen; $L^4$ is as defined herein, such as —C(O)—, —CH$_2$—C(O)—, —(CH$_2$)$_2$—C(O)—, —CH$_2$—O—CH$_2$—C(O)—, —CH$_2$—N(CH$_3$)C(O)—(CH$_2$)$_2$—C(O)—,

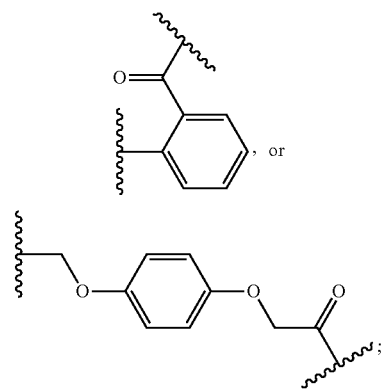

and PG$^3$ and G$^{1a}$ are as defined herein.

$R^{2a}$ may be hydrogen, C$_{1-6}$alkyl, C$_{1-6}$haloalkyl, C$_{3-6}$cycloalkyl, or —C$_{1-3}$alkylene-C$_{3-6}$cycloalkyl; wherein $R^{2b}$ is C(O)-$L^5$-H, C(O)-$L^5$-PG$^1$, C(O)-$L^5$-P(O)($R^1$)-G$^{1a}$, or C(O)-$L^5$-P(O)(OH)-G$^{1a}$; and $L^5$ is $L^7$-O, wherein $L^7$ is as defined herein. Accordingly, $L^5$ ($L^7$-O) bonds to the H, PG$^1$, P(O)($R^1$)-G$^{1a}$, and P(O)(OH)-G$^{1a}$ by an oxygen atom on the right-hand side of $L^5$.

$L^5$ (i.e., $L^7$-O) may be $L^{5b}$ or $L^{5a}$-$L^{5b}$, wherein $L^{5a}$ is —C$_{0-4}$alkylene-C(O)—, —C$_{1-3}$alkylene-O—C$_{1-3}$alkylene-C(O)—, —C$_{1-3}$alkylene-N(C$_{1-3}$alkyl)C(O)—C$_{1-3}$alkylene-C(O)—, -phenylene-C(O)—, —C$_{1-3}$alkylene-O-phenylene-O—C$_{1-3}$alkylene-C(O)—, -phenylene-C$_{1-3}$alkylene-O—C(O)—, —C$_{1-3}$alkylene-O-phenylene-C$_{1-3}$alkylene-O—C(O)—, or —C$_{1-3}$alkylene-C(O)NH-fluorene-C$_{1-3}$alkylene-O—C(O)—; $L^{5b}$ is

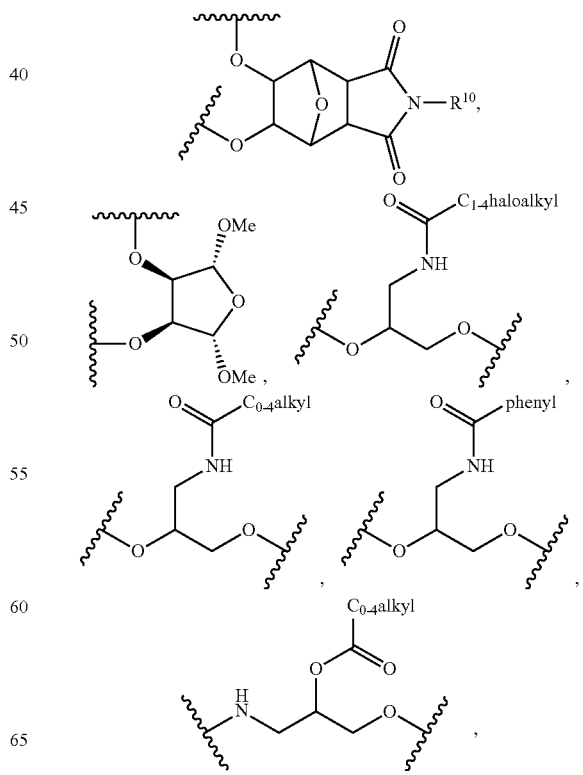

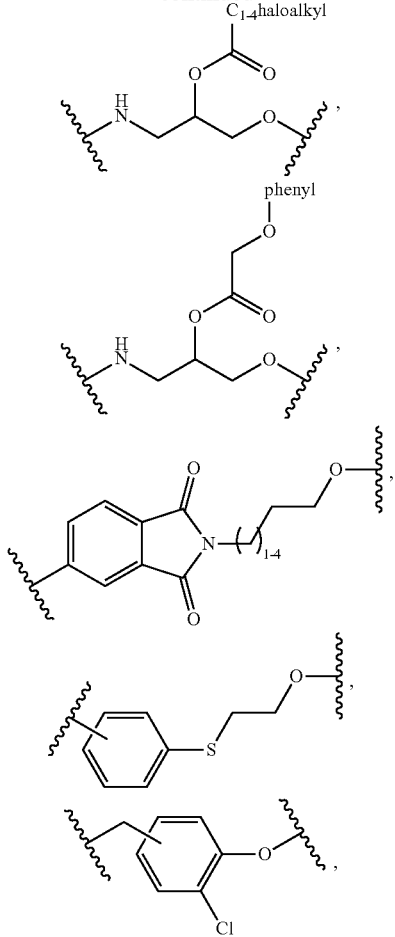

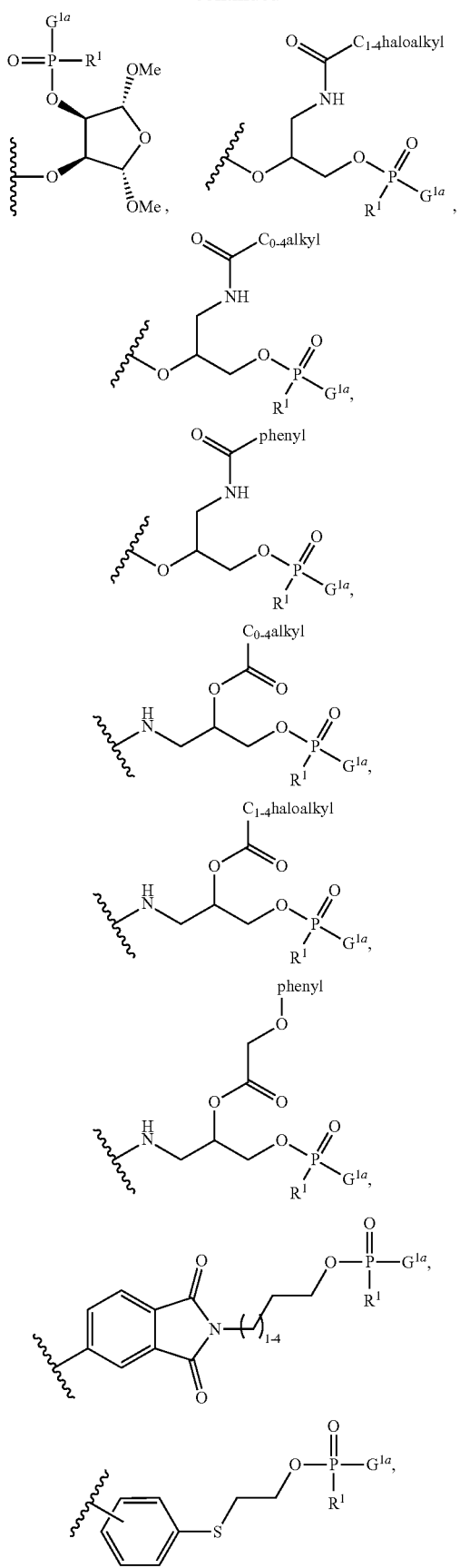

—(CH$_2$)$_{1-10}$—O—, or —(CH$_2$CH$_2$O)$_{2-6}$—; and R$^{10}$ is phenyl, C$_{1-10}$alkyl, or C$_{1-10}$haloalkyl; wherein the phenylene and phenyl are optionally substituted with 1-4 substituents independently selected from the group consisting of NO$_2$, —OC$_{1-4}$alkyl, halogen, C$_{1-4}$alkyl, and C$_{1-4}$haloalkyl. To further illustrate the bonding arrangement of L$^5$, C(O)-L$^5$-P(O)(R$^1$)-G$^{1a}$ may be C(O)-L$^{5a}$-L$^{5b}$-P(O)(R$^1$)-G$^{1a}$, which in turn may be C(O)—C$_{0-4}$alkylene-C(O)-L$^{5b}$-P(O)(R$^1$)-G$^{1a}$, C(O)—C$_{1-3}$alkylene-O—C$_{1-3}$alkylene-C(O)-L$^{5e}$-P(O)(R$^1$)-G$^{1a}$, C(O)—C$_{1-3}$alkylene-N(C$_{1-3}$alkyl)C(O)—C$_{1-3}$alkylene-C(O)-L$^{5b}$-P(O)(R$^1$)-G$^{1a}$, C(O)-phenylene-C(O)-L$^{5b}$-P(O)(R$^1$)-G$^{1a}$, C(O)—C$_{1-3}$alkylene-O-phenylene-O—C$_{1-3}$alkylene-C(O)-L$^{5b}$-P(O)(R$^1$)-G$^{1a}$, C(O)-phenylene-C$_{1-3}$alkylene-O—C(O)-L$^{5b}$-P(O)(R$^1$)-G$^{1a}$, C(O)—C$_{1-3}$alkylene-O-phenylene-C$_{1-3}$alkylene-O—C(O)-L$^{5b}$-P(O)(R$^1$)-G$^{1a}$, or C(O)—C$_{1-3}$alkylene-C(O)NH-fluorene-C$_{1-3}$alkylene-O—C(O)-L$^{5b}$-P(O)(R$^1$)-G$^{1a}$; wherein -L$^{5b}$-P(O)(R$^1$)-G$^{1a}$ is

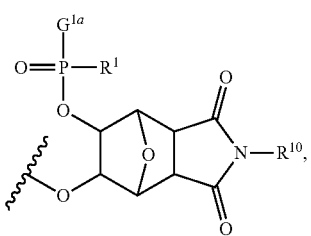

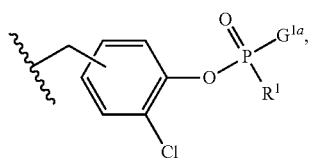
—$(CH_2)_{1-10}$—O—P(O)($R^1$)-$G^{1a}$, or —$(CH_2CH_2O)_{2-6}$—P(O)($R^1$)-$G^{1a}$; and $R^{10}$ is phenyl, $C_{1-10}$alkyl, or $C_{1-10}$haloalkyl.
$L^{5b}$ groups
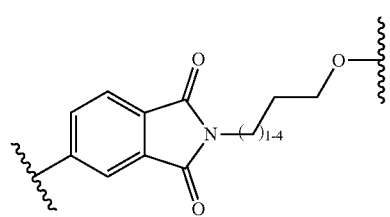
are useful in the preparation of oligonucleotides with a 3′ terminal amino group, following removal of the phthalimide group.
$L^5$ (i.e., $L^7$-O) may be $L^{5b}$ or $L^{5a}$-$L^{5b}$, wherein $L^{5a}$ is —C(O)—, —$CH_2$—C(O)—, —$(CH_2)_2$—C(O)—, —$CH_2$—O—$CH_2$—C(O)—, —$CH_2$—N($CH_3$)C(O)—$(CH_2)_2$—C(O)—
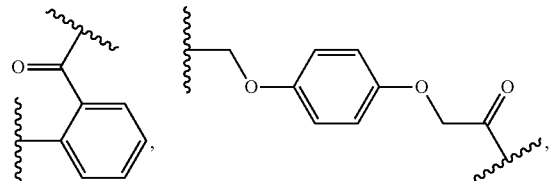
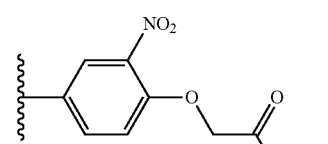
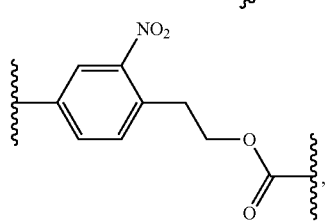
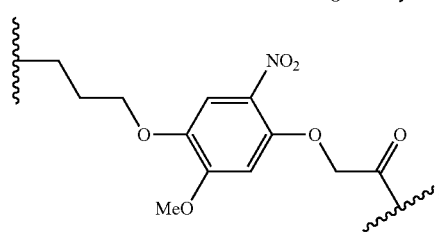
or
and $L^{5b}$ is
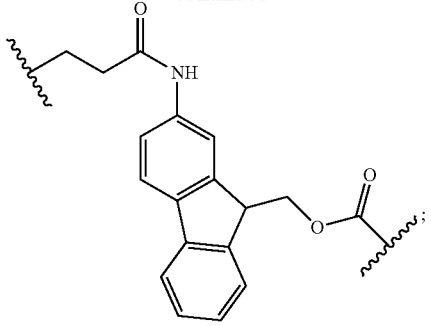
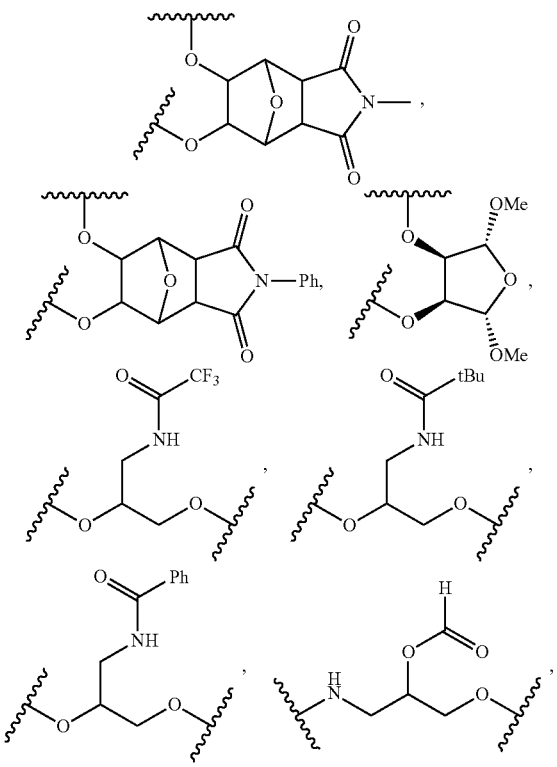
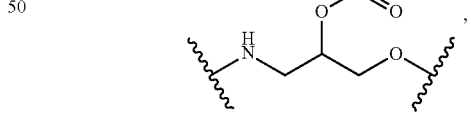
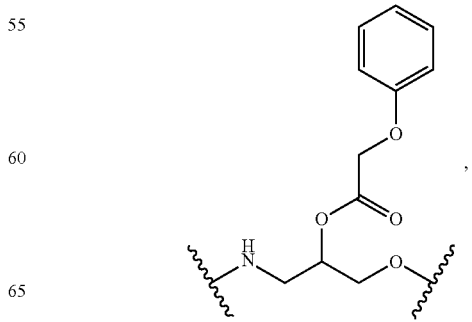

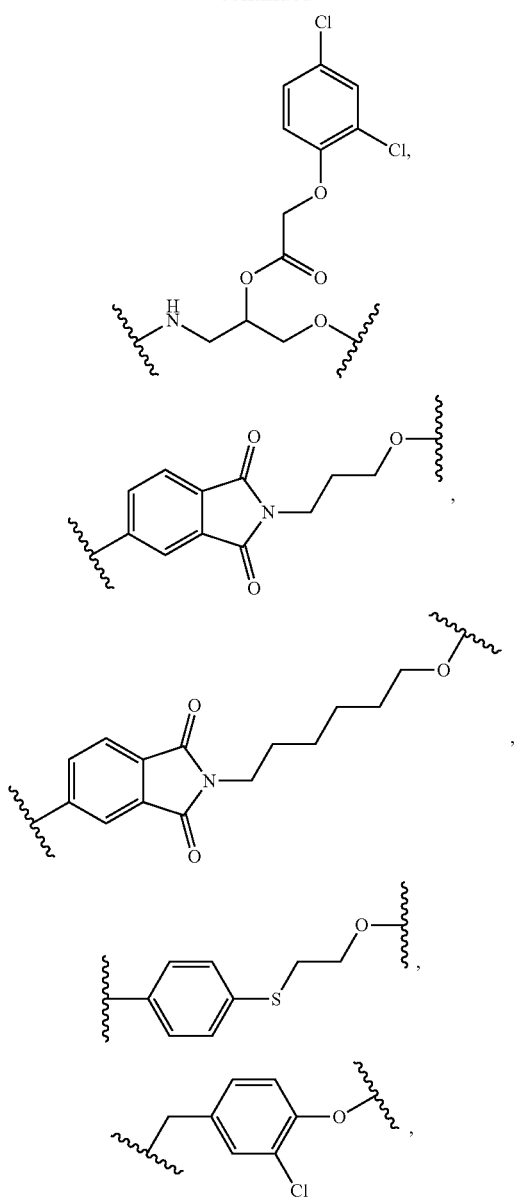
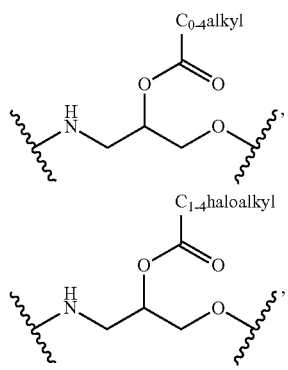
—CH$_2$—O—, —(CH$_2$)$_3$—O—, or —(CH$_2$CH$_2$O)$_4$—. L$^5$ (i.e., L$^7$-O) may be L$^{5b}$, wherein L$^{5b}$ is
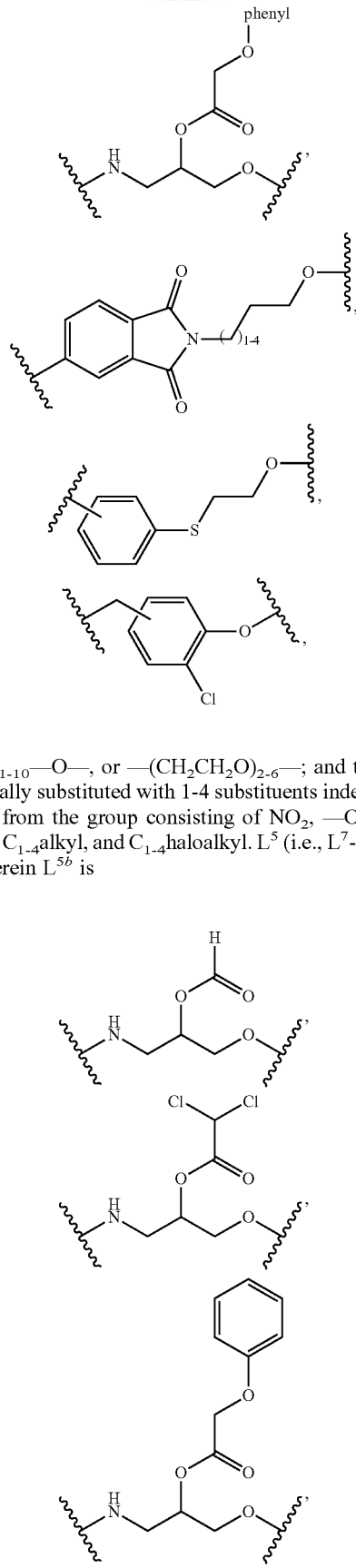
—(CH$_2$)$_{1-10}$—O—, or —(CH$_2$CH$_2$O)$_{2-6}$—; and the phenyl is optionally substituted with 1-4 substituents independently selected from the group consisting of NO$_2$, —OC$_{1-4}$alkyl, halogen, C$_{1-4}$alkyl, and C$_{1-4}$haloalkyl. L$^5$ (i.e., L$^7$-O) may be L$^{5b}$, wherein L$^{5b}$ is

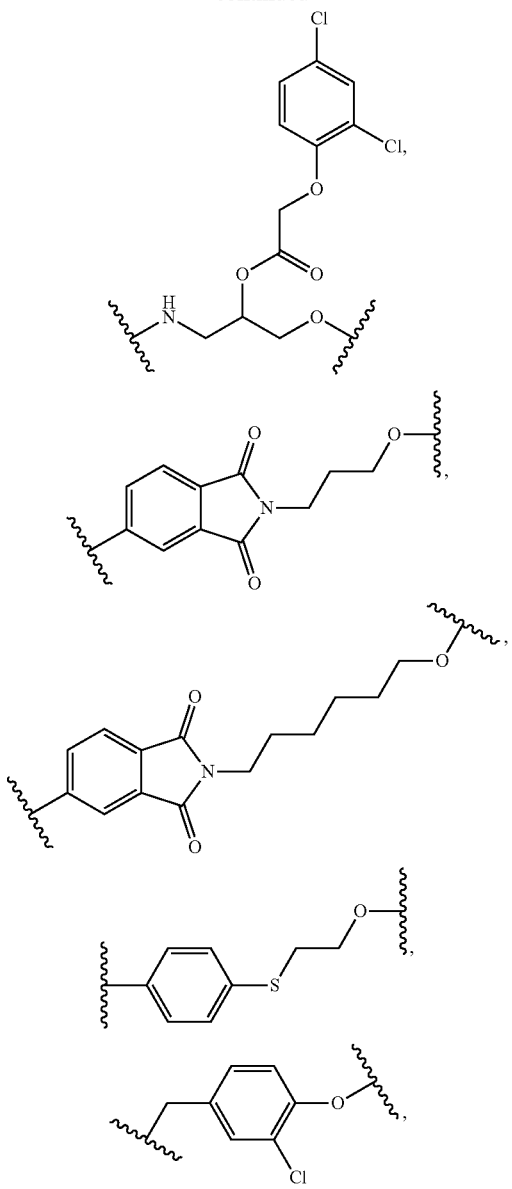

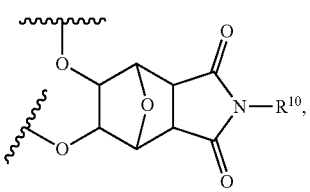

—CH$_2$—O—, —(CH$_2$)$_3$—O—, or —(CH$_2$CH$_2$O)$_4$—.

L$^5$ (i.e., L$^7$-O) may be L$^{5a}$-L$^{5b}$, wherein L$^{5a}$ is —C$_{0-4}$alkylene-C(O)—, —C$_{1-3}$alkylene-O—C$_{1-3}$alkylene-C(O)—, —C$_{1-3}$alkylene-N(C$_{1-3}$alkyl)C(O)—C$_{1-3}$alkylene-C(O)—, -phenylene-C(O)—, —C$_{1-3}$alkylene-O-phenylene-O—C$_{1-3}$alkylene-C(O)—, -phenylene-C$_{1-3}$alkylene-O—C(O)—, —C$_{1-3}$alkylene-O-phenylene-C$_{1-3}$alkylene-O—C(O)—, or —C$_{1-3}$alkylene-C(O)NH-fluorene-C$_{1-3}$alkylene-O—C(O)—; L$^{5b}$ is

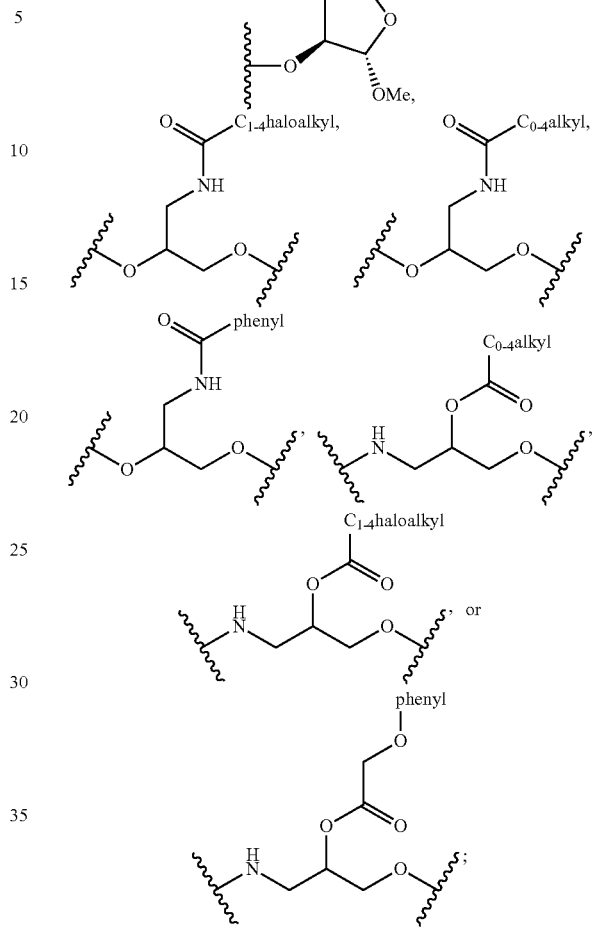

and R$^{10}$ is phenyl, C$_{1-10}$alkyl, or C$_{1-10}$haloalkyl; wherein the phenylene and phenyl are optionally substituted with 1-4 substituents independently selected from the group consisting of NO$_2$, —OC$_{1-4}$alkyl, halogen, C$_{1-4}$alkyl, and C$_{1-4}$haloalkyl. L$^5$ (i.e., L$^7$-O) may be L$^{5a}$-L$^{5b}$, wherein L$^{5a}$ is —C(O)—, —CH$_2$—C(O)—, —(CH$_2$)$_2$—C(O)—, —CH$_2$—O—CH$_2$—C(O)—, —CH$_2$—N(CH$_3$)C(O)—(CH$_2$)$_2$—C(O)—,

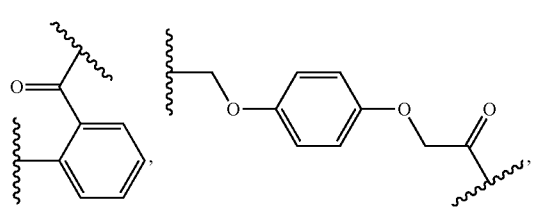

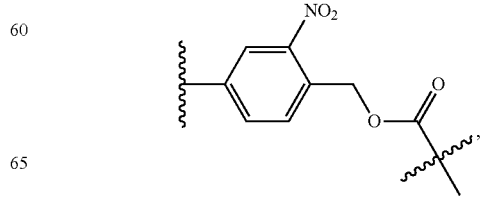

29
-continued
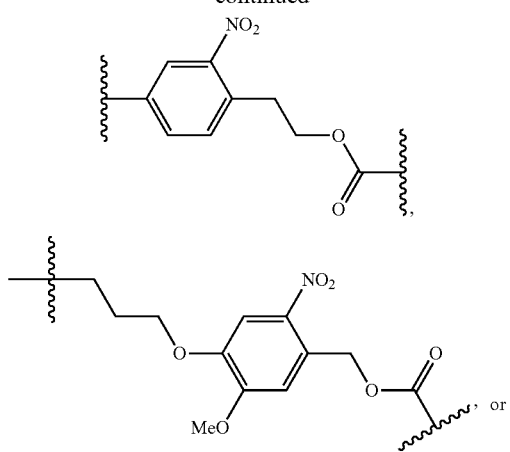
and $L^{5b}$ is
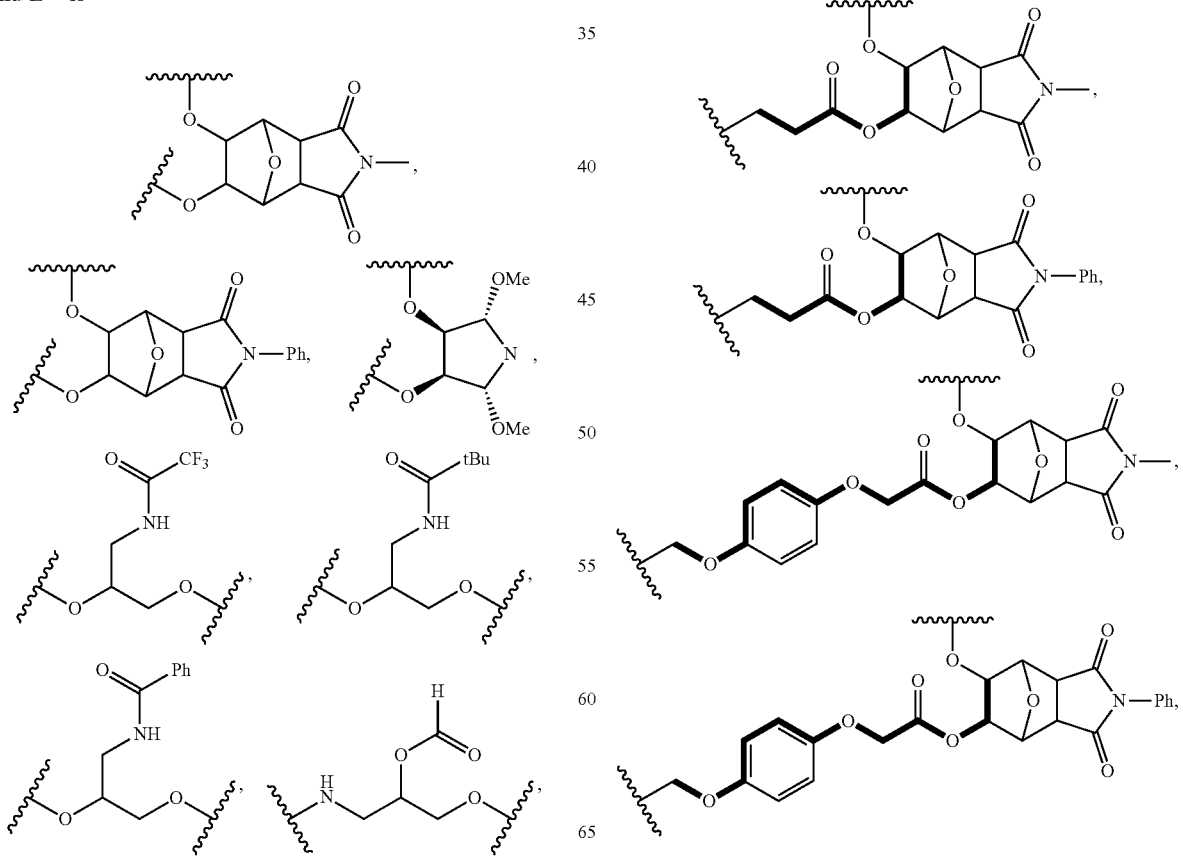
30
-continued
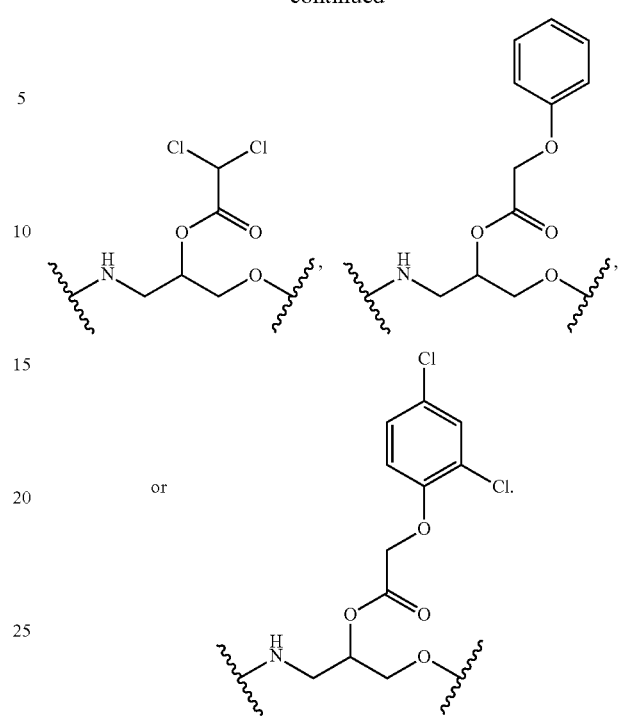
Thus, for example, $L^5$ (i.e., $L^7$-O) may be -continued
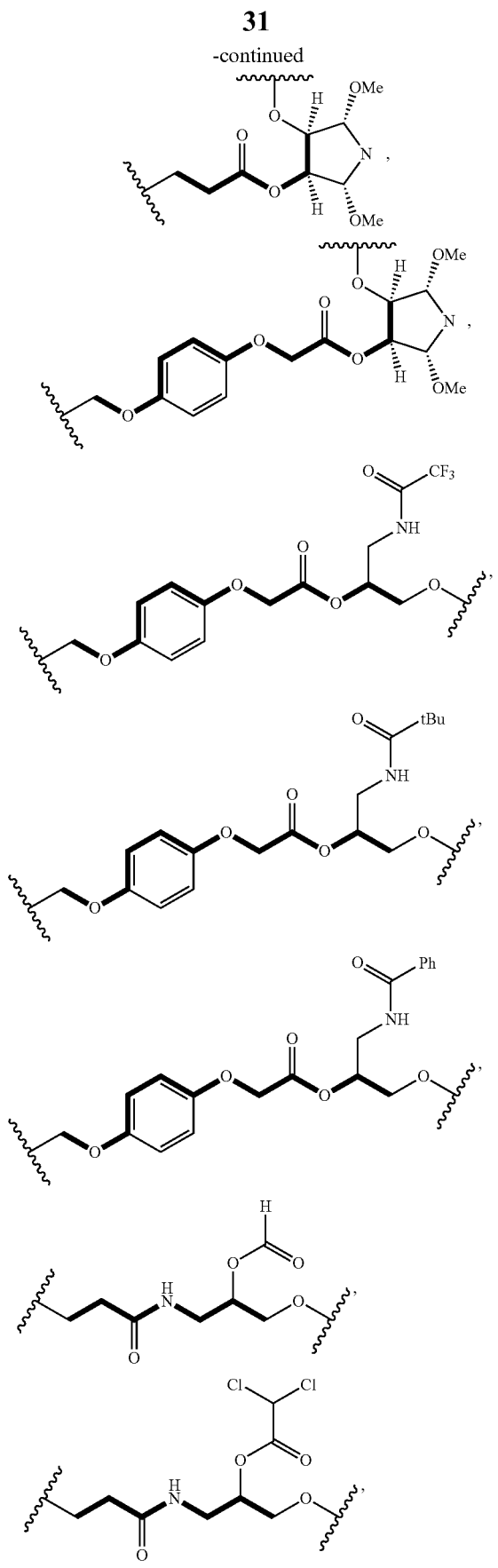
-continued
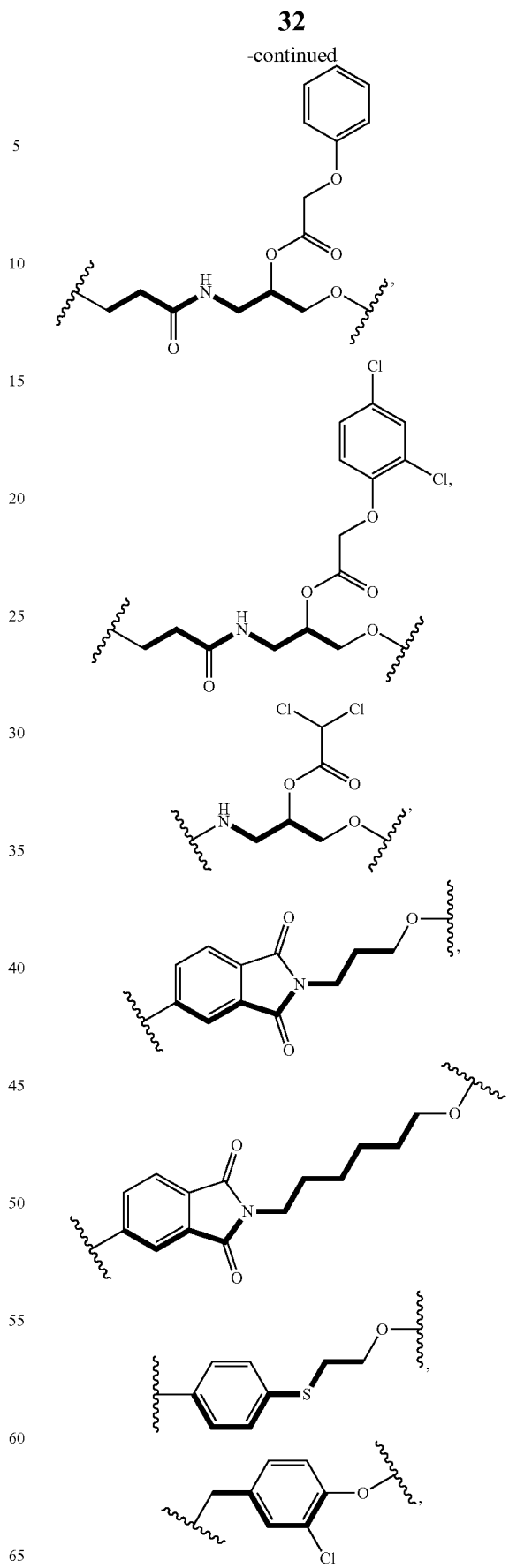

—CH$_2$—O—, —(CH$_2$)$_3$—O—, or —(CH$_2$CH$_2$O)$_4$—, wherein the contiguous linear atom arrangements of the L$^7$ portions of L$^5$ are shown in bold.
R$^{2b}$ may be C(O)-L$^5$-H or C(O)-L$^5$-PG$^1$; wherein PG$^1$ is as defined herein and L$^5$ is
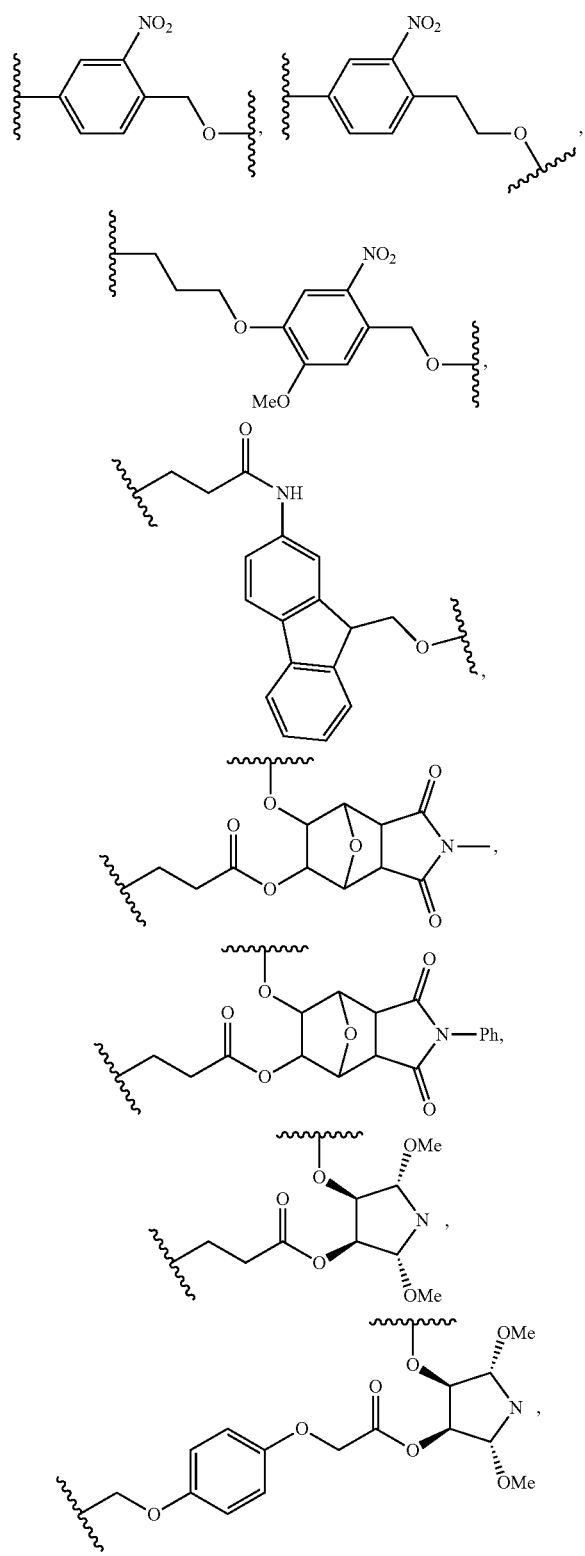
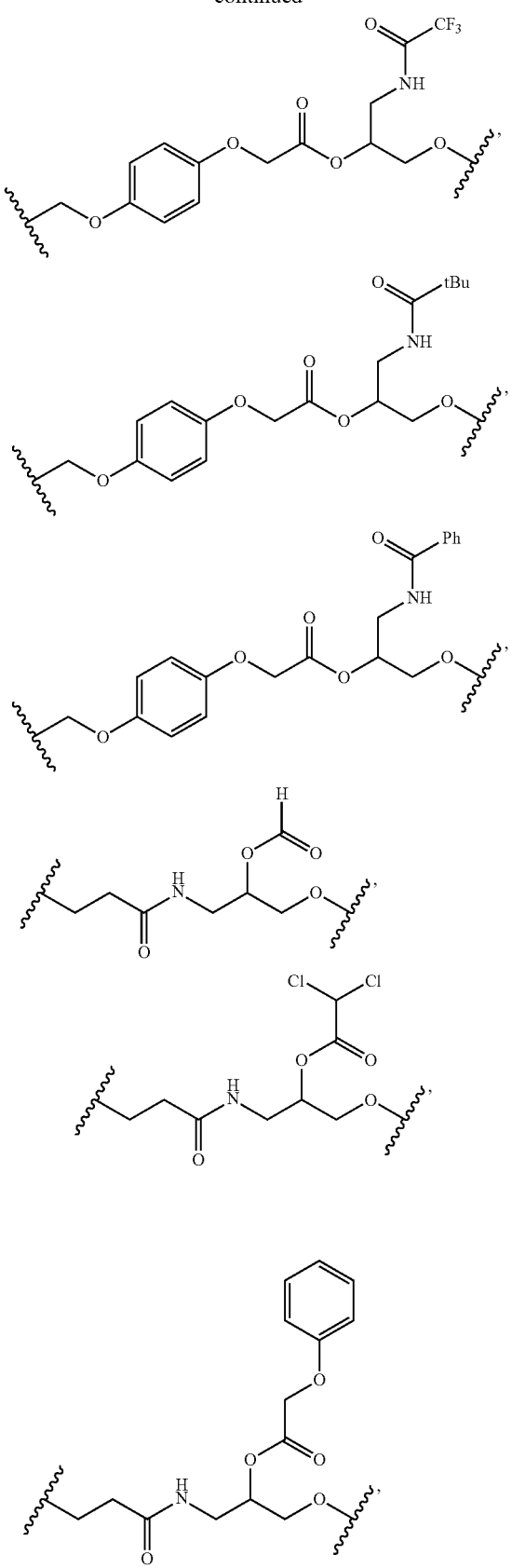

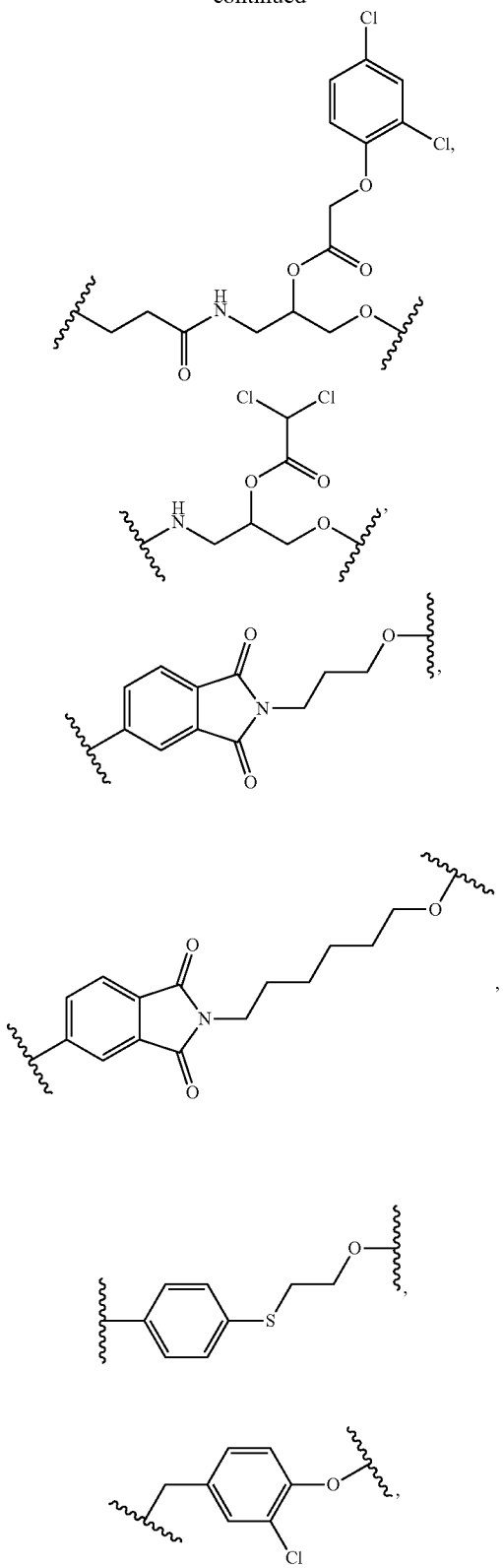

—CH$_2$—O—, —(CH$_2$)$_3$—O—, or —(CH$_2$CH$_2$O)$_4$—.

R$^{2b}$ may be C(O)-L$^6$-G$^{1a}$; wherein G$^{1a}$ is as defined herein and L$^6$ is L$^7$-Si(C$_{1-4}$alkyl)$_2$, and L$^7$ is as defined herein. For example, L$^6$ may be

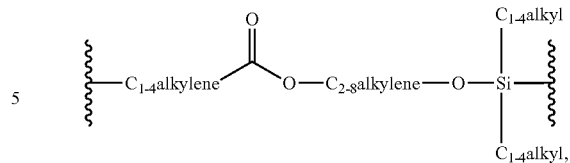

i.e., L$^7$ is

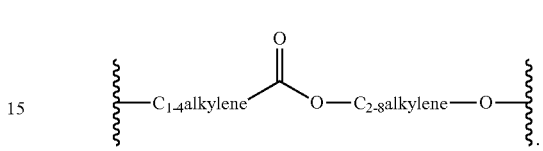

For example L$^6$ may be

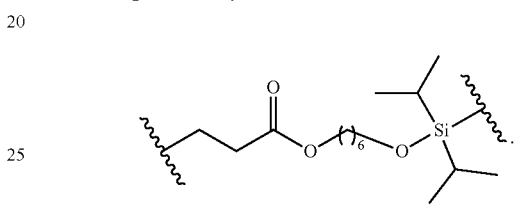

To illustrate the bonding of L$^6$, C(O)-L$^6$-G$^{1a}$ may be

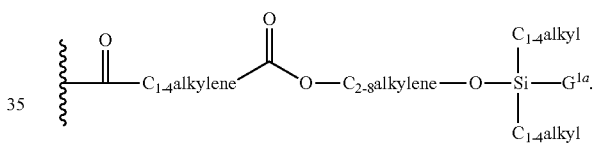

G$^{1a}$ is a nucleotide moiety or a nucleoside moiety, the moieties each corresponding to a respective nucleotide or nucleotide minus the hydrogen at its attachment point. A nucleotide refers to both a mononucleotide and an oligonucleotide (i.e., polynucleotide). A nucleoside is, by definition, limited to a single nucleoside residue. Nucleotides and nucleosides include deoxyribonucleotides/deoxyribonucleosides and ribonucleotides/ribonucleosides.

The oligonucleotide may be a DNA oligonucleotide, an RNA oligonucleotide, or an antisense oligonucleotide (e.g., antisense RNA).

Nucleotides and nucleosides include the free (unprotected), modified nucleotide and nucleosides, as well as protected versions of the nucleotides and nucleosides.

Modified nucleotides or nucleosides include molecules with chemical modifications or substitutions on the nucleobase, sugar, or internucleotide linkage in the case of a polynucleotide, such as described by in Ann. Rev. Biochem. 1998, 67:99-134; Int. J. Mol. Sci. 2017, 18(8), 1683; Curr. Opin. Biotechnol. 1995, 6:12-19; and Tetrahedron 1993, 49(28), 6123-6194; which are incorporated herein by reference. For example, modifications to an internucleotide linkage may include phosphorothioates, N3'-O5' phosphoramidates, O3'-N5' phosphoramidates, 3-phosphorothiolates, 5'-phosphorothiolates, phosphorodithioates, methylphosphonates, and triazoles.

Nucleotides and nucleosides include those moieties which contain not only the known purine and pyrimidine bases, but also modified purine and pyrimidine bases and other heterocyclic bases which have been modified (these moieties are sometimes referred to collectively as "purine and pyrimidine bases and analogs thereof"). Such modifications include methylated purines or pyrimidines, acylated purines or pyrimidines, and the like. Nucleobase modifications may include, for example, deazapurines, N-1-methylguanosine, isoguanine, 2-aminopurine, 1,3-diaza-2-oxophenothiazine, 1,3-diaza-2-oxophenoxazine, 7-nitro-1,3-diaza-2-oxophenothiazine, 2,6-diaminopurine, purine, 6-thioguanine, hypoxanthine, 2-pyrimidinone, 2-pyridone, 4-thiouridine, imidazole-4-carboxamide, N-substituted 5-(carboxyamide) uridines such as 5-(N-benzylcarboxyamide)-uridine, 5-fluoro-deoxyuridine.

Sugar modifications, for example, may include abasic nucleotides/nucleosides, 4'-carbocyclic analogs, 4'-thio analogs, 4' aminoanalogs, and 2'-substituted sugars such as fluoro, amino, methoxy, allyloxy, e.g.,

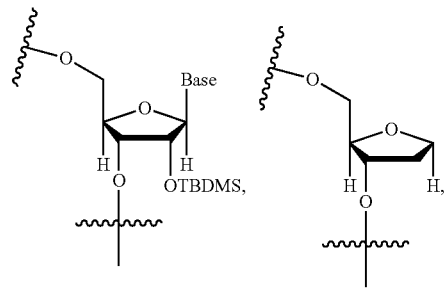

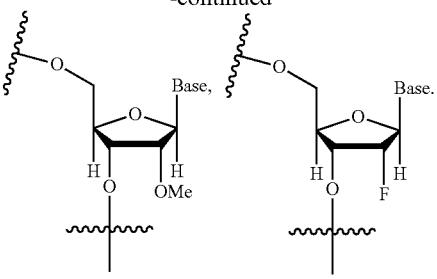

Further modified nucleotide or nucleosides include substitution with nonradioactive labels such as fluorescent labels or fluorescence quenchers that may be attached via a spacer unit. Classes of fluorophores include xanthenes (e.g., fluoresceins, rhodamines), cyanines (e.g., cyanines 3, 3.5, 5, 5.5), and boron-dipyrromethenes (BODIPY™ dyes). Classes of fluorescence quenchers include azo quenchers (e.g., dabcyl, IOWA BLACK® FQ) and anthraquinone quenchers (e.g., IOWA BLACK® RQ). Fluorescent labels and quenchers may be attached off a nucleobase or the 3'- or 5'-position of a sugar, e.g.,

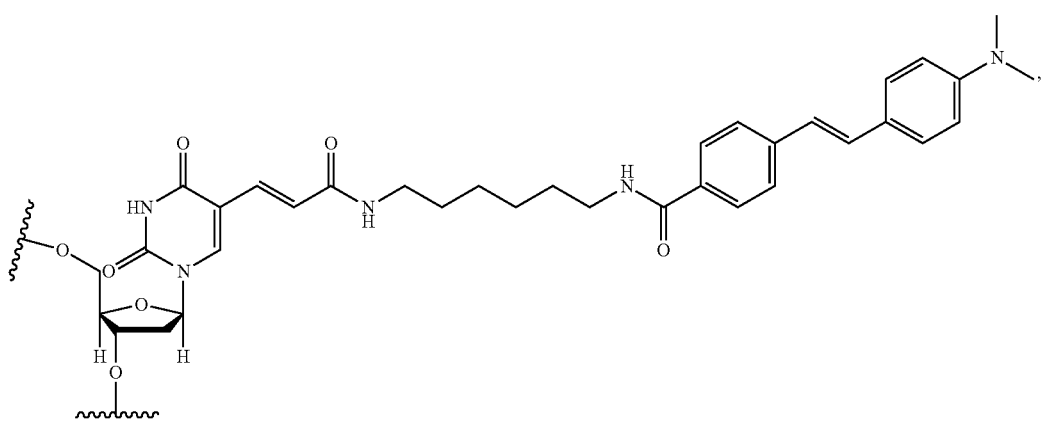

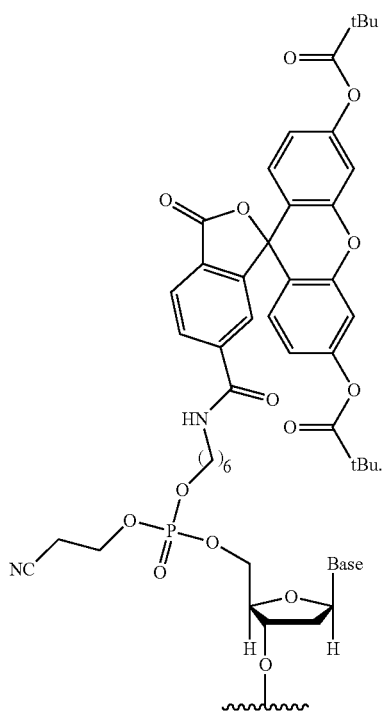

Additional nucleotide/nucleoside modifications are well known in the art such as substitution with a polyethylene glycol group, a cholesterol group, a biotin group, a lipid group, and various functionalities such as amino, aldehyde, carboxylic acid, and alkyne.

Protecting groups may be present on oxygen or nitrogen atoms of the sugar or nucleobase portion of the nucleotide or nucleoside. Protecting groups may also be present on an oxygen of the phosphate portion of a nucleotide. Nucleotide and nucleoside protecting groups are well known in the art.

Representative protecting groups are disclosed by Beaucage, S. L.; Uyer, R. P., "Advances in the Synthesis of oligonucleotides by the Phosphoramidite Approach," Tetrahedron, 1992, 48, 2223-2311, which article is entirely incorporated by reference. Illustrative protecting groups that can be removed under acidic or neutral conditions include trityl (Tr), dimethoxytrityl (DMTr), monomethoxytrityl, 9-phenylxanthen-9-yl (Pixyl), 9-(p-methoxyphenyl)xanthen-9-yl (Mox), and 4,4',4"-tris-tert-butyltrityl (TTTr). Illustrative protecting groups that can be removed under neutral conditions are base-labile protecting groups, such as the acyl or aroyl groups.

Exocyclic amino groups on the nucleobase may be protected by acylation. The benzoyl group is used to protect both adenine and cytosine, while the isobutyryl and dimethylformamidyl groups may be used to protect guanine. Other alternative protecting groups are known, such as phenoxyacetyl, phthaloyl or di-N-butylaminomethylene for the amino group of adenine, acetyl for cytosine, and isopropylphenoxyacetyl for guanine.

As those in the art appreciate, the 5'-hydroxyl or the 3'-hydroxyl group is typically protected with triphenylmethyl (trityl), 4-methoxytriphenylmethyl (methoxytrityl), or 4,4'-dimethoxytriphenylmethyl(dimethoxytrityl). The dimethoxytrityl protecting group is generally preferred. 2'-Hydroxy protecting groups include silyl (e.g., t-butyldimethylsilyl), acetals, and others described in "Strategies for Oligoribonucleotide Synthesis According to the Phosphoramidite Method" in Current Protocols in Nucleic Acid Chemistry 2000 Chapter 3.5. Phosphate protecting groups include the 2-cyanoethyl group and the methyl group.

The nucleotide or nucleoside moiety of $G^{1a}$ bonds to the parent molecular moiety in formula (I) through a 3' or 5' oxygen atom in the nucleotide or nucleoside moiety.

For purposes of illustration, an example functionalized solid support of formula (I) bonded to a 3' oxygen of $G^{1a}$, wherein $R^{2b}$ is C(O)-L$^7$-C(O)-$G^{1a}$ may be

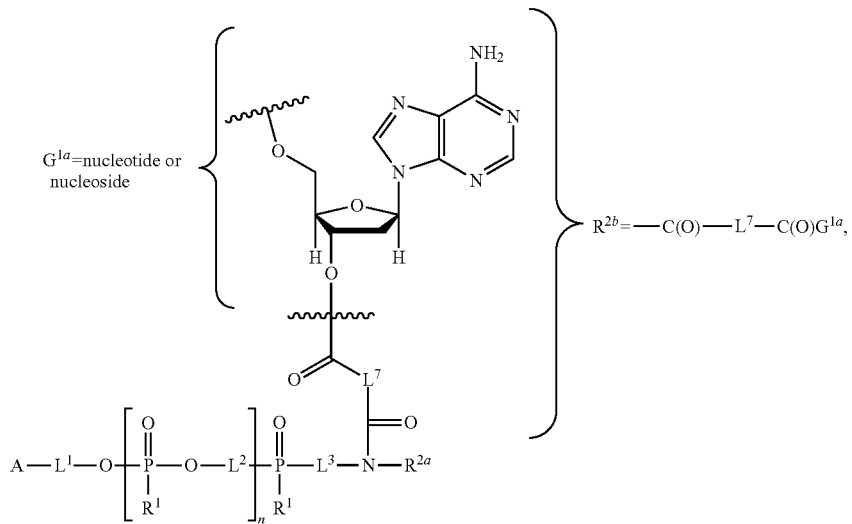

wherein A, $L^1$, $L^2$, $L^3$, $L^7$, $R^1$, $R^{2a}$, and n are as defined herein.

A further example functionalized solid support of formula (I) bonded to a 3' oxygen of $G^{1a}$, wherein $R^{2b}$ is C(O)-$L^{5a}$-$L^{5b}$-P(O)($R^1$)-$G^{1a}$ may be

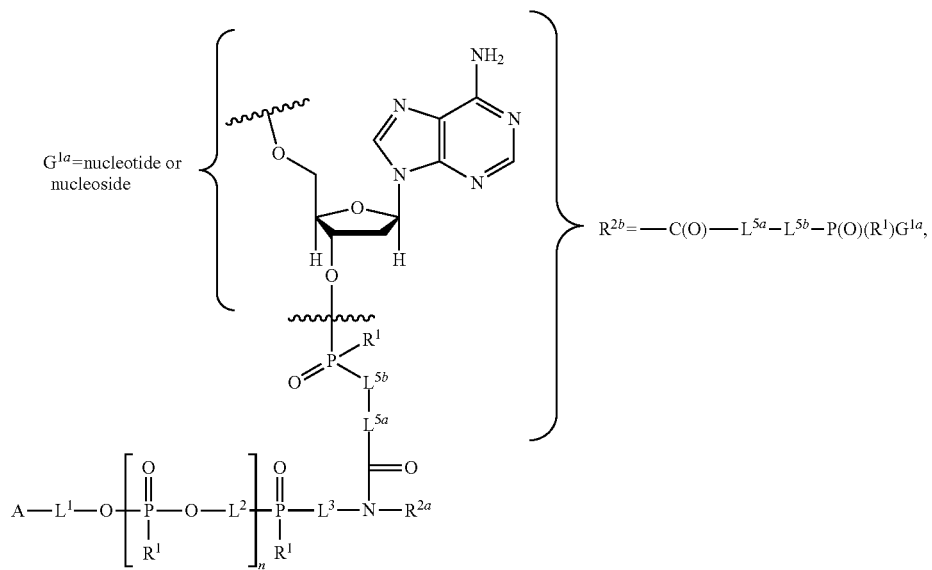

wherein A, $L^1$, $L^2$, $L^3$, $L^{5a}$, $L^{5b}$, $R^1$, $R^{2a}$, and n are as defined herein.

A further example functionalized solid support of formula (I) bonded to a 3' oxygen, wherein $R^{2b}$ is C(O)-$L^6$-$G^{1a}$, wherein $L^6$ is $L^7$-Si($C_{1-4}$alkyl)$_2$, may be

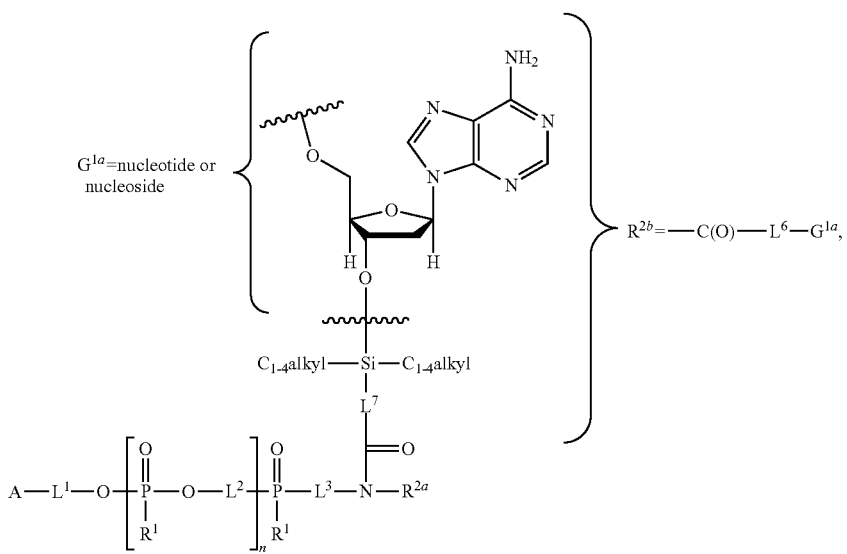

wherein A, $L^1$, $L^2$, $L^3$, $L^7$, $R^1$, $R^{2a}$, and n are as defined herein.

Representative examples of $G^{1a}$ include

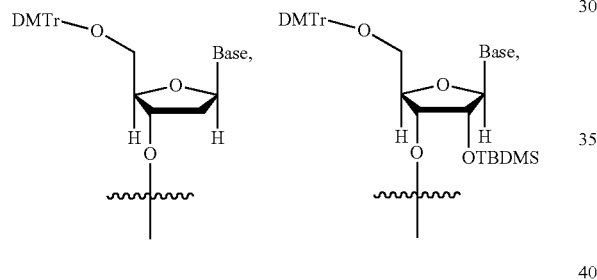

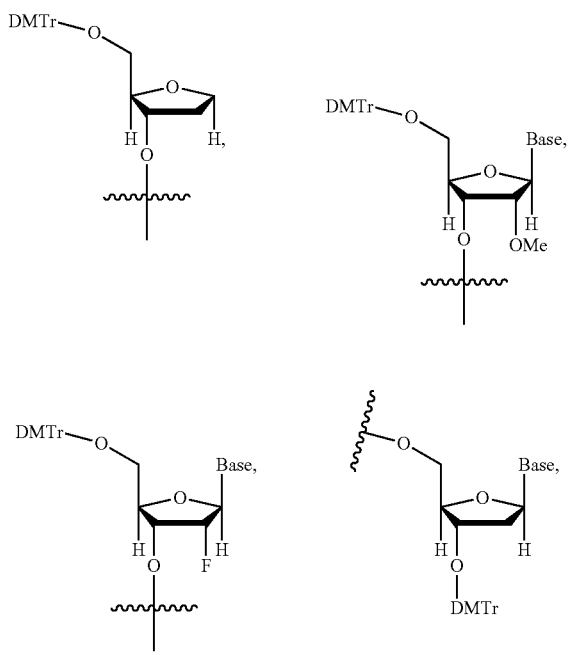

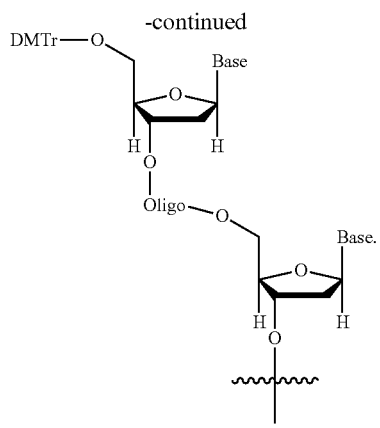

Throughout the embodiments and description of the compounds of the invention, all instances of haloalkyl may be fluoroalkyl (e.g., any $C_{1-4}$haloalkyl may be $C_{1-4}$fluoroalkyl).

Compounds may exist as a stereoisomer wherein asymmetric or chiral centers are present. The stereoisomer is "R" or "S" depending on the configuration of substituents around the chiral carbon atom. The terms "R" and "S" used herein are configurations as defined in IUPAC 1974 Recommendations for Section E, Fundamental Stereochemistry, in Pure Appl. Chem., 1976, 45: 13-30. The disclosure contemplates various stereoisomers and mixtures thereof and these are specifically included within the scope of this invention. Stereoisomers include enantiomers and diastereomers, and mixtures of enantiomers or diastereomers. Individual stereoisomers of the compounds may be prepared synthetically from commercially available starting materials, which contain asymmetric or chiral centers or by preparation of racemic mixtures followed by methods of resolution well-known to those of ordinary skill in the art. These methods of resolution are exemplified by (1) attachment of a mixture of enantiomers to a chiral auxiliary, separation of the resulting mixture of diastereomers by recrystallization or chromatography and optional liberation of the optically pure product from the auxiliary as described in Furniss, Hannaford, Smith, and Tatchell, "Vogel's Textbook of Practical Organic Chemistry", 5th edition (1989), Longman Scientific & Technical, Essex CM20 2JE, England, or (2) direct separation of the mixture of optical enantiomers on chiral chromatographic columns or (3) fractional recrystallization methods.

It should be understood that the compound may possess tautomeric forms, as well as geometric isomers, and that these also constitute an aspect of the invention.

The present disclosure also includes an isotopically-labeled compound having one or more atoms are replaced by an atom having an atomic mass or mass number different from the atomic mass or mass number usually found in nature. Examples of isotopes suitable for inclusion in the compounds of the invention are hydrogen, carbon, nitrogen, oxygen, phosphorus, sulfur, fluorine, and chlorine, such as, but not limited to $^2$H, $^3$H, $^{13}$C, $^{14}$C, $^{15}$N, $^{18}$O, $^{17}$O, $^{31}$P, $^{32}$P, $^{35}$S, $^{18}$F, and $^{36}$Cl, respectively. Substitution with heavier isotopes such as deuterium, i.e., $^2$H, can afford certain therapeutic advantages resulting from greater metabolic stability, for example increased in vivo half-life or reduced dosage requirements and, hence, may be preferred in some circumstances. The compound may incorporate positron-emitting isotopes for medical imaging and positron-emitting tomography (PET) studies for determining the distribution of receptors. Suitable positron-emitting isotopes that can be incorporated in compounds of formula (I) are $^{11}$C, $^{13}$N, $^{15}$O, and $^{18}$F. Isotopically-labeled compounds of formula (I) can generally be prepared by conventional techniques known to those skilled in the art or by processes analogous to those described in the accompanying Examples using appropriate isotopically-labeled reagent in place of non-isotopically-labeled reagent.

The disclosed compounds may exist as salts. The salts may be prepared during the final isolation and purification of the compounds or separately by reacting an amino group of the compounds with a suitable acid. For example, a compound may be dissolved in a suitable solvent, such as but not limited to methanol and water and treated with at least one equivalent of an acid, like hydrochloric acid. The resulting salt may precipitate out and be isolated by filtration and dried under reduced pressure. Alternatively, the solvent and excess acid may be removed under reduced pressure to provide a salt. Representative salts include acetate, adipate, alginate, citrate, aspartate, benzoate, benzenesulfonate, bisulfate, butyrate, camphorate, camphorsulfonate, digluconate, glycerophosphate, hemisulfate, heptanoate, hexanoate, formate, isethionate, fumarate, lactate, maleate, methanesulfonate, naphthylenesulfonate, nicotinate, oxalate, pamoate, pectinate, persulfate, 3-phenylpropionate, picrate, oxalate, maleate, pivalate, propionate, succinate, tartrate, thrichloroacetate, trifluoroacetate, glutamate, para-toluenesulfonate, undecanoate, hydrochloric, hydrobromic, sulfuric, phosphoric and the like. The amino groups of the compounds may also be quaternized with alkyl chlorides, bromides and iodides such as methyl, ethyl, propyl, isopropyl, butyl, lauryl, myristyl, stearyl, and the like.

Basic addition salts may be prepared during the final isolation and purification of the disclosed compounds by reaction of a carboxyl group with a suitable base such as the hydroxide, carbonate, or bicarbonate of a metal cation such as lithium, sodium, potassium, calcium, magnesium, or aluminum, or an organic primary, secondary, or tertiary amine. Quaternary amine salts can be prepared, such as those derived from methylamine, dimethylamine, trimethylamine, triethylamine, diethylamine, ethylamine, tributylamine, pyridine, N,N-dimethylaniline, N-methylpiperidine, N-methylmorpholine, dicyclohexylamine, procaine, dibenzylamine, N,N-dibenzylphenethylamine, 1-ephenamine and N,N'-dibenzylethylenediamine, ethylenediamine, ethanolamine, diethanolamine, piperidine, piperazine, and the like.

B. Methods of Synthesis

Aspects of the invention provide processes for preparing the functionalized solid supports of formula (I). The functionalized supports of formula (I) include supports substituted with a nucleotide or nucleoside moiety, and supports that are chemical intermediates to prepare the supports substituted with a nucleotide or nucleoside moiety. Certain chemical intermediate supports may be reacted to prepare other chemical intermediate supports. Functionalized supports bearing a nucleotide or nucleoside moiety may also be reacted to prepare oligonucleotides using well-known oligonucleotide synthesis techniques, such as described in Biochem. Soc. Trans. 2011, 39, 575-580; and "Synthesis of Unmodified Oligoribonucleotides" in Current Protocols in Nucleic Acid Chemistry 2000, Chapter 3, each section of which is incorporated by reference herein. Oligonucleotides may be cleaved from the solid supports of the invention using established protocols.

An aspect of the invention provides the synthesis of intermediates of formula (I), wherein $G^1$ is $PG^1$ and n is 1, comprising:

(a) reacting a functionalized solid support of formula (II) with a compound of formula (III), wherein $R^{20}$ and $R^{21}$ are independently $C_{1-6}$alkyl

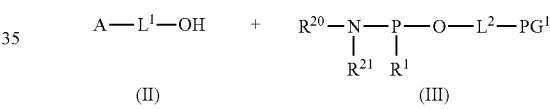

to provide a functionalized solid support of formula (IV),

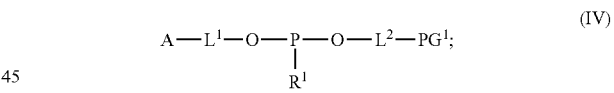

and (b) oxidizing the functionalized solid support of formula (IV) to provide the following functionalized solid support of formula (I-a), wherein A, $L^1$, $L^2$, $R^1$, and $PG^1$ are as defined herein

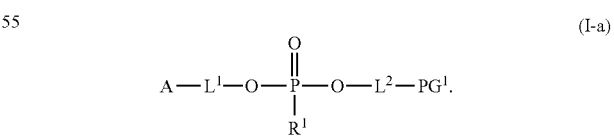

Steps (a) and (b) may be conducted using standard phosphoramidite coupling and oxidation procedures.

The functionalized support of formula (I-a) may be reacted in a step (c) with suitable reagents to remove the protecting group $PG^1$, to provide the following functionalized solid support of formula (I-b)

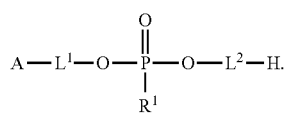

(I-b)

The functionalized support of formula (I-b) may be converted to additional chemical intermediates by reaction in a step (d) with the compound of formula (III) to provide a functionalized solid support of formula (IV-A);

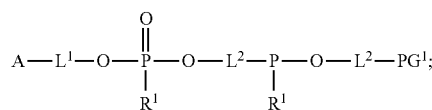

(IV-A)

and (e) oxidizing the functionalized solid support of formula (IV-A) to provide the functionalized solid support of formula (I-c), wherein A, $L^1$, $L^2$, $R^1$, and $PG^1$ are as defined herein

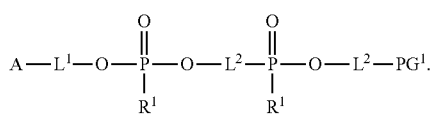

(I-c)

Steps (d) and (e) may be conducted using standard phosphoramidite coupling and oxidation procedures.

Formula (I-c) may be reacted to remove the protecting group $PG^1$ in a step (f) to provide formula (I-c1) and the resultant alcohol subjected to further reaction according to steps (d) and (e), or (d), (e), and (f) to provide functionalized solid supports of formula (I), wherein $G^1$ is hydrogen or $PG^1$; and n is an integer from 3 to 20. Removing $PG^1$ at the end of a particular sequence provides formula (I-c2)

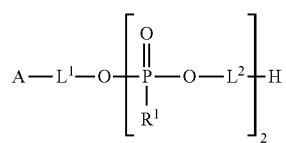

(I-c1)

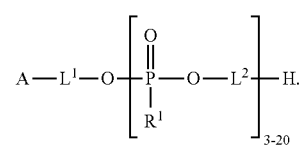

(I-c2)

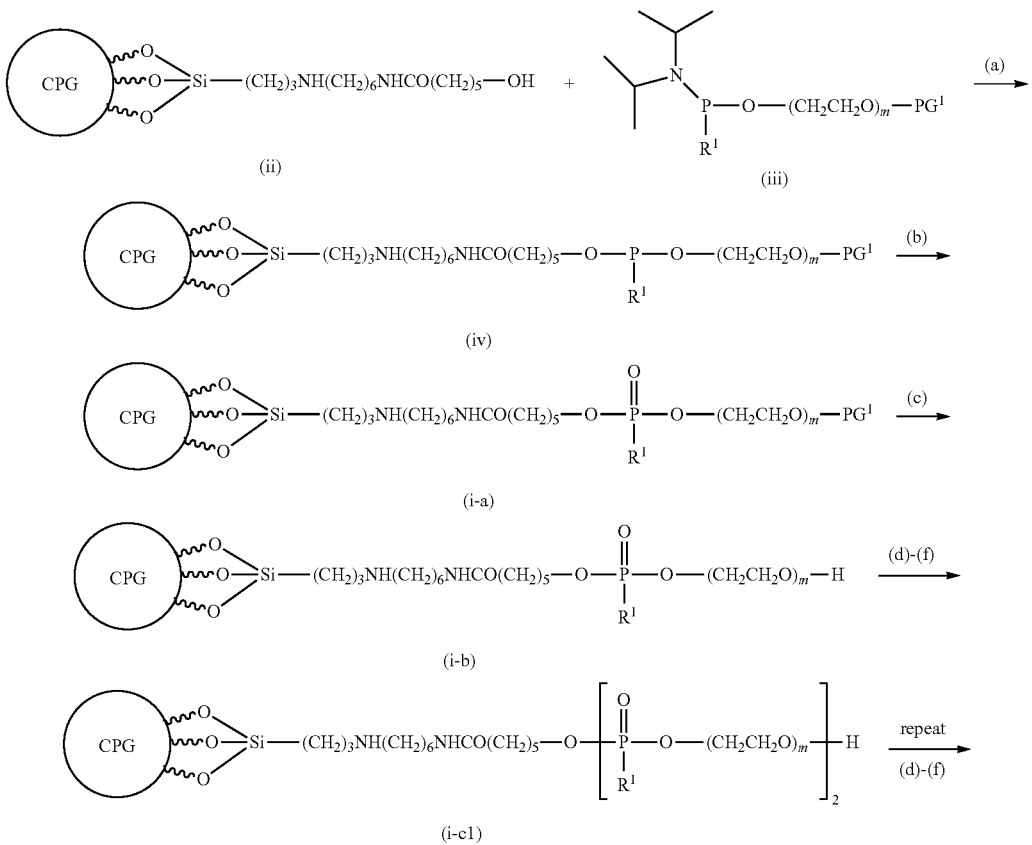

Scheme 1

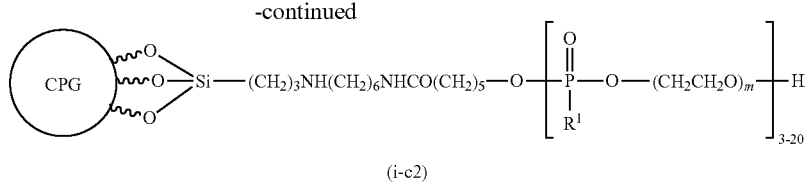

(i-c2)

Illustrated in Scheme 1 is a representative synthesis showing implementation of steps (a)-(f) with particular A, $L^1$, $L^2$, and $G^1$ groups.

Another aspect of the invention provides for the preparation of further intermediates of the invention of formula (I) by reaction in a step (g), wherein $G^1$ is hydrogen, with a compound of formula (V-a), wherein $R^{20}$ and $R^{21}$ are independently $C_{1-6}$alkyl

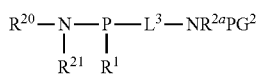

(V-a)

to provide a functionalized solid support of formula (VI-a)

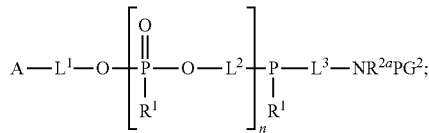

(VI-a)

and
(h) oxidizing the functionalized solid support of formula (VI-a) to provide the functionalized solid support of formula (I-d) wherein A, $L^1$, $L^2$, $L^3$, $R^1$, $R^{2a}$, n, and $PG^2$ are as defined herein (i.e., in formula (I), $G^1$ is $-P(O)(R^1)-L^3-R^2$, $R^2$ is $NR^{2a}R^{2b}$, and $R^{2b}$ is $PG^2$)

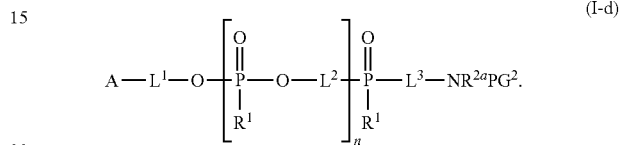

(I-d)

In some embodiments, $R^{2a}$ is hydrogen. Steps (g) and (h) may be conducted using standard phosphoramidite coupling and oxidation procedures.

The functionalized support of formula (I-d) may be reacted in a step (i) with suitable reagents to remove the protecting group $PG^2$, to provide the following functionalized solid support of formula (I-e)

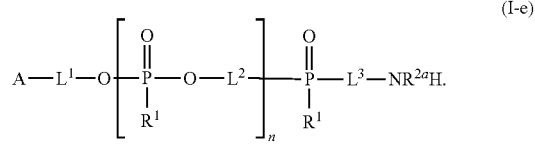

(I-e)

In some embodiments, $R^{2a}$ is hydrogen.

Scheme 2

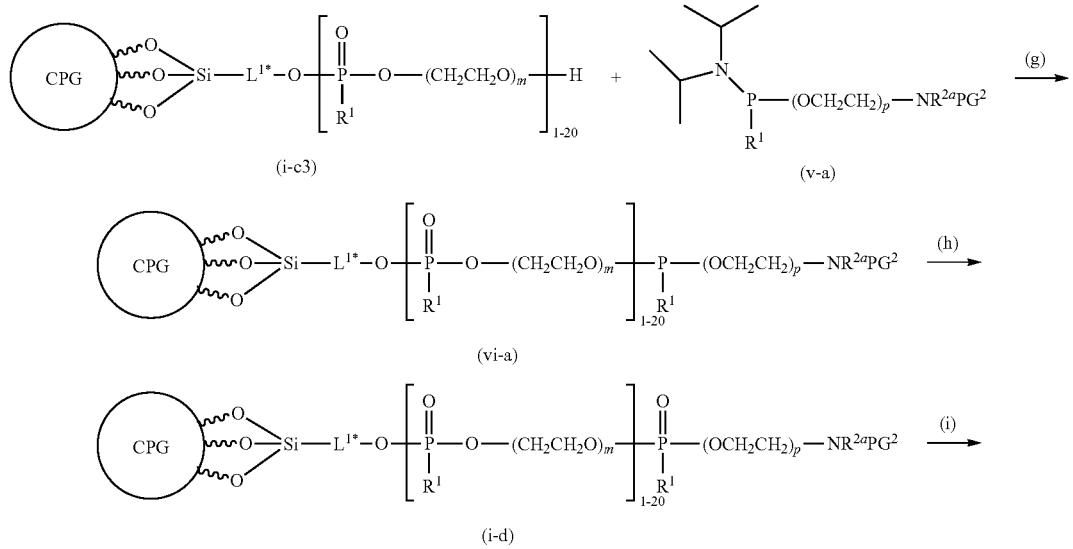

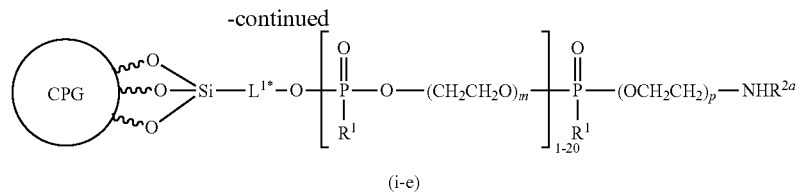

(i-e)

Illustrated in Scheme 2 is a representative synthesis showing implementation of steps (g)-(i) with particular A, $L^2$, $L^3$, and $R^{2b}$ groups.

The funtionalized solid support of formula (I-e) (e.g., where $R^{2a}$ is hydrogen) may be further processed to provide additional intermediates of the invention by reaction with succinic anhydride to provide the functionalized solid support of formula (I), wherein $R^{2b}$ is $C(O)$—$CH_2CH_2COOH$, in the form of formula (I-f)

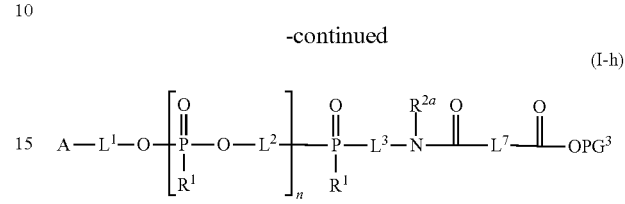

(I-h)

Formula (I-h) may be converted to formula (I-g) by removing protecting group $PG^3$ using standard conditions for removing a carboxylic acid protecting group well known in the art.

Scheme 3

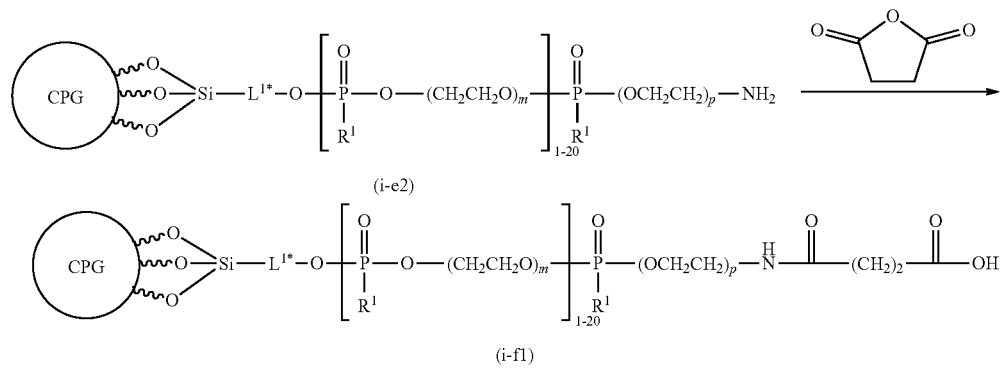

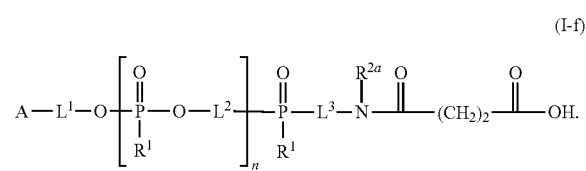

(I-f)

The funtionalized solid support of formula (I-e) (e.g., where $R^{2a}$ is hydrogen) may be further processed to provide additional intermediates of the invention by reaction with a compound of formula HO—C(O)-$L^7$-C(O)OH or HO—C(O)-$L^7$-C(O)$OPG^3$; to provide the functionalized solid support of formula (I), wherein $R^{2b}$ is $C(O)$-$L^7$-$C(O)OH$ or $C(O)$-$L^7$-$C(O)OPG^3$, in the form of formula (I-g) or (I-h)

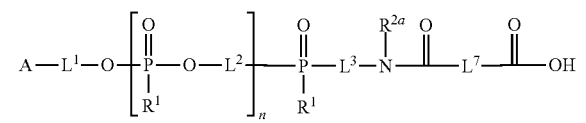

(I-g)

Illustrated in Scheme 3 is a representative synthesis showing coupling of succinic anhydride with a formula (I-e) representative (i-e2) having particular A, $L^2$, $L^3$, $R^{2a}$, and $R^{2b}$ groups to produce (i-f1).

The funtionalized solid support of formula (I-e) (e.g., where $R^{2a}$ is hydrogen) may be further processed to provide additional intermediates of the invention by reaction with a compound of formula HO—C(O)-$L^7$-OH or HO—C(O)-$L^7$-$OPG^1$, to provide the functionalized solid support of formula (I), wherein $R^{2b}$ is $C(O)$-$L^7$-$OPG^1$ or $C(O)$-$L^7$-OH (i.e., $R^{2b}$ is $C(O)$-$L^5$-$PG^1$ or $C(O)$-$L^5$-H) in the form of formulas (I-i) and (I-j)

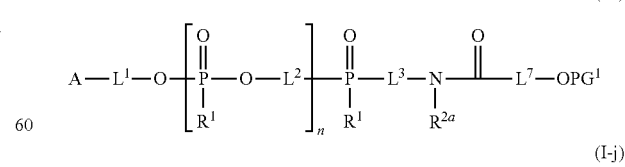

(I-i)

(I-j)

In formulas (I-i) and (I-j), $L^7$ is configured such that $L^7$-O-$PG^1$ is an ether moiety and $L^7$-O—H is an alcohol moiety. Formula (I-i) may be converted to formula (I-j) by removing the protecting group $PG^1$ using standard conditions for removing an alcohol protecting group well known in the art.

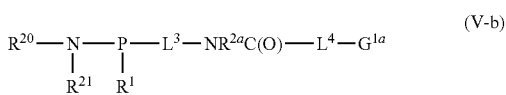

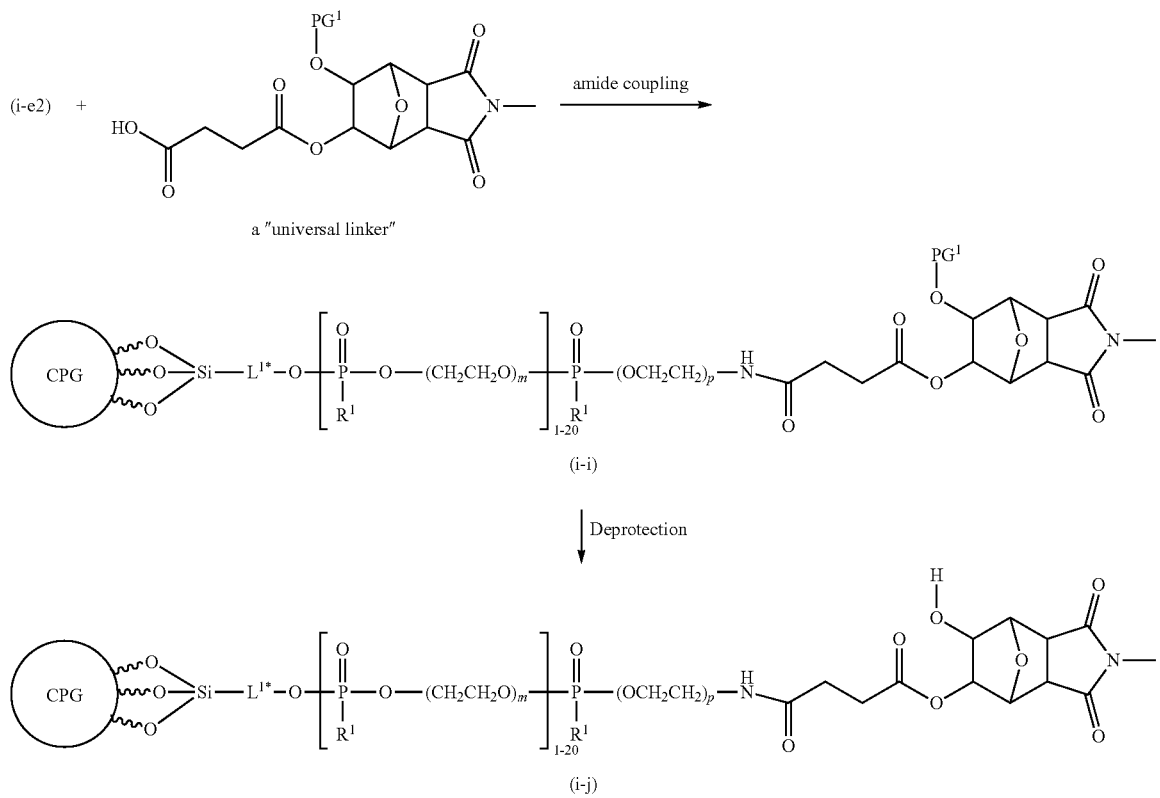

Illustrated in Scheme 4 is a representative synthesis showing amide coupling with a representative universal linker to form formula (i-i), followed by alcohol deprotection to provide formula (i-j). Universal linkers are well known in the art, as described in Org. Process Res. Dev. (2008) 12(3): 399-410; Nucleosides, Nucleotides, and Nucl. Acids (2010) 29 (11): 867-878; "Solid-Phase Supports for Oligonucleotide Synthesis" in Current Protocols in Nucleic Acid Chemistry 2000, Chapter 3, section 3.1; U.S. Pat. Nos. 6,770,754; 7,202,264; 7,491,817; and WO2018/177881.

Intermediates of formula (I-b), (I-c1), (I-c2), (I-e), (I-f), (I-g), and (I-j) may be further reacted to prepare functionalized solid supports of formula (I) bearing a nucleotide or nucleoside moiety $G^{1a}$.

Formulas (I-b), (I-c1), and (I-c2), collectively as formula (I-c3),

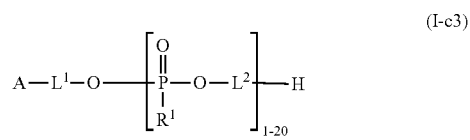

may be reacted with a compound of formula (V-b), wherein $R^{20}$ and $R^{21}$ are independently $C_{1-6}$alkyl, using standard phosphoramidite coupling conditions to provide a functionalized solid support of formula (VI-b)

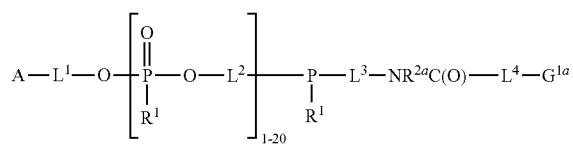

and oxidizing the functionalized solid support of formula (VI-b) to provide the functionalized solid support of formula (I-k) wherein A, $L^1$, $L^2$, $L^3$, $L^4$, $R^1$, $R^{2a}$, and $G^{1a}$ are as defined herein (i.e., in formula (I), $G^1$ is —P(O)($R^1$)-$L^3$-$R^2$, $R^2$ is $NR^{2a}R^{2b}$, and $R^{2b}$ is C(O)-$L^4$-$G^{1a}$)

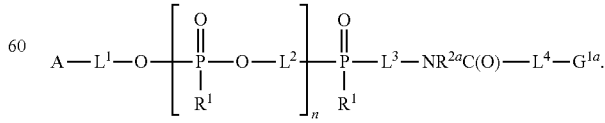

In some embodiments, $R^{2a}$ is hydrogen.

Formula (I-e) may be reacted with a compound of formula HO—C(O)-$L^4$-$G^{1a}$ using standard amide bond forming conditions to provide the functionalized solid support of formula (I), wherein $R^{2b}$ is $C(O)\text{-}L^4\text{-}G^{1a}$, in the form of formula (I-k).
Scheme 5
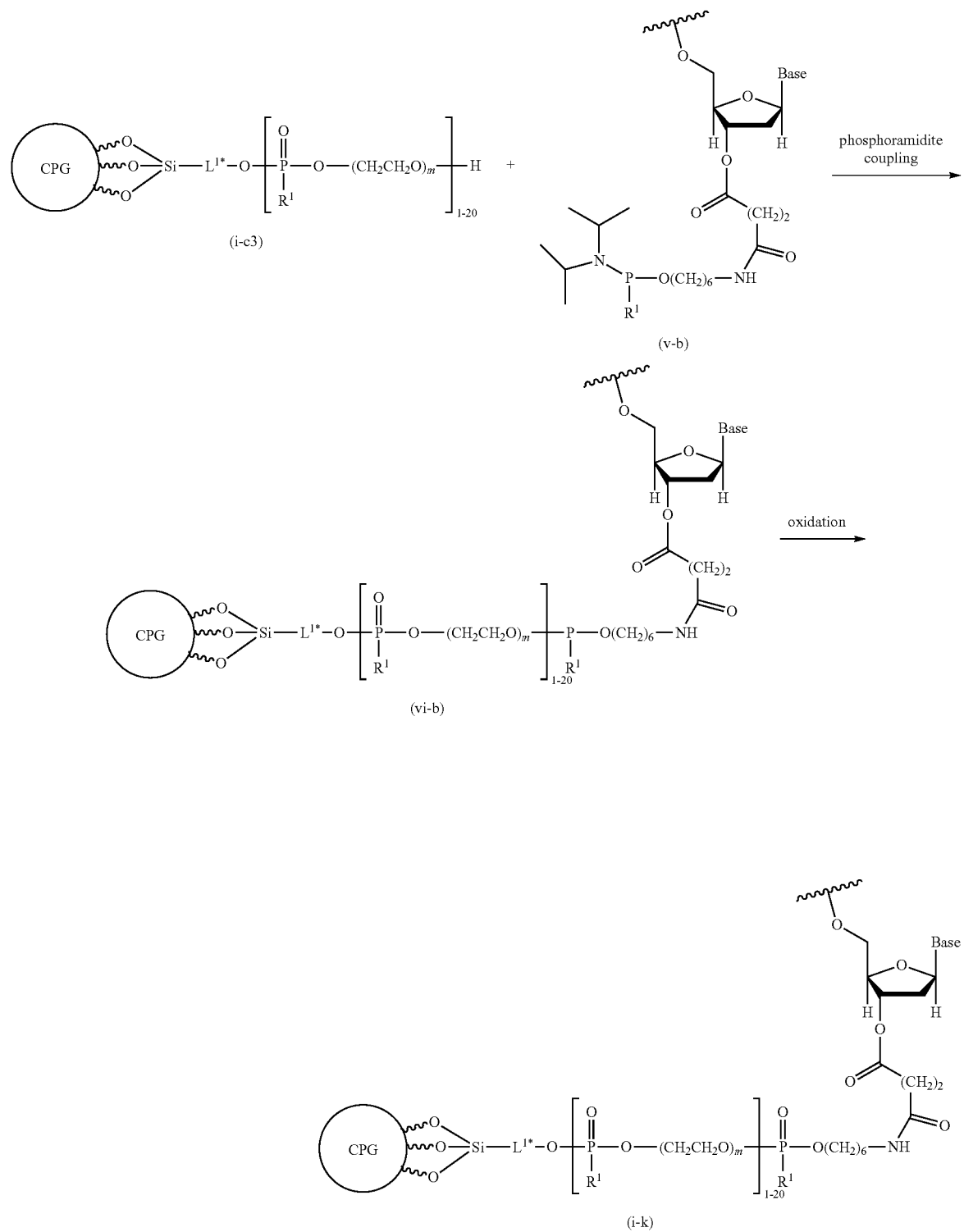

-continued

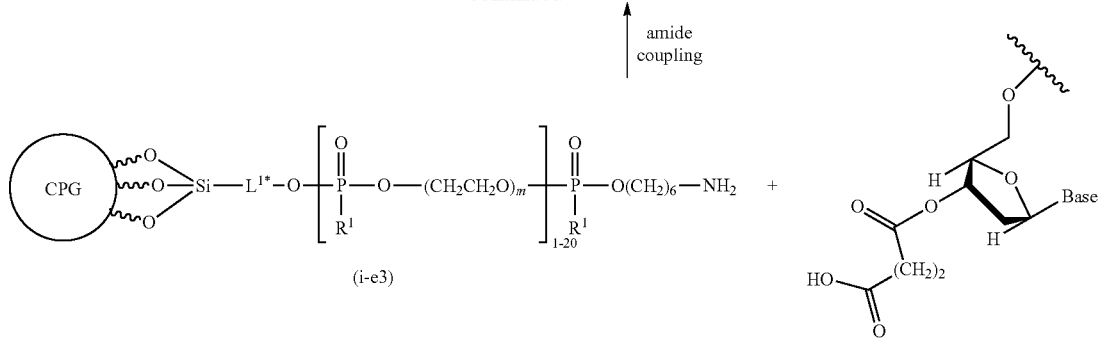

(i-e3)

Illustrated in Scheme 5 are representative syntheses of a functionalized solid support of formula (i-k) bearing a nucleotide or nucleoside moiety $G^{1a}$, and particular A, $L^3$, $R^{2a}$, and $R^{2b}$ groups in formula (I).

Formula (I-g) may be reacted with a nucleoside or nucleotide at a 3' or 5' OH under ester forming conditions to provide the functionalized solid support of formula (I) having formula (IX-a)

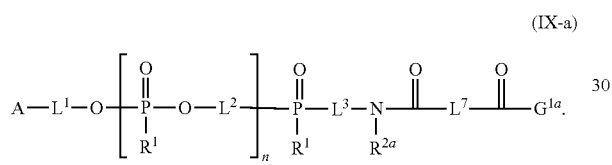

(IX-a)

Reaction of formula (I-f) provides formula (IX-a), wherein $L^7$ is —$CH_2CH_2$—.

Formula (I-j) may be reacted with a compound of formula (VII), wherein $R^{20}$ and $R^{21}$ are independently $C_{1-6}$alkyl and $G^{1a}$ is a nucleotide moiety or a nucleoside moiety

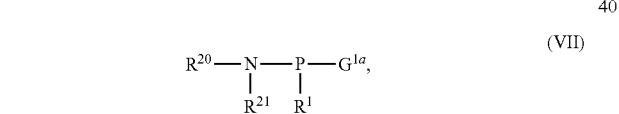

(VII)

to provide a functionalized solid support formula (VIII-a),

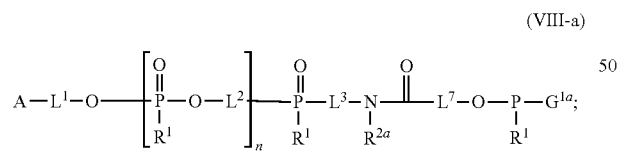

(VIII-a)

and
oxidizing the functionalized solid support of formula (VIII-a) to provide the functionalized solid support of formula (I) having formula (X-a)

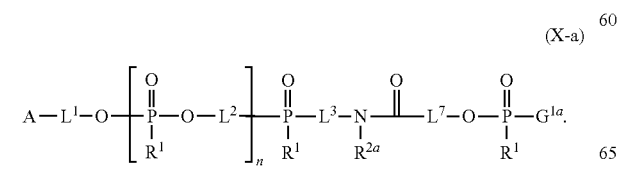

(X-a)

Scheme 6
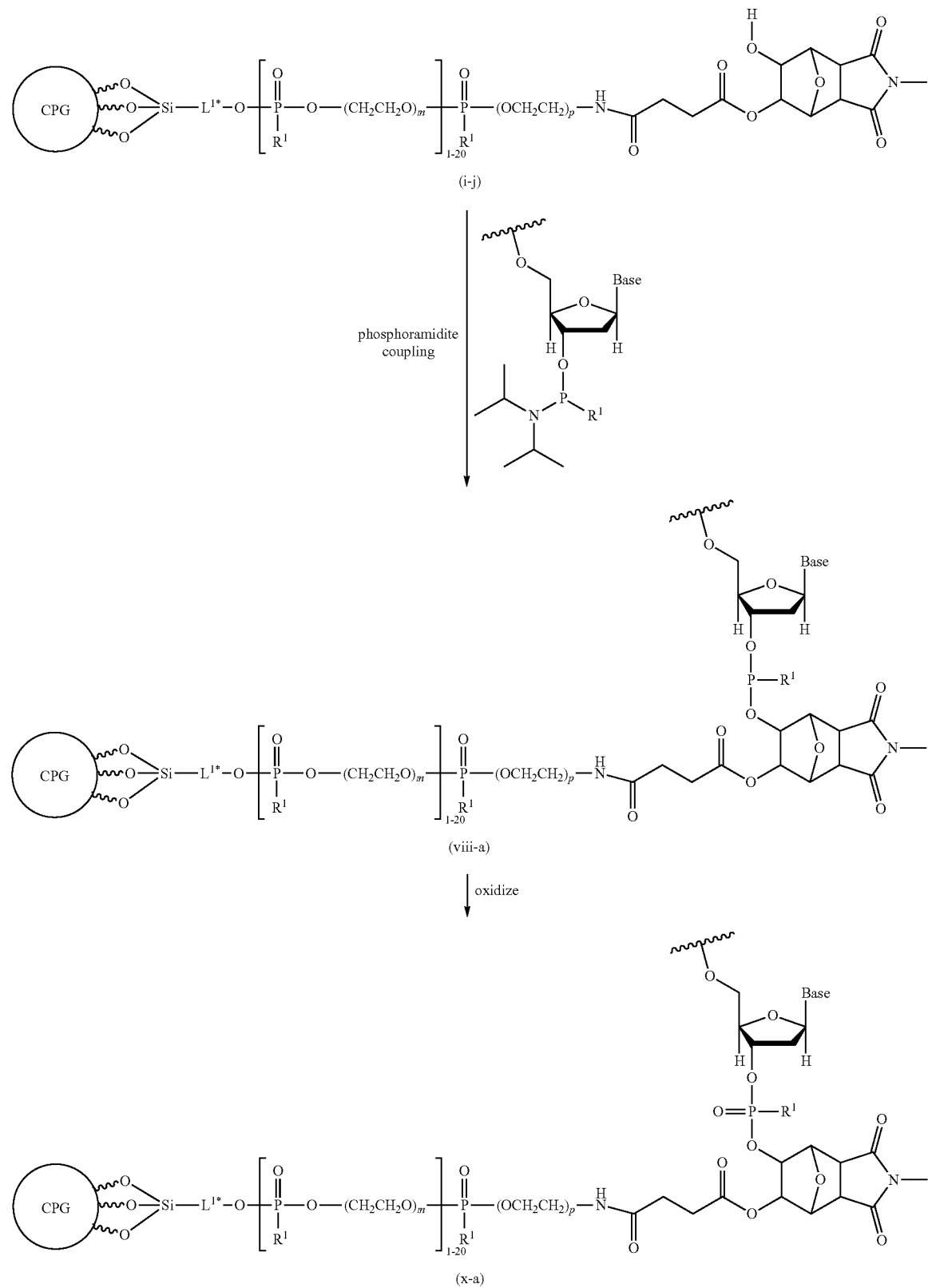

Illustrated in Scheme 6 is a representative synthesis of a functionalized solid support of formula (x-a) bearing a nucleotide or nucleoside moiety $G^{1a}$, and particular A, $L^5$, $R^{2a}$, and $R^{2b}$ groups in formula (I).

Another aspect of the invention provides a method of synthesizing an oligonucleotide comprising (a) subjecting a functionalized solid support of formula (I) to one or more cycles of nucleotide addition chemistry, wherein $G^1$ is —P(O)(R$^1$)-L$^3$-R$^2$; R$^2$ is —NR$^{2a}$R$^{2b}$; R$^{2b}$ is C(O)-L$^4$-G$^{1a}$, C(O)-L$^5$-P(O)(R$^1$)-G$^{1a}$, or C(O)-L$^6$-G$^{1a}$; G$^{1a}$ is a nucleotide moiety or a nucleoside moiety; the nucleotide moiety and nucleoside moiety comprise a single nucleotide or nucleoside residue; and (b) obtaining a functionalized solid support of formula (I), wherein G$^1$ is —P(O)(R$^1$)-L$^3$-R$^2$; R$^2$ is —NR$^{2a}$R$^{2b}$; R$^{2b}$ is C(O)-L$^4$-G$^{1a}$, C(O)-L$^5$-P(O)(R$^1$)-G$^{1a}$, or C(O)-L$^6$-G$^{1a}$; and G$^{1a}$ is an oligonucleotide moiety.

The one or more cycles of nucleotide addition chemistry may be one or more cycles of phosphoramidite-mediated nucleotide addition.

Using functionalized solid supports of the invention, oligonucleotides may be prepared with an average error and/or deletion rate of less than 10, 9, 8, 7, 6, 5, 4, 3, 2, or 1 per 10,000 base pairs.

The oligonucleotide synthesis method may further comprise cleaving the oligonucleotide moiety from the functionalized solid support. The method may further comprise removing one or more protecting groups from the oligonucleotide moiety prior to cleavage. The method may further comprise removing one or more protecting groups from the oligonucleotide after cleavage.

Functionalized solid supports of the current invention may be synthesized using a number of techniques and synthetic protocols known to those of skill in the art.

Phosphoramidite coupling may be effected through activation of the appropriate phosphoramidite using an acidic azole catalyst in a solvent such as acetonitrile, followed by reaction of the activated phorphoramidite in excess with the alcohol reaction partner and oxidation of the intermediate phosphite triester. Azole catalysts include 1H-tetrazole, 5-ethylthio-1Htetrazole, 2-benzylthiotetrazole, 4,5-dicyanoimidazole, or a number of similar compounds, as described in "Coupling activators for the oligonucleotide synthesis via phosphoramidite approach" Tetrahedron (2013) 69 (18): 3615-3637. The unstable trivalent phosphite triester may be oxidized to the stable pentavalent phosphotriester, by use of either 0.1M or 0.02M iodine in THF/pyridine/water.

Amide coupling may be effected using well known conditions, for example, by reaction of amine and carboxylic acid using coupling reagents such as HATU, EDC, PyBOP, DCC, HBTU, or TBTU in solvents such as THF, DMF, dichloromethane, ethyl acetate, or DMSO, with or without the addition of an amine base such as N-methylmorpholine, Hunig's base, pyridine, 2,6-lutidine, or triethylamine, to provide product. For example, reaction of amine (1 equivalent) with acid (2.5 equivalents) and HATU (2.5 equivalents) in the presence of diisopropylethylamine (3 equivalents) in DMSO at about room temperature.

Conditions for removing alcohol and amine protecting groups are well known in the art, as described in PGM Wuts and TW Greene, in Greene's book titled Protective Groups in Organic Synthesis (4$^{th}$ ed.), John Wiley & Sons, NY (2006), which is incorporated herein by reference. For example, the DMTr group may be removed by reaction with 3% trichloroacetic acid (TCA) in dichloromethane (DCM), 3% dichloroacetic acid (DCA) in DCM, or 5% DCA in toluene. The Boc protecting group for amines may be removed using trifluoroacetic acid (TFA) in DCM or HCl in dioxane/water mixtures.

Oligonucleotide synthesis may be carried out by a stepwise addition of nucleotide residues to the 5'-terminus of the growing chain until the desired sequence is assembled. Each addition is referred to as a synthetic cycle and commonly consists of four chemical reactions: (1) De-blocking; (2) Coupling; (3) Capping; and (4) Oxidation. De-blocking may involve removal of a 5'-DMTr group to provide a solid support bound precursor bearing a free 5'-terminal hydroxy group. Common conditions for DMTr removal include reaction with a solution of an acid, such as 2% trichloroacetic acid (TCA) or 3% dichloroacetic acid (DCA), in an inert solvent (dichloromethane or toluene). The free 5'-hydroxy may be coupled with a nucleoside phosphoramidite in acetonitrile activated by an acidic azole catalyst, 1H-tetrazole, 5-ethylthio-1Htetrazole, 2-benzylthiotetrazole, 4,5-dicyanoimidazole, or a number of similar compounds, to form a phosphite triester linkage. Any molecules having unreacted 5'-OH are then capped by acetylation. Finally, the phosphite triester linkage is oxidized to the phosphate triester, typically with iodine and water in the presence of a weak base (e.g., pyridine, lutidine, colline). Alternatively, oligonucleotide synthesis may be carried out in the 3'-direction, as described in Appl. Sci. 2019, 9, 1357.

After synthesis, an oligonucleotide may be cleaved from the support and deprotected. In general, the deprotection conditions are determined by the modification type incorporated into the oligonucleotide. They can also be determined by the nucleobase protection used to synthesise the oligo backbone. The N-acyl base protection and the 2-cyanoethyl phosphate protection may be removed simultaneously by treatment with inorganic bases or amines. Solid support-bound oligonucleotides may be treated with solutions of bases in an organic solvent, for instance, with 50% triethylamine in acetonitrile or 10% diethylamine in acetonitrile. Standard DNA bases protected with traditional groups (Bz-dA, Bz-dC, and iBu-dG) may be deprotected using ammonium hydroxide solution. However, this deprotection is generally slow and not compatible with all modifications. Ac-dC and dmf-dG, and the corresponding RNA bases, allow much faster deprotection using a 1:1 mixture of 28% (or higher) ammonium hydroxide and 40% aqueous methylamine. If the oligonucleotide contains any 2'-O-protected ribonucleotide residues, the deprotection protocol includes the second step where the 2'-O-protecting silyl groups are removed by treatment with fluoride ion by various methods. The fully deprotected product may be used as is, or the desired oligonucleotide can be purified by a number of methods. Most commonly, the crude product is desalted using ethanol precipitation, size exclusion chromatography, or reverse-phase HPLC. To eliminate unwanted truncation products, the oligonucleotides can be purified via polyacrylamide gel electrophoresis or anionexchange HPLC followed by desalting. An oligonucleotide may be synthesised "DMT ON" and the final dimethoxytrityl group only removed during or after purification. To achieve this there is no treatment with deblock after the final phosphoramidite addition. The oligo is cleaved and deprotected as required. If the DMTr group is retained during purification this can be removed by treatment with acid (80% acetic acid in water). In order to completely remove a universal linker, one of the following may be used: (1) ammonium hydroxide solution, 17 h at 80° C.; (2) (1:1 mixture of 28% (or higher) ammonium hydroxide and 40% aqueous methylamine), 5 h at 80° C.; or (3) (1:1 mixture of 28% (or higher) ammonium hydroxide and 40% aqueous methylamine), overnight at 55° C. The Q linker may be removed during deprotection by reaction with a 1:1 mixture of 28% (or higher) ammonium hydroxide and 40% aqueous methylamine at 70° C. for 2.5 h.

The compounds of the disclosure may be prepared using the exemplary reactions and techniques described in this section. The reactions are performed in solvents appropriate to the reagents and materials employed and are suitable for the transformations being effective. Also, in the description of the synthetic methods described below, it is to be understood that all proposed reaction conditions, including solvent, reaction atmosphere, reaction temperature, duration of the experiment, and workup procedures, are chosen to be the conditions standard for that reaction, which should be readily recognized by one skilled in the art. One having ordinary skill in the art may adjust one or more of the conditions described herein. One skilled in the art of organic synthesis understands that the functionality present on various portions of the edict molecule must be compatible with the reagents and reactions proposed. Not all compounds of the disclosure falling into a given class may be compatible with some of the reaction conditions required in some of the methods described. Such restrictions to the substituents, which are compatible with the reaction conditions, will be readily apparent to one skilled in the art and alternate methods can be used.

Abbreviations

Ac-dC=N-acetyl-2'-deoxycytidine
Ac₂O=acetic anhydride
aq.=aqueous
Bz-dA=benzoyl-2'-deoxyadenosine
Bz-dC=benzoyl-2'-deoxycytidine
conc.=concentrated
DCC=N,N'-dicyclohexylcarbodiimide
DCM=dichloromethane, CH$_2$C$_{12}$
DIPEA=di-isopropyl ethyl amine
dmf-dG=N-dimethylformamidine-2'-deoxyguanosine
DMSO=dimethylsulfoxide
EDC=1-Ethyl-3-(3-dimethylaminopropyl)carbodiimide
eq=equivalents
EtOH=ethanol
EtOAc=ethyl acetate
Et$_3$N=triethylamine
h=hours
HOAc=acetic acid
HATU=1-[Bis(dimethylamino)methylene]-1H-1,2,3-triazolo[4,5-b]pyridinium 3-oxid hexafluorophosphate,
HBTU=(2-(1H-benzotriazol-1-yl)-1,1,3,3-tetramethyluronium hexafluorophosphate
iBu-dG=isobutyl-2'-deoxyguanosine
MeCN=acetonitrile
MeOH=methanol
min=minutes
PyBop=Bromotripyrrolidinophosphonium hexafluorophosphate
Q linker=

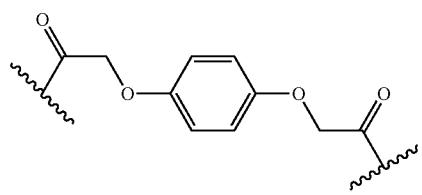 [SMILES: *C(=O)COc1ccc(OCC(*)=O)cc1]

r.t.=room temperature
rt=room temperature
sat.=saturated
TBDMS=tert-butyldimethylsilyl
TBTU=2-(1H-benzotriazole-1-yl)-1,1,3,3-tetramethylaminium tetrafluoroborate
TFA=trifluoroacetic acid
THE=tetrahydrofuran
TMS=trimethylsilyl
wt.=weight
XantPhos=4,5-Bis(diphenylphosphino)-9,9-dimethylxanthene C. Examples Example 1. Synthesis of Extended Linker CPG Supports Scheme 7 shows the synthesis of an example precursor molecule 8. LCAA CPG beads with a pore size of 1000 Å were reacted with excess 8-Caprolactone 7, in toluene at reflux for 24 hours. This produced structure 8 has an alcohol-based support conducive to the phosphoramidite chemistry that follows.

Scheme 7

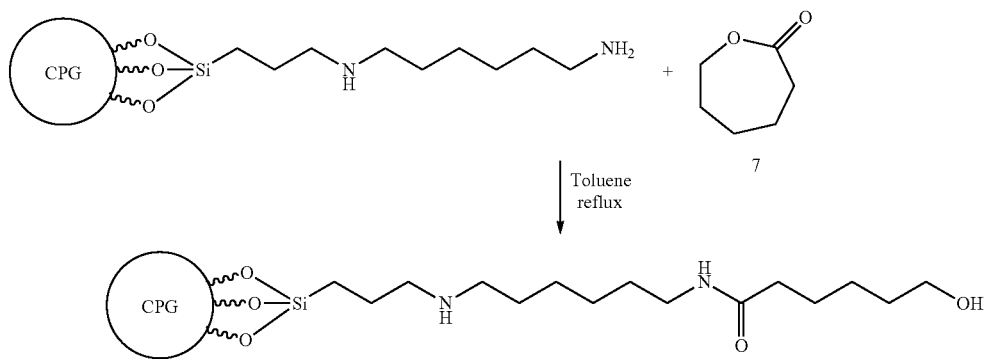

8

As shown in Scheme 8, one to four Spacer18 phosphoramidites, with cyanoethyl protecting groups 9, were then attached using up to four cycles of standard phosphoramidite chemistry, resulting in an extended linker CPG 10.

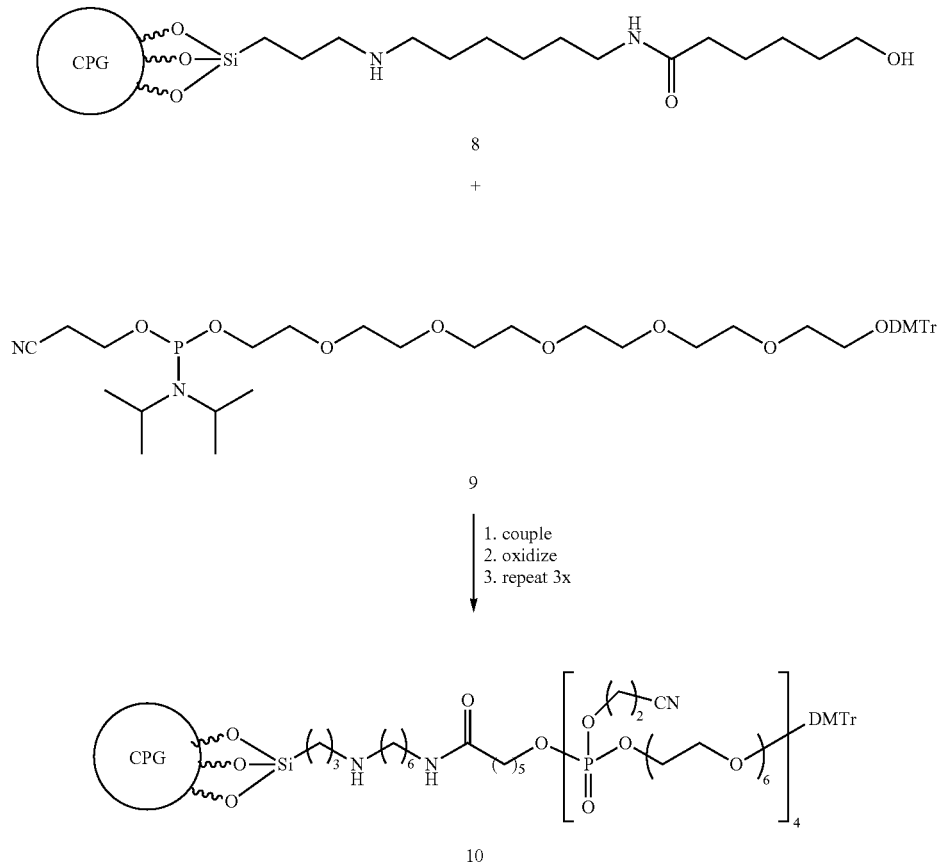

Scheme 8

As shown in Scheme 9, following deprotection of the extended linker 10, a cleavable modified dT phosphoramidite 11 was then attached to 10 via standard phosphoramidite chemistry to produce 12, to which subsequent nucleotides are attached, via standard phosphoramidite chemistry, to produce the final oligonucleotide product.

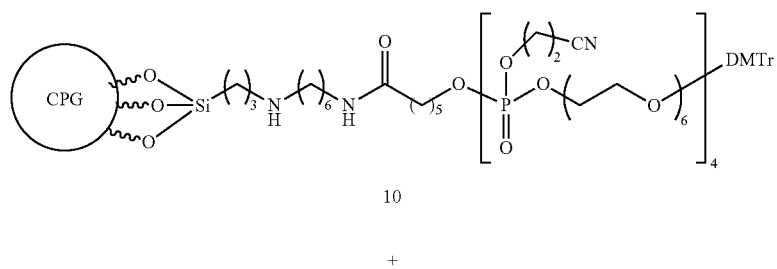

Scheme 9

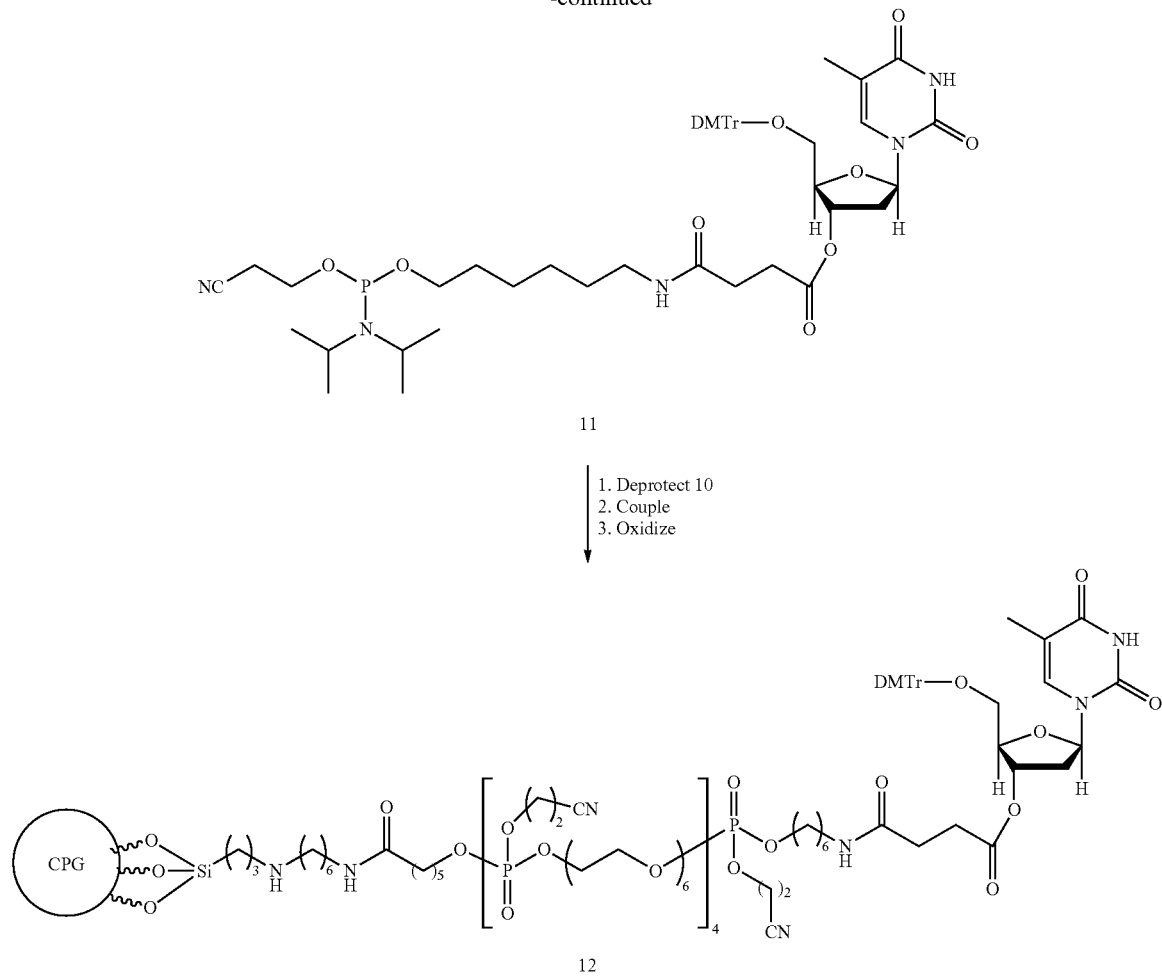

Example 2. Coupling Efficiency of Oligo Synthesis Using the Extended Linker CPG Support Structures Oligonucleotides were produced with error and deletion rates less than 3 per 10,000 bp using functionalized supports of the general type as compound 12.

Example 3. Synthesis of Extended Linker CPG Supports

Further embodiments of the extended linker CPG involve modifications of the Spacer 18 to extend shelf life and inhibit branching and side reactions. For example, Spacer 18 amidite can be modified to replace cyanoethyl protecting group with a non-cleavable or more stable group such as methyl, ethyl, methoxy, ethoxy, and isopropoxy.

To prepare these modified structures, a Spacer 18, protected on one end with a DMTr bound to the free OH at that end 14, was reacted with ethyl N,N,N',N'-tetraisopropylphosphorodiamidite 15, instead of 2-cyanoethyl N,N,N',N'-tetraisopropylphosphorodiamidite, in a MixerMill 400 ball mill homogenizer in the presence of Pyridine trifluoroacetate (Py TFA). This produced a Spacer 18 amidite, still protected with DMTr, with an ethyl protecting group on the phosphoamidite 16.

Scheme 10

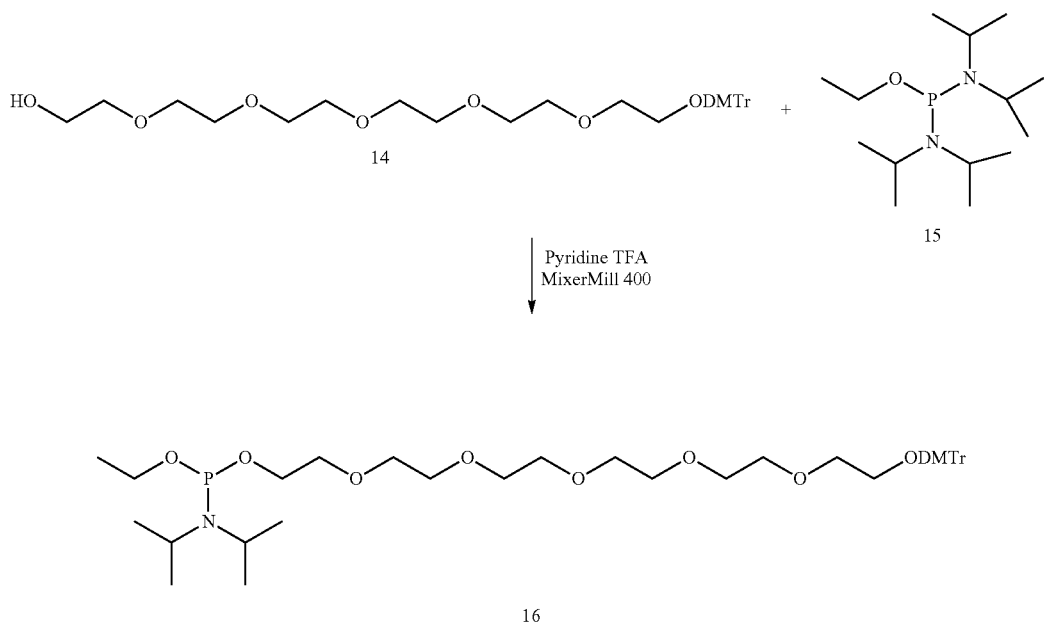

The Spacer 18 amidite 16 was then coupled to the alcohol-based CPG with the LCAA derivatized with F-Caprolactone 8 and oxidized and the coupling-oxidation process repeated six times to provide 18.

Scheme 11

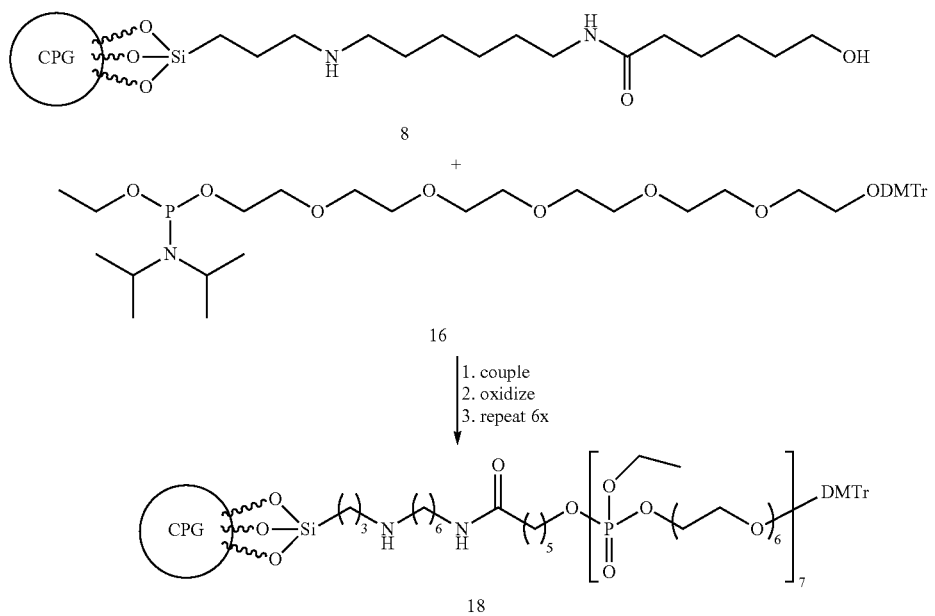

To add an amine group on the end of the extended linker, another Spacer 18 19 was modified such that the free OH on one end is replaced with a free amine which was protected by a tert-Butyloxycarbonyl (Boc) group 20. Afterward, the ethyl-protected amidite 15 was attached, as described above, to produce 21.

Scheme 12
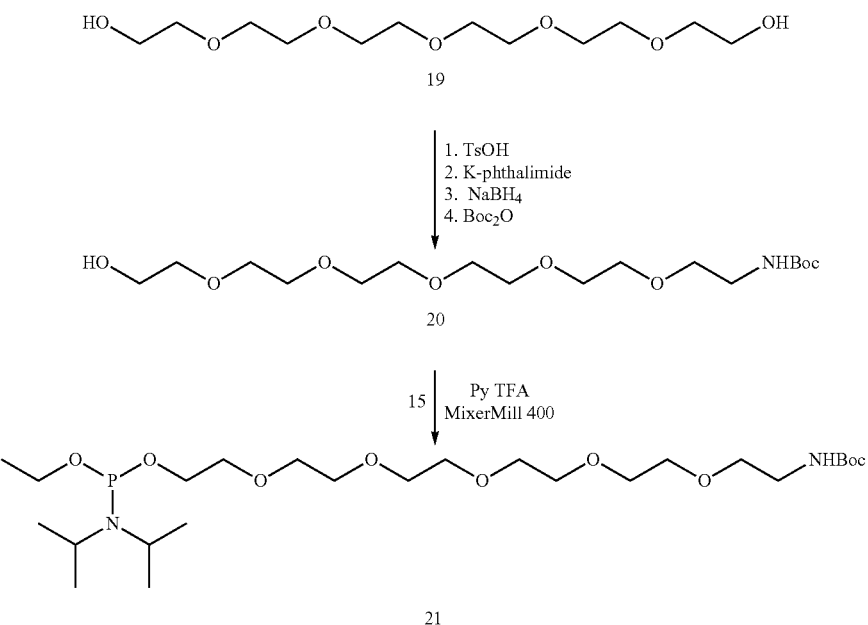
Compound 21 was then attached to the extended linker 18 to produce a product 22 that contains eight Spacer 18s, is protected via ethyl groups on the phosphates, and has a free amine at the end.
Scheme 13
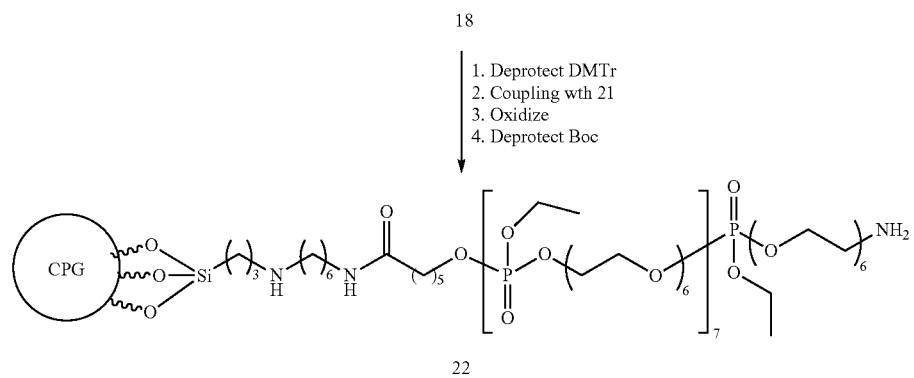
Using analogous chemistry, functionalized solid supports 27 and 28 may be prepared.
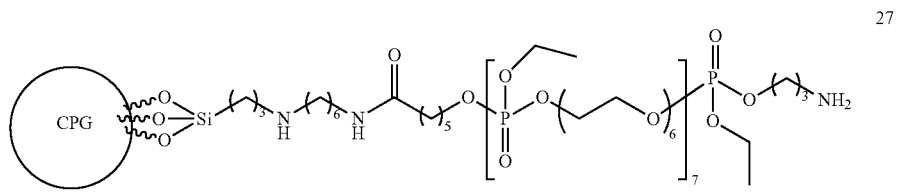

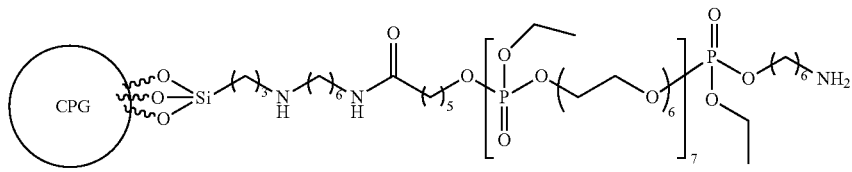

28

It is understood that the foregoing detailed description and accompanying examples are merely illustrative and are not to be taken as limitations upon the scope of the invention, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

What is claimed is:

1. A functionalized solid support of formula (I), or a salt thereof,

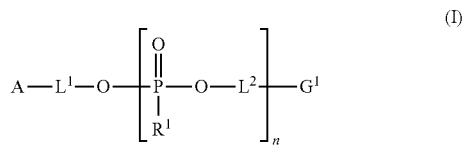

wherein:

A is a solid support material;

$L^1$ -silyl-$C_{2-4}$alkylene-NH—$C_{2-10}$alkylene-NHC(O)—$C_{2-10}$alkylene;

$L^2$, at each occurrence, is independently —(CH$_2$CH$_2$O)$_m$—, —(CHCH$_3$CH$_2$O)$_m$—, or —(CH$_2$CHCH$_3$O)$_m$—;

$G^1$ is —P(O)(R$^1$)-L$^3$-R$^2$, hydrogen, or PG$^1$;

$R^1$, at each occurrence, is independently —OR$^{1a}$ or R$^{1a}$;

$R^{1a}$, at each occurrence, is independently $C_{1-10}$alkyl, $C_{2-10}$alkenyl, $C_{2-10}$alkynyl, $C_{3-10}$cycloalkyl, or $C_{5-10}$cycloalkenyl, wherein R$^{1a}$ is optionally substituted with 1-6 substituents independently selected from the group consisting of cyano, halogen, oxo, OH, —OC$_{1-4}$alkyl, —OC$_{1-4}$haloalkyl, or C$_{3-6}$cycloalkyl, the C$_{3-6}$cycloalkyl being optionally substituted with halogen or C$_{1-4}$alkyl;

$L^3$ is —(OCH$_2$CH$_2$)$_p$—, —(OCHCH$_3$CH$_2$)$_p$—, —(OCH$_2$CHCH$_3$)$_p$—, —OC$_{2-10}$alkylene-, —OC$_{0-4}$alkylene-C$_{3-10}$cycloalkylene-C$_{0-4}$alkylene-, or —OC$_{0-4}$alkylene-phenylene-C$_{0-4}$alkylene-, wherein the alkylene in L$^3$ is optionally substituted with 1-6 halogen, and the cycloalkylene and phenylene are optionally substituted with 1-4 substituents independently selected from the group consisting of halogen, C$_{1-4}$alkyl, C$_{1-4}$haloalkyl, cyano, —OC$_{1-4}$alkyl, and —OC$_{1-4}$haloalkyl;

$R^2$ is —NR$^{2a}$R$^{2b}$;

$R^{2a}$ is hydrogen, C$_{1-6}$alkyl, C$_{1-6}$haloalkyl, C$_{3-6}$cycloalkyl, or —C$_{1-3}$alkylene-C$_{3-6}$cycloalkyl;

$R^{2b}$ is C(O)-L$^4$-G$^{1a}$, hydrogen, PG$^2$, C(O)-L$^4$-OH, C(O)-L$^4$-OPG$^3$, C(O)-L$^5$-H, C(O)-L$^5$-PG$^1$, C(O)-L$^5$-P(O)(R$^1$)-G$^{1a}$, C(O)-L$^5$-P(O)(OH)-G$^{1a}$, or C(O)-L$^6$-G$^{1a}$, or R$^{2a}$ and R$^{2b}$, together with the nitrogen to which they attach form a protected nitrogen atom;

$L^4$ is L$^7$-C(O) or C(O);

$L^5$ is L$^7$-O;

$L^6$ is L$^7$-Si(C$_{1-4}$alkyl)$_2$;

$L^7$ is a divalent chemical linker composed of atoms selected from the group consisting of carbon, hydrogen, oxygen, nitrogen, sulfur, phosphorus, silicon, and halogen, wherein
(a) the atoms of the divalent linker are arranged to form an optionally substituted chain, an optionally substituted ring, or a combination of optionally substituted chain(s) and ring(s); and
(b) the chain(s), ring(s), or combination thereof comprise a 1- to 20-membered contiguous linear arrangement of atoms selected from the group consisting of carbon, oxygen, nitrogen, sulfur, phosphorus, and silicon;

$G^{1a}$ is a nucleotide moiety or a nucleoside moiety;

PG$^1$ is a hydroxy protecting group;

PG$^2$ is an amino protecting group;

PG$^3$ is carboxylic acid protecting group;

m and p are independently an integer from 3 to 10; and
n is an integer from 1 to 20.

2. The functionalized solid support of claim 1, wherein G$^1$ is hydrogen.

3. The functionalized solid support of claim 1, wherein G$^1$ is PG$^1$.

4. The functionalized solid support of claim 1, wherein G$^1$ is P(O)(R$^1$)-L$^3$-R$^2$.

5. The functionalized solid support of claim 1, wherein L$^3$ is —(OCH$_2$CH$_2$)$_p$—.

6. The functionalized solid support of claim 1, wherein p is 6.

7. The functionalized solid support of claim 1, wherein L$^3$ is —OC$_{2-10}$alkylene-.

8. The functionalized solid support of claim 1, wherein L$^3$ is —OC$_{4-8}$alkylene-.

9. The functionalized solid support of claim 1, wherein L$^3$ is —OC$_6$alkylene-.

10. The functionalized solid support of claim 1, wherein L$^3$ is —O(CH$_2$)$_6$—.

11. The functionalized solid support of claim 1, wherein R$^{2b}$ is C(O)-L$^4$-G$^{1a}$, C(O)-L$^4$-OH, or C(O)-L$^4$-OPG$^3$.

12. The functionalized solid support of claim 1, wherein R$^{2b}$ is C(O)-L$^5$-H, C(O)-L$^5$-PG$^1$, C(O)-L$^5$-P(O)(R$^1$)-G$^{1a}$, or C(O)-L$^5$-P(O)(OH)-G$^{1a}$.

13. The functionalized solid support of claim 1, wherein R$^{2b}$ is C(O)-L$^6$-G$^{1a}$; and L$^6$ is

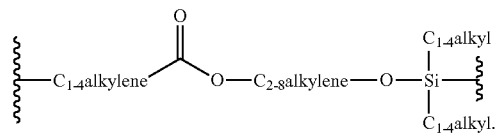

14. The functionalized solid support of claim 1, wherein, $L^1$ is -silyl-$(CH_2)_3$—NH—$(CH_2)_6$—NHC(O)—$(CH_2)_5$—.

15. The functionalized solid support of claim 1, wherein $L^2$, at each occurrence, is independently —$(CH_2CH_2O)_m$—.

16. The functionalized solid support of claim 1, wherein $R^1$, at each occurrence, is independently —$OCH_2CH_2CN$, —$CH_3$, —$CH_2CH_3$, —$OCH_3$, —$OCH_2CH_3$, or —$OCH(CH_3)_2$.

17. The functionalized solid support of claim 1, wherein the solid support material is a controlled-pore glass (CPG), silica gel, a macroporous cross-linked polystyrene, a polymethacrylate vinyl alcohol copolymer, a silicon chip, glass, a polystyrene bead, a polypropylene sheet, a nonporous silica bead, a polyacrylamide, or a polyacrylate.

\* \* \* \* \*